United States Patent
Nishio

[19]

[11] Patent Number: 5,978,153
[45] Date of Patent: Nov. 2, 1999

[54] ZOOM LENS WITH DIFFRACTIVE OPTICAL ELEMENTS

[75] Inventor: Akihiro Nishio, Yokohama, Japan

[73] Assignee: Canon Kabushiki Kaisha, Tokyo, Japan

[21] Appl. No.: 09/178,690

[22] Filed: Oct. 26, 1998

[51] Int. Cl.[6] .................................................. G02B 13/00
[52] U.S. Cl. ........................ 359/690; 359/576; 359/570; 359/708
[58] Field of Search ..................................... 359/690, 576, 359/570, 676, 683, 687, 688, 708

[56] References Cited

U.S. PATENT DOCUMENTS

| | | | |
|---|---|---|---|
| 5,044,706 | 9/1991 | Chen ......................................... | 359/357 |
| 5,268,790 | 12/1993 | Chen et al. .............................. | 359/558 |
| 5,493,441 | 2/1996 | Chipper ................................... | 359/354 |
| 5,847,877 | 12/1998 | Imamura et al. ....................... | 359/566 |

FOREIGN PATENT DOCUMENTS

| | | |
|---|---|---|
| 19533591 | of 0000 | Germany . |
| 4213421 | 8/1992 | Japan . |
| 6324262 | 11/1994 | Japan . |
| 9127321 | 5/1997 | Japan . |

*Primary Examiner*—Georgia Epps
*Assistant Examiner*—David N. Spector
*Attorney, Agent, or Firm*—Robin, Blecker & Daley

[57] ABSTRACT

A zoom lens includes, in order from an object side, a first lens unit of positive refractive power, a second lens unit of negative refractive power, and a subsequent lens unit of positive refractive power as a whole, wherein during zooming from a wide-angle end to a telephoto end, at least the first lens unit is moved along an optical axis such that a separation between the first lens unit and the second lens unit increases, and wherein at least one diffractive optical element is provided in the first lens unit.

16 Claims, 60 Drawing Sheets

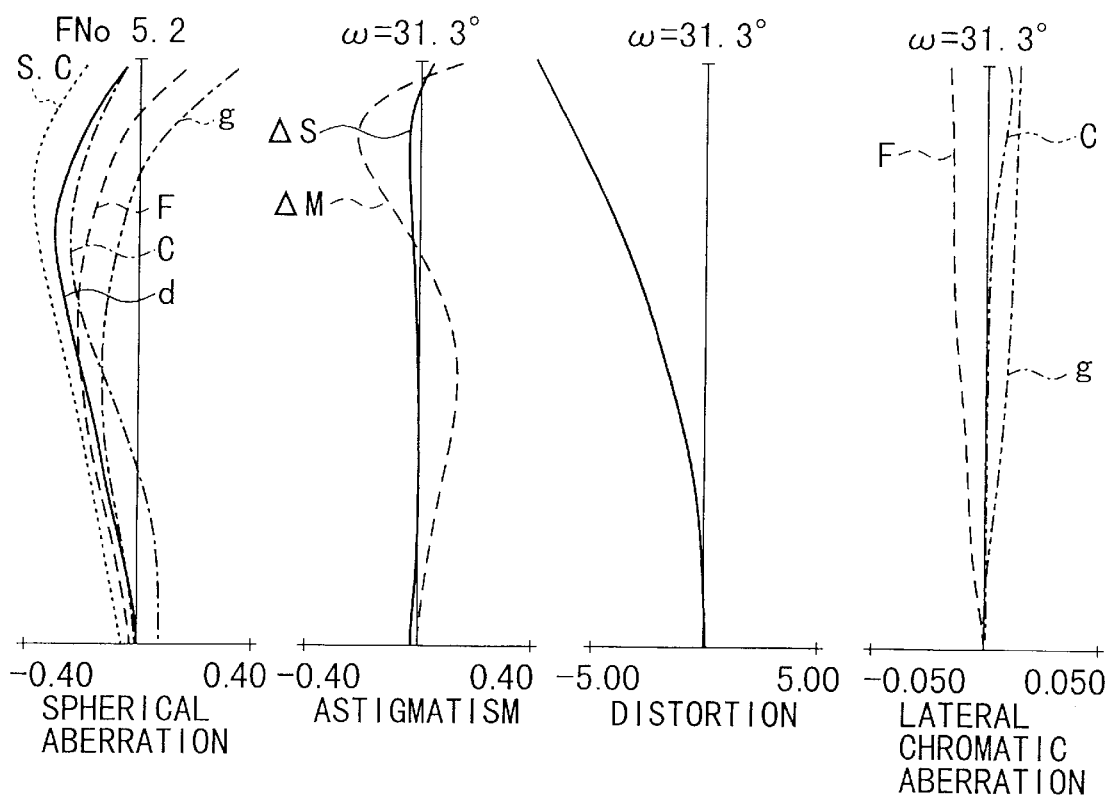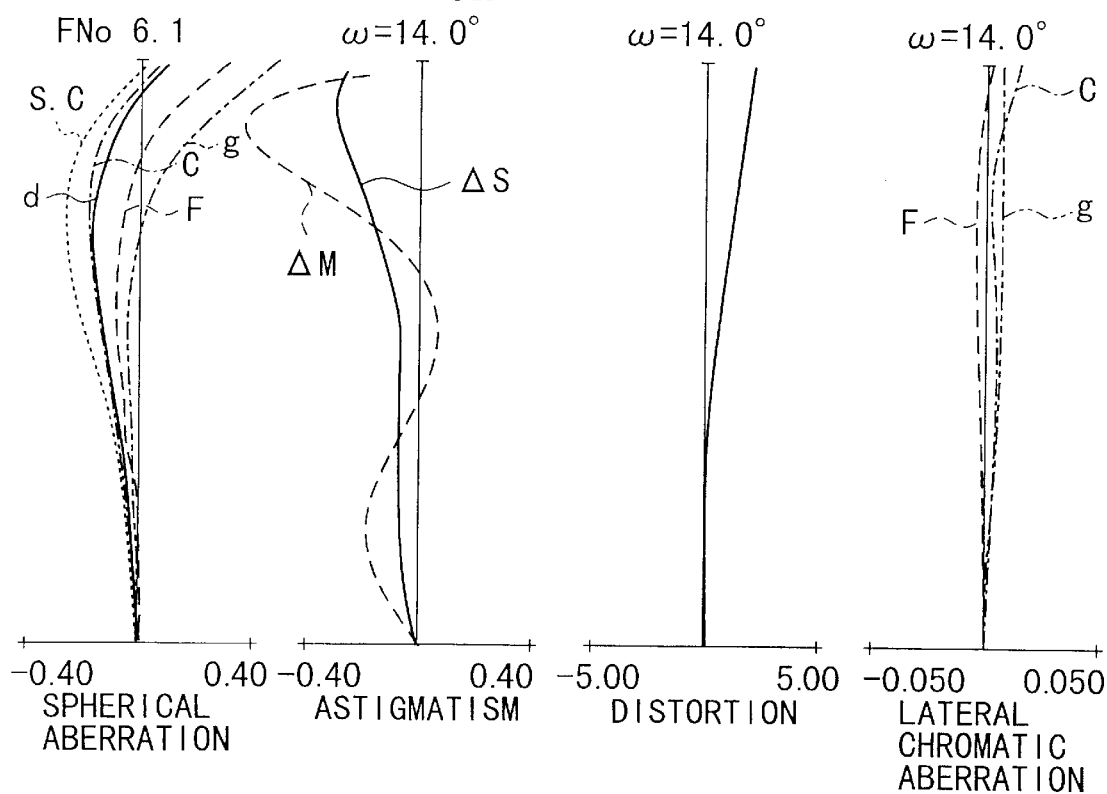

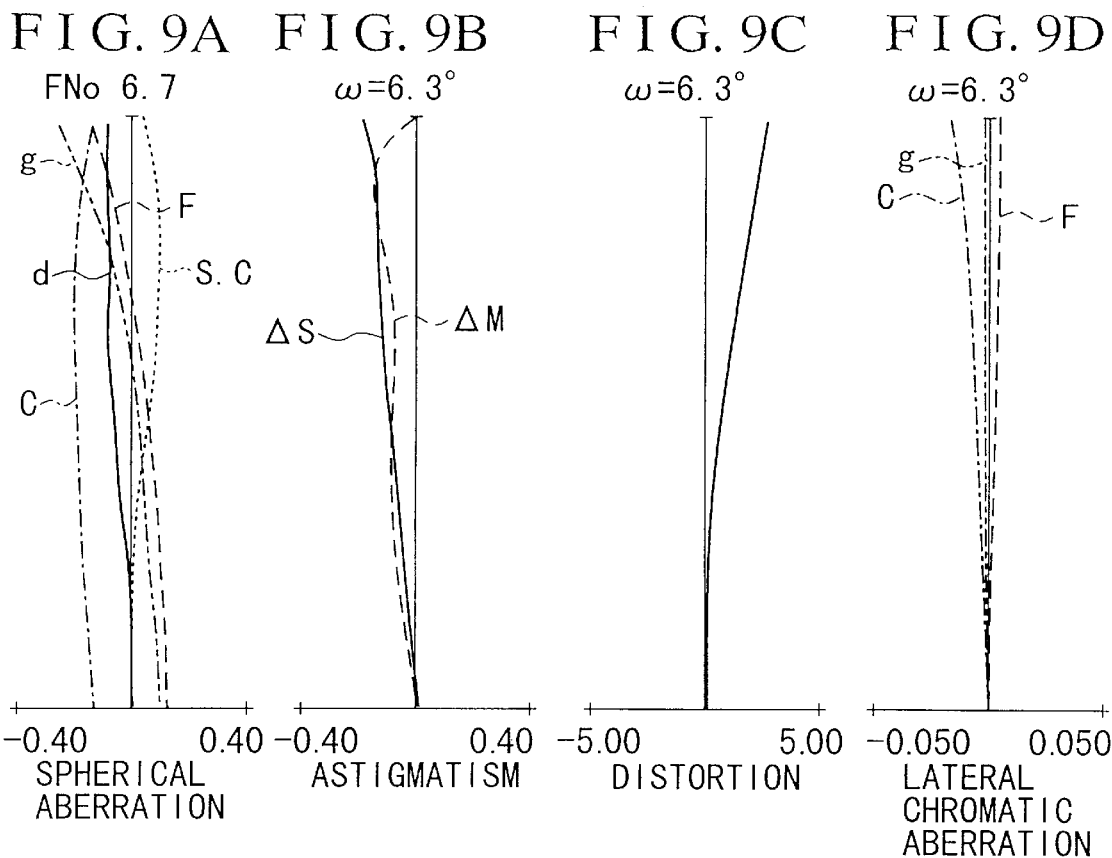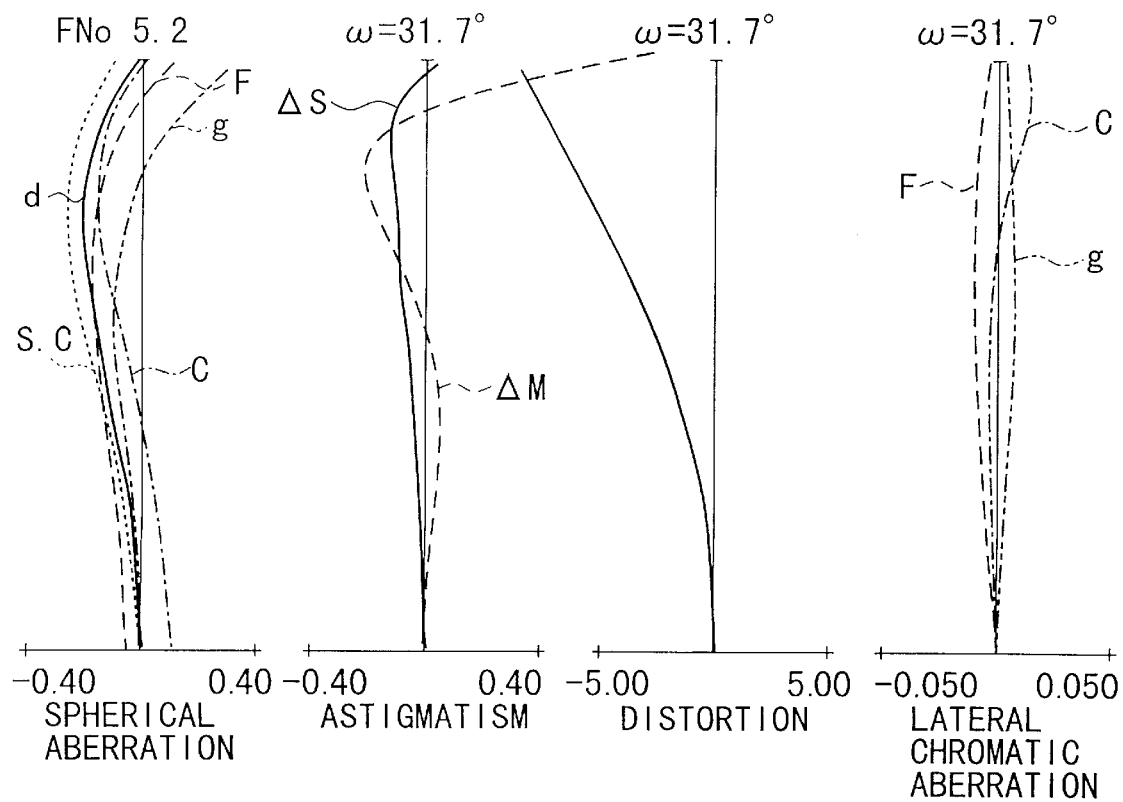

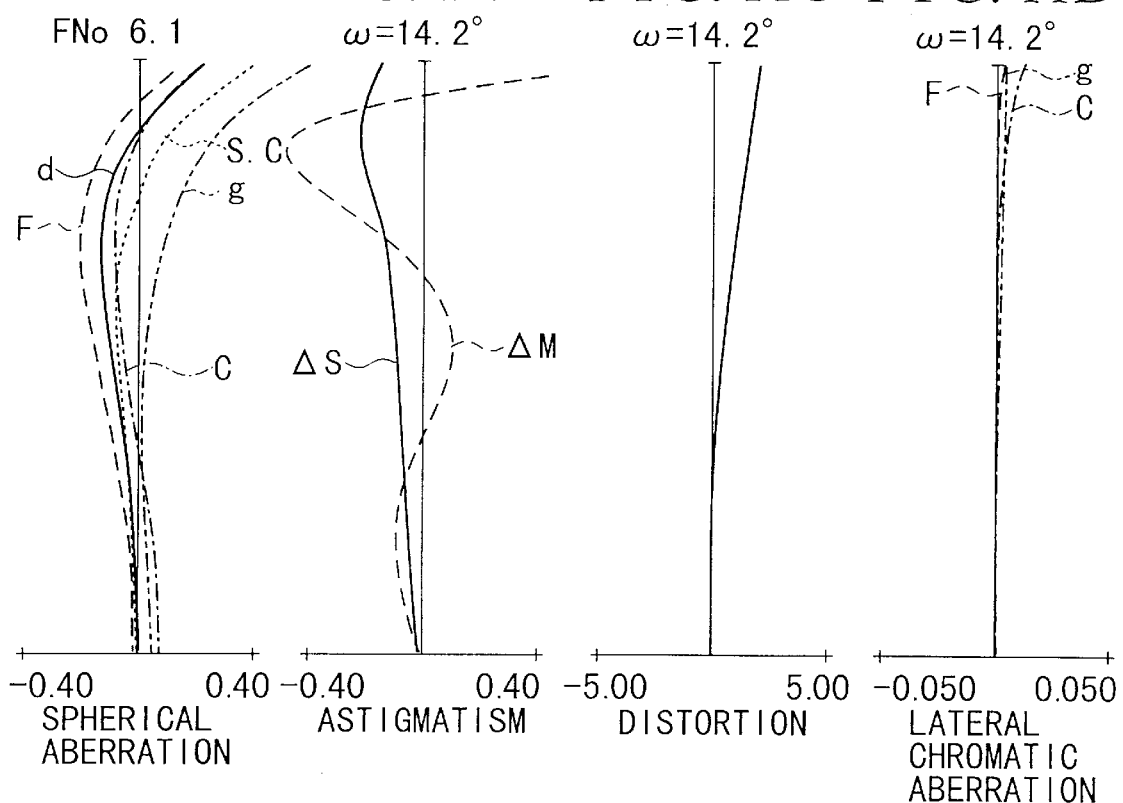
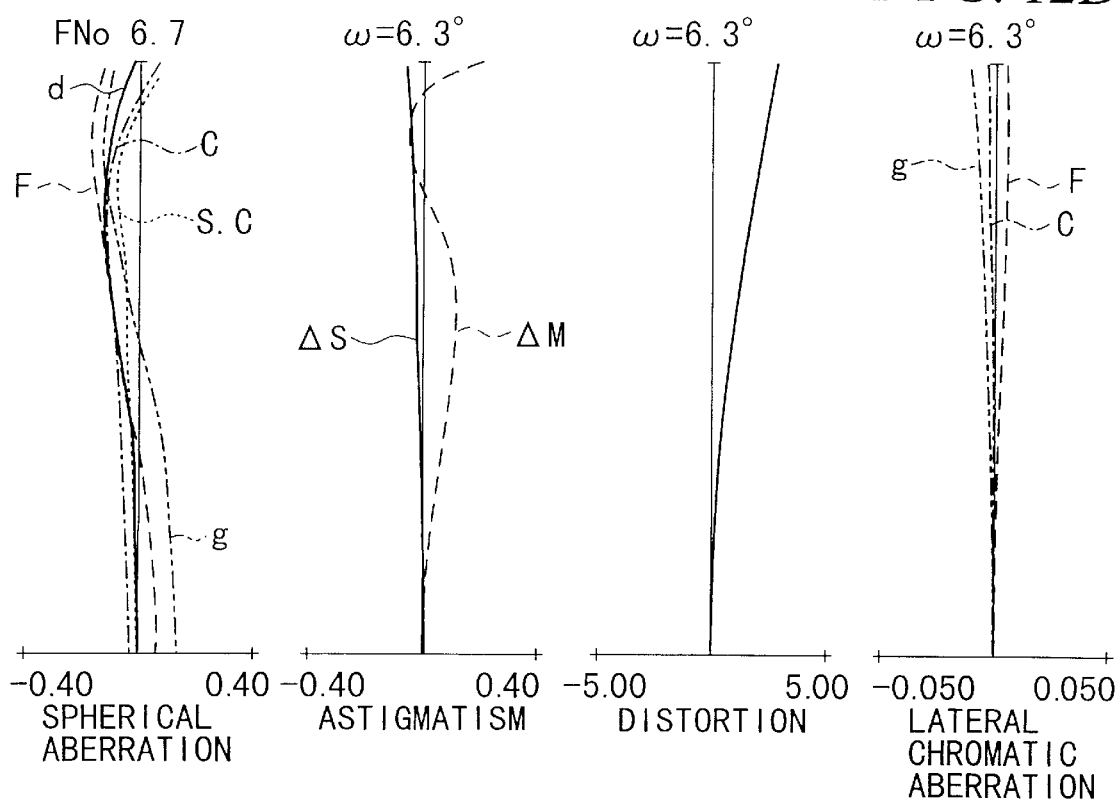

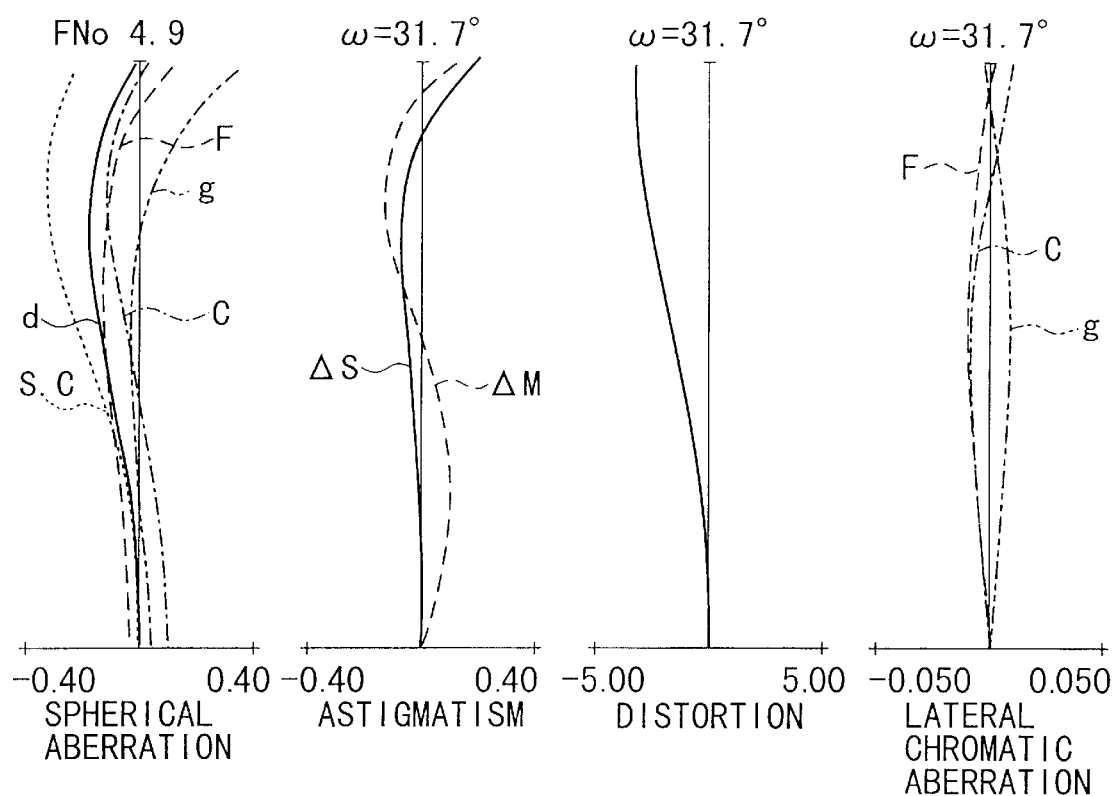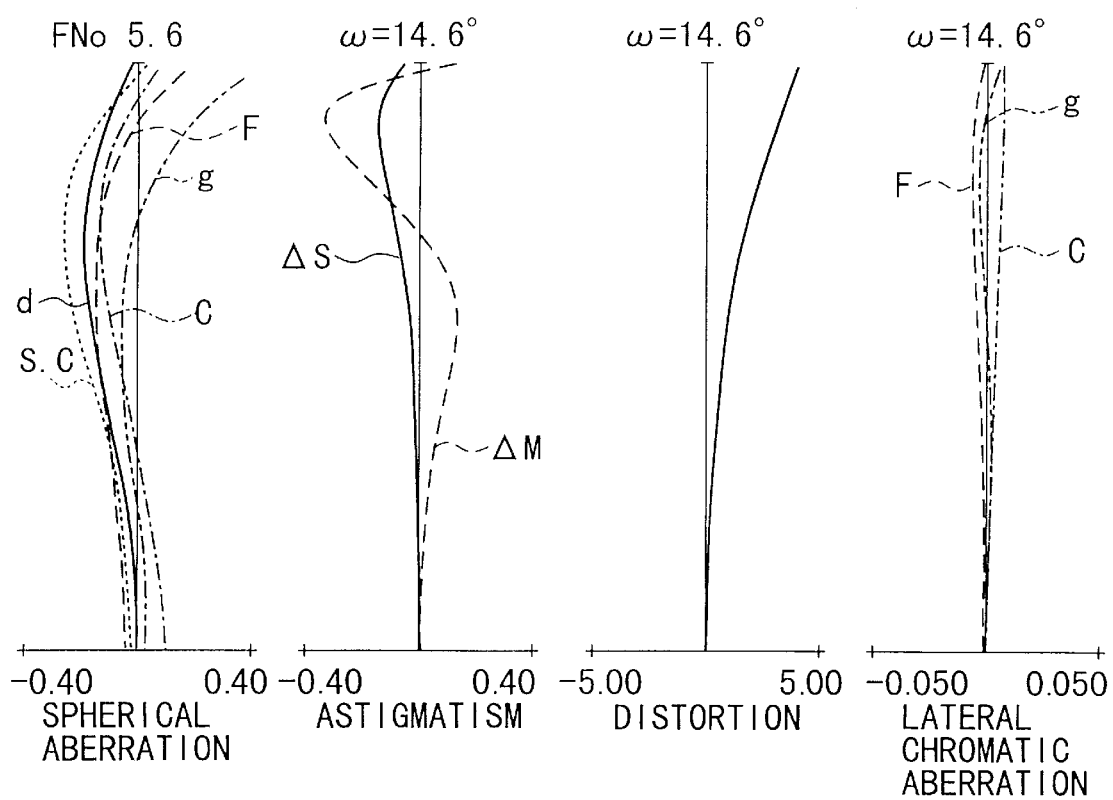

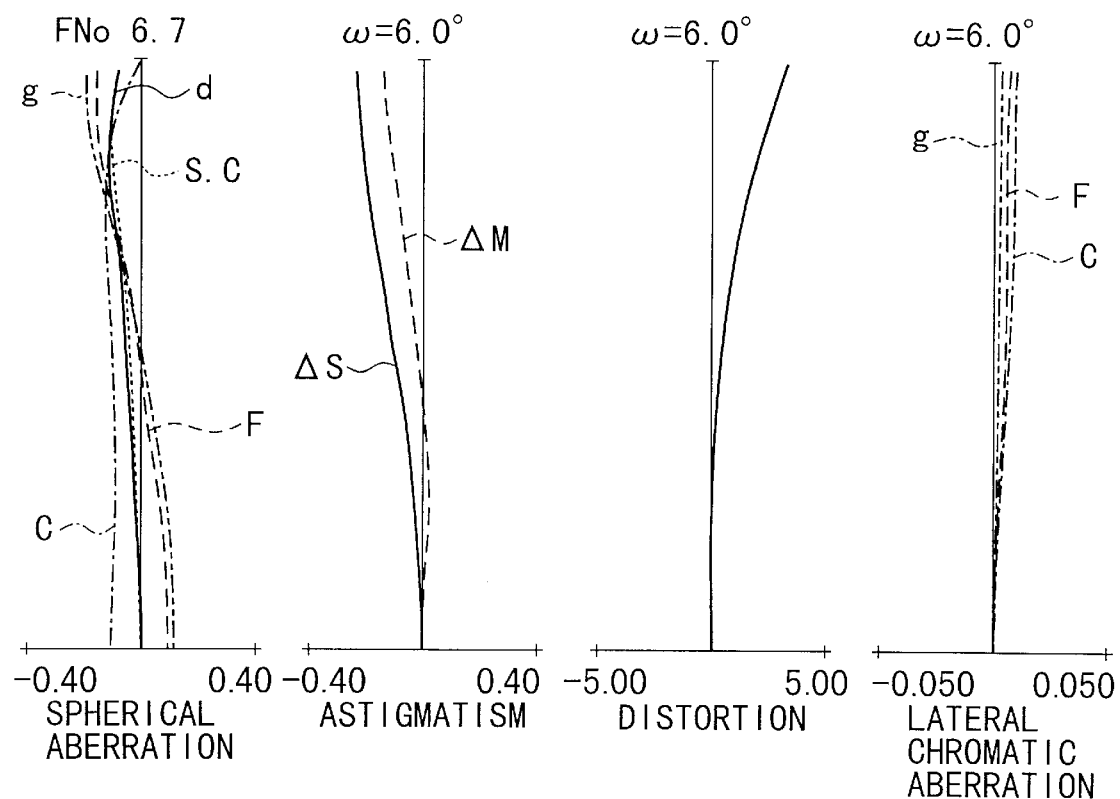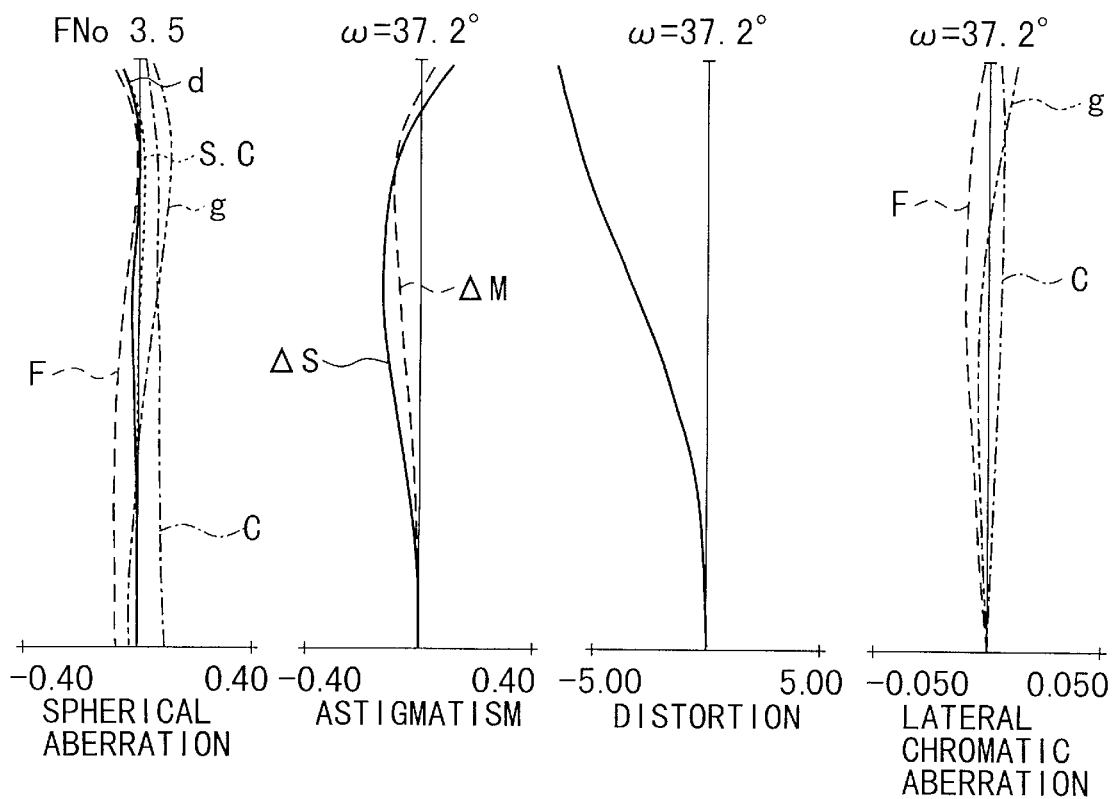

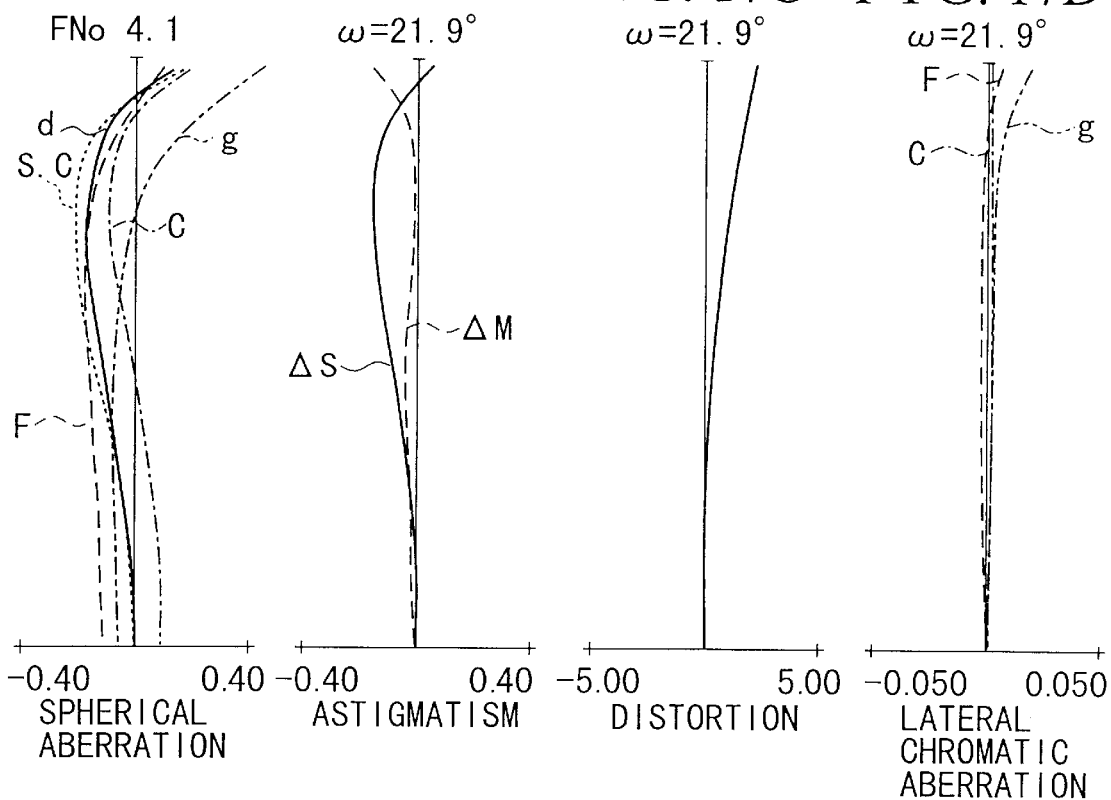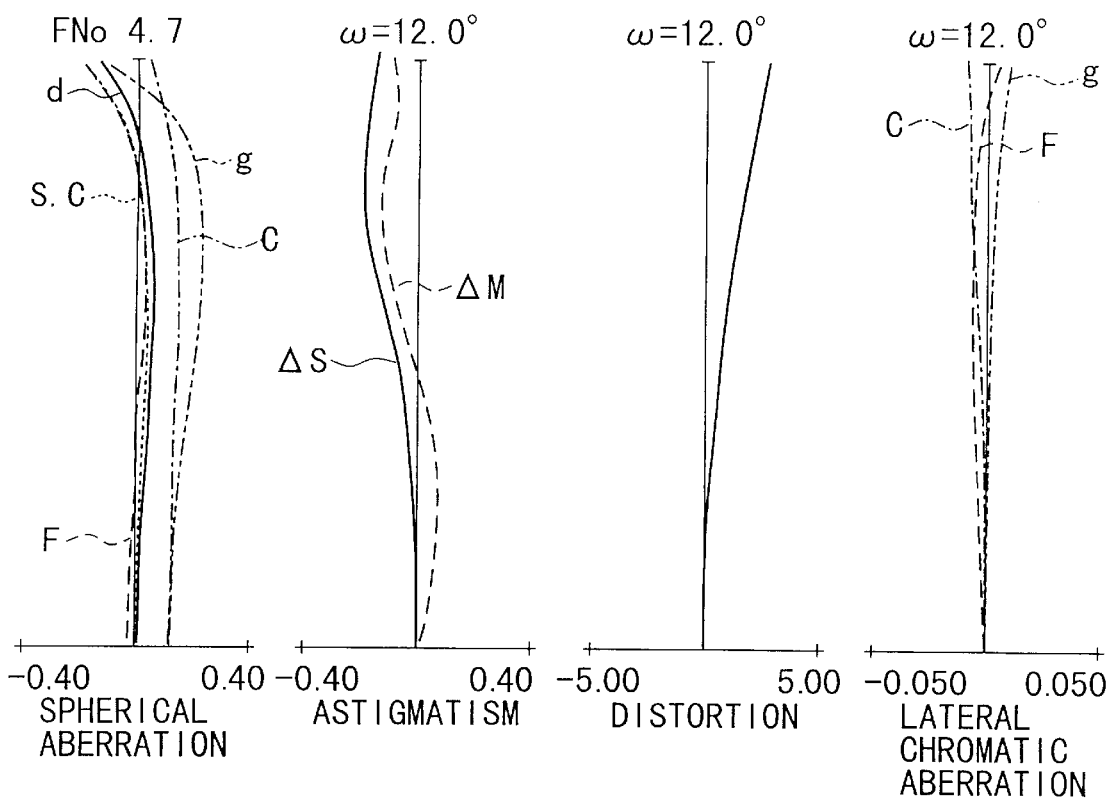

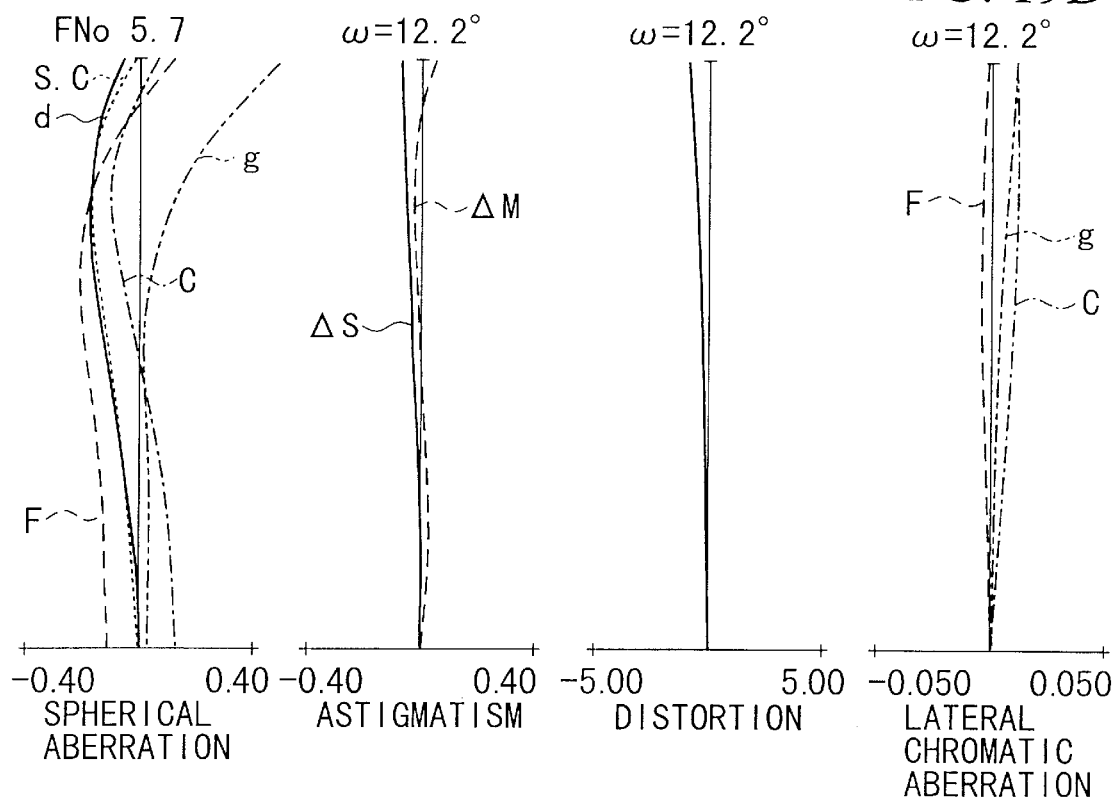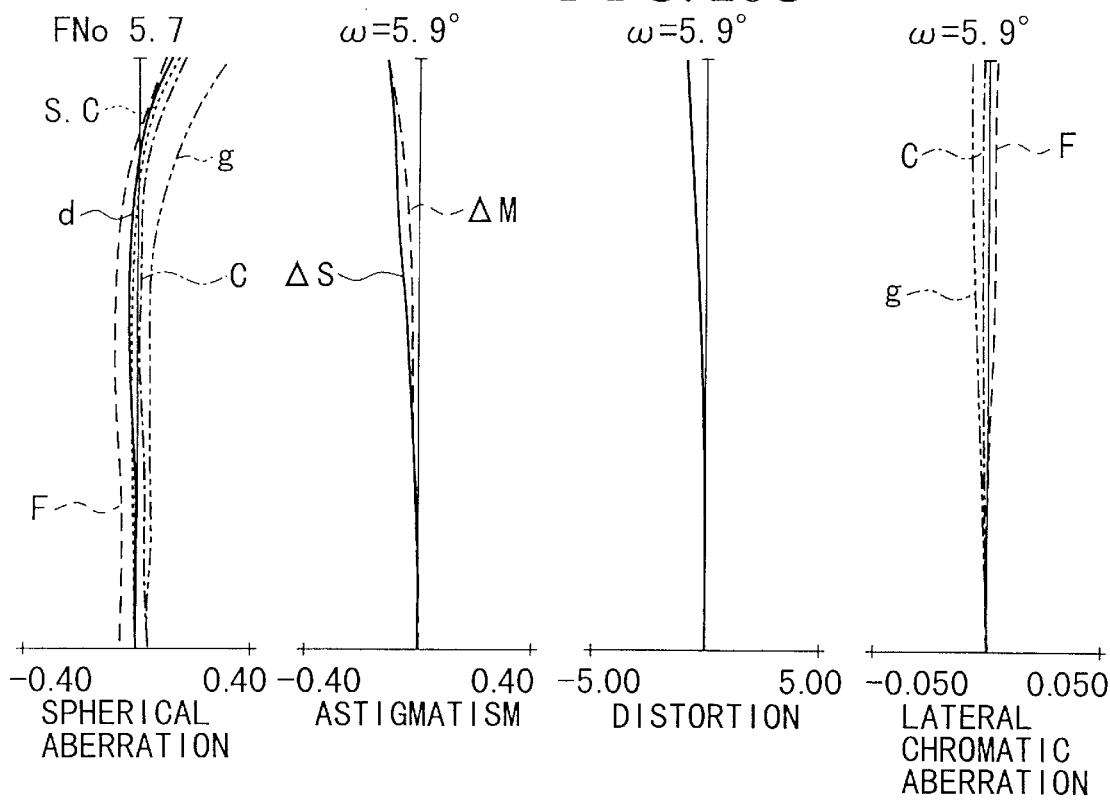

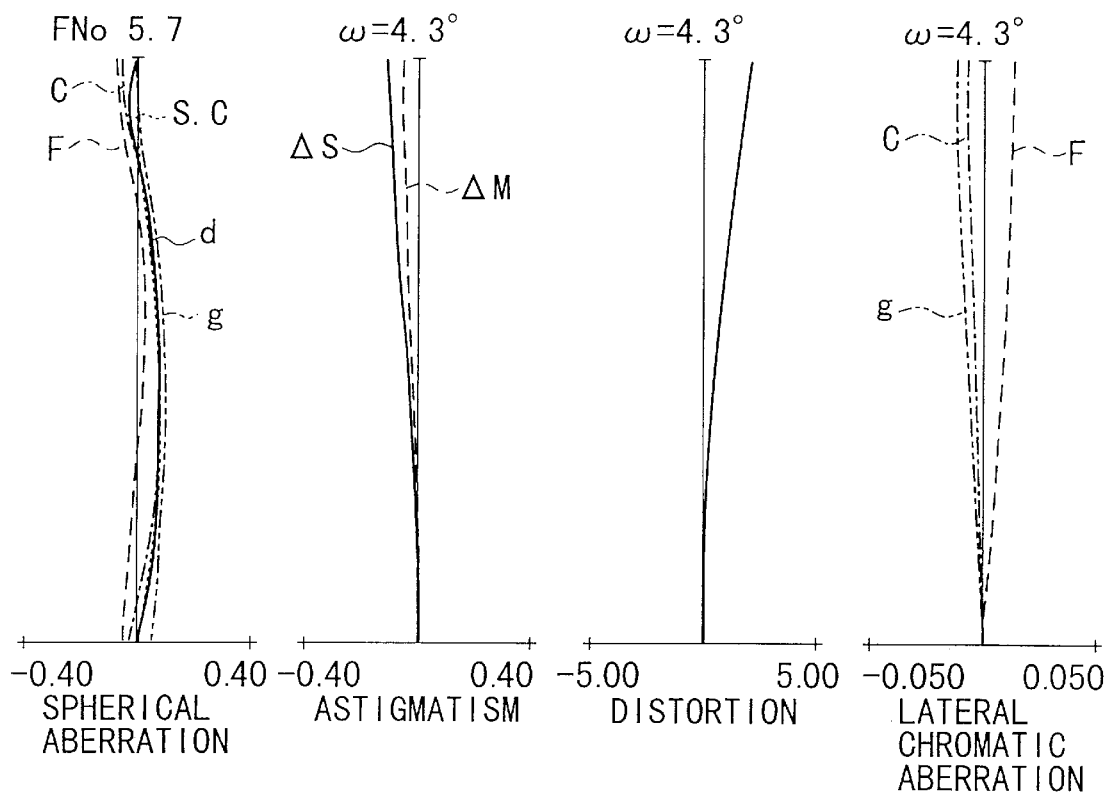
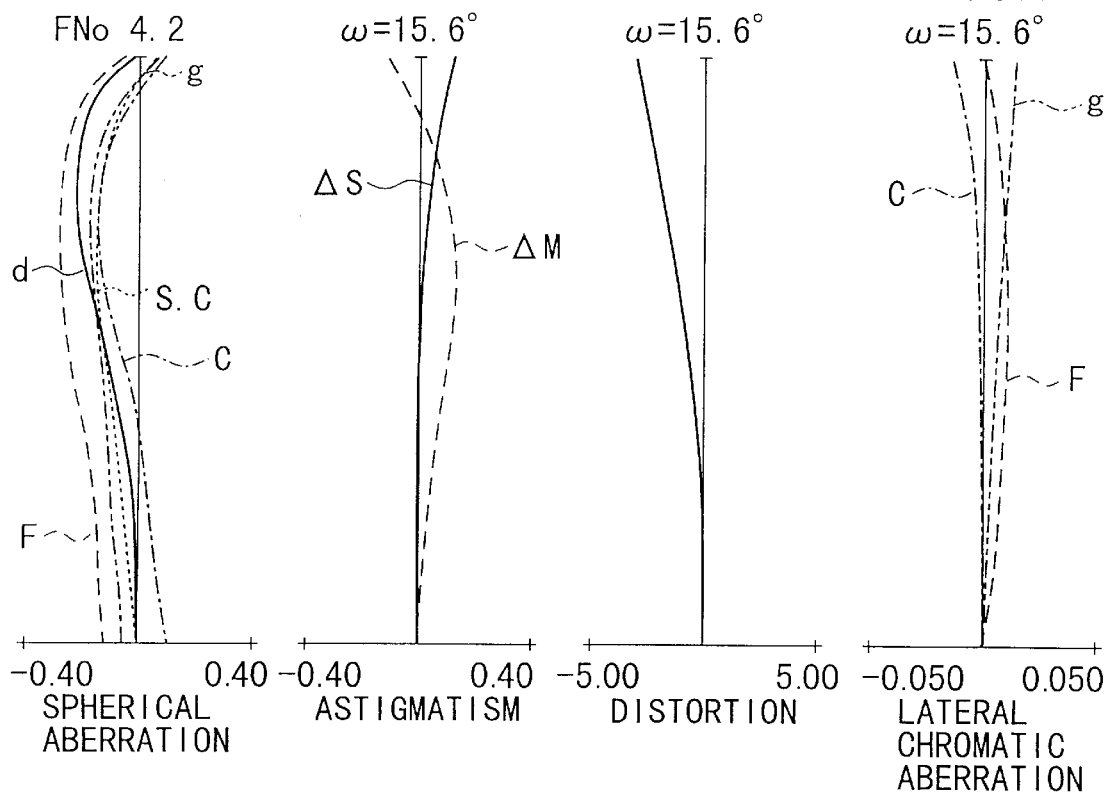

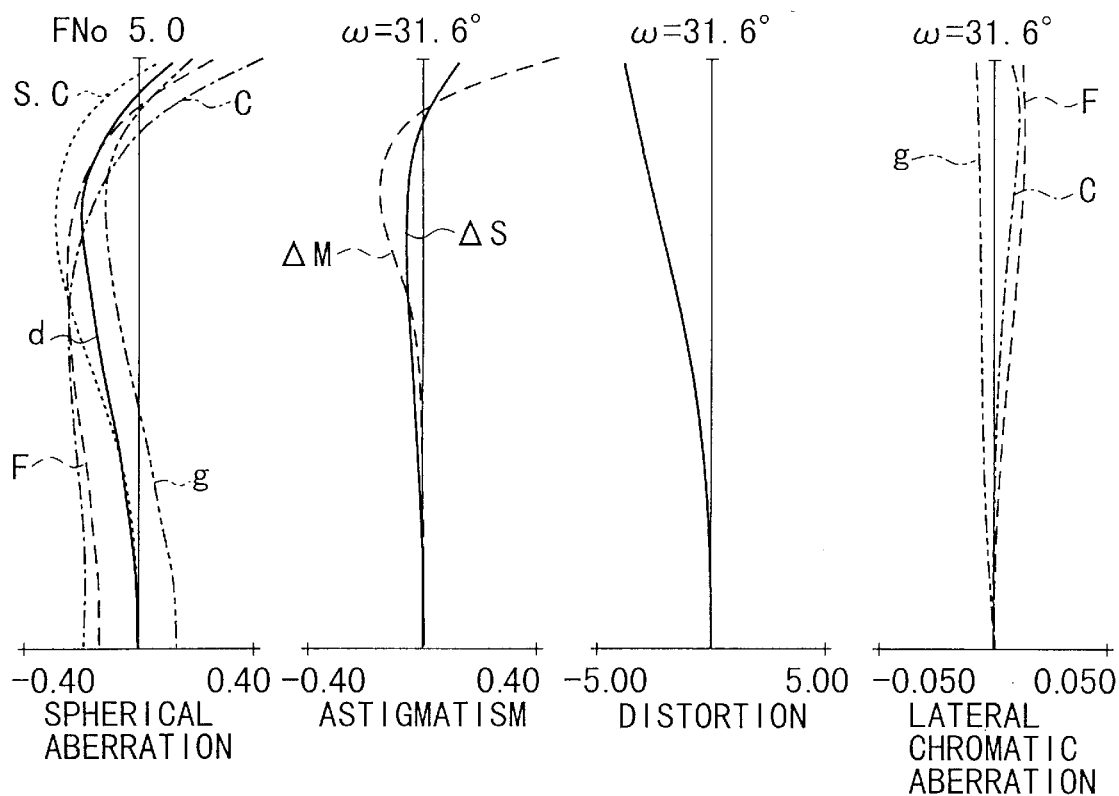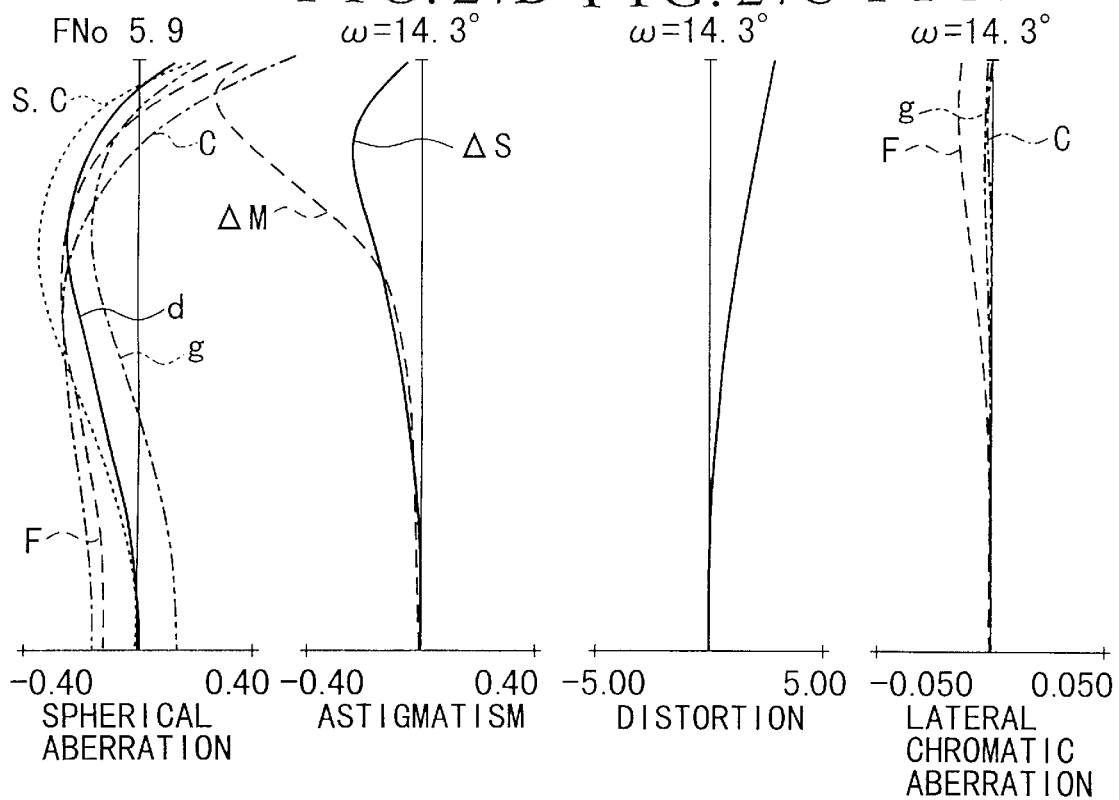

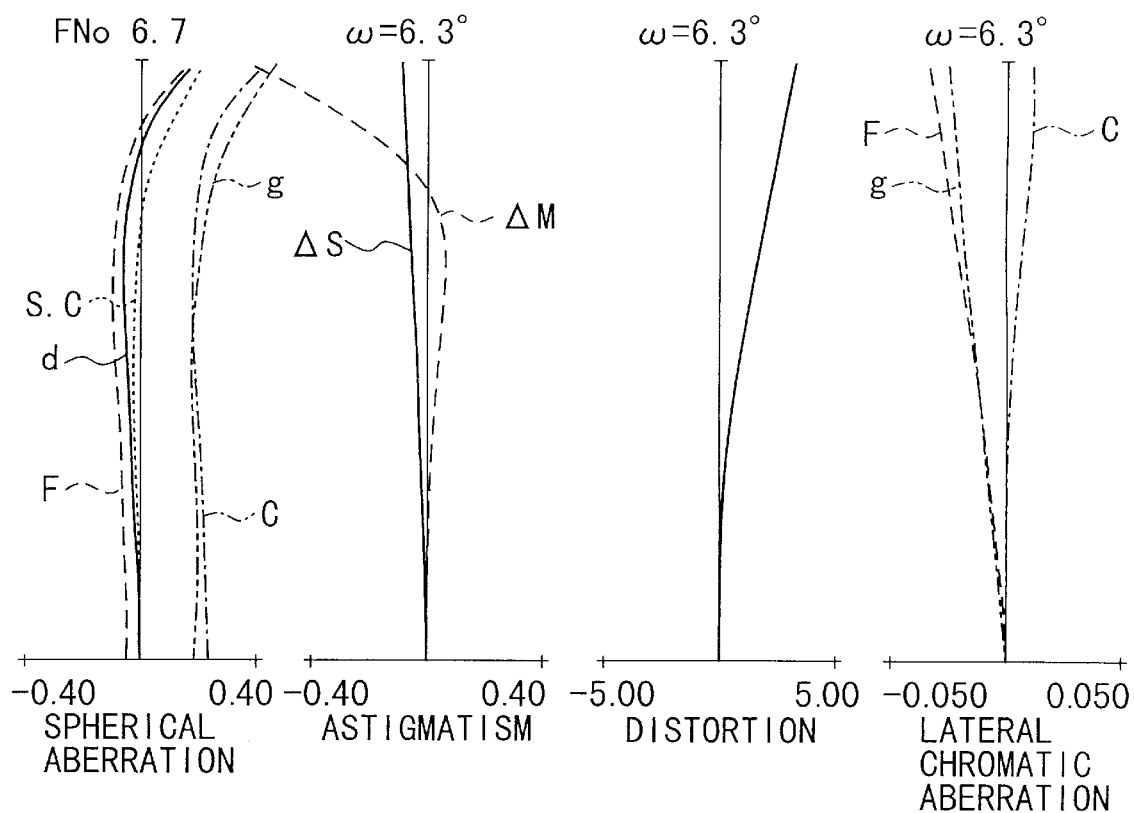

IMAGE HEIGHT Y=0     WIDE-ANGLE

IMAGE HEIGHT Y=15

IMAGE HEIGHT Y=21.635

WIDE-ANGLE

FIG. 32A   TELEPHOTO
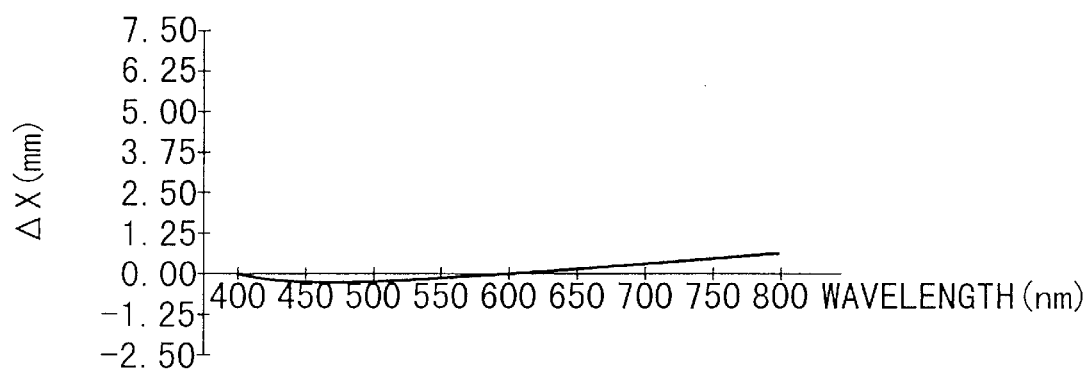
FIG. 32B
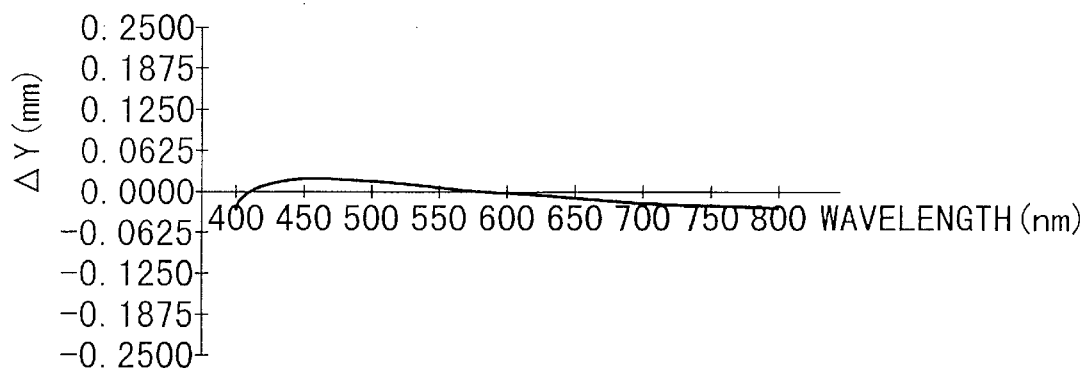
FIG. 32C
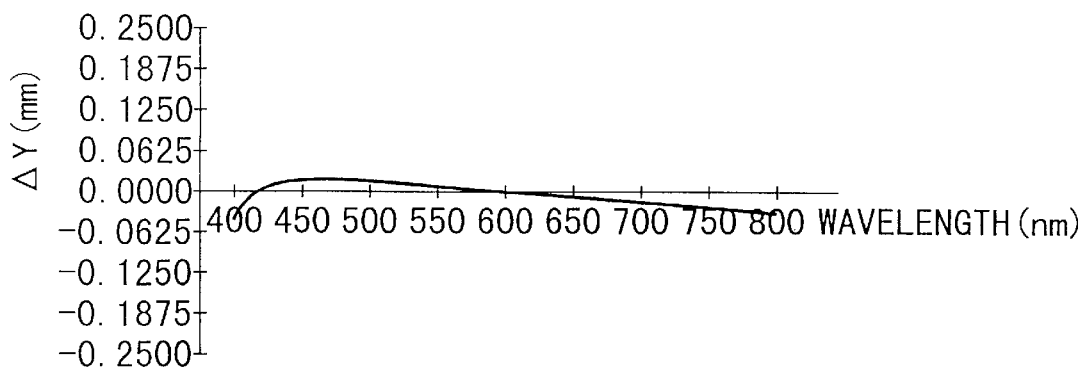

FIG. 36A TELEPHOTO
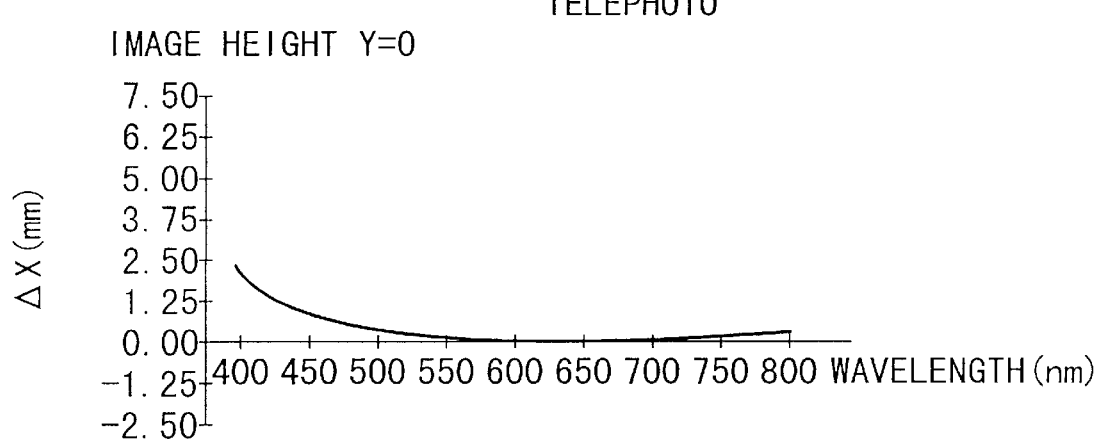
FIG. 36B
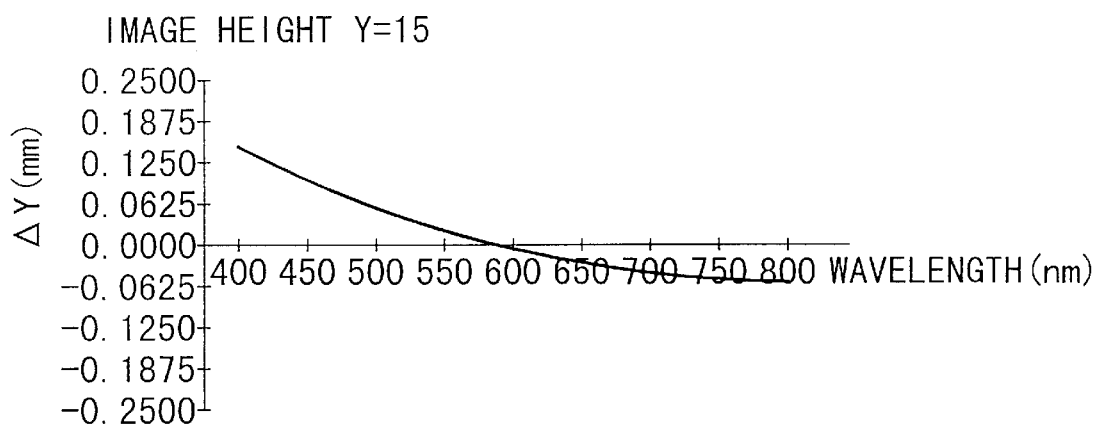
FIG. 36C
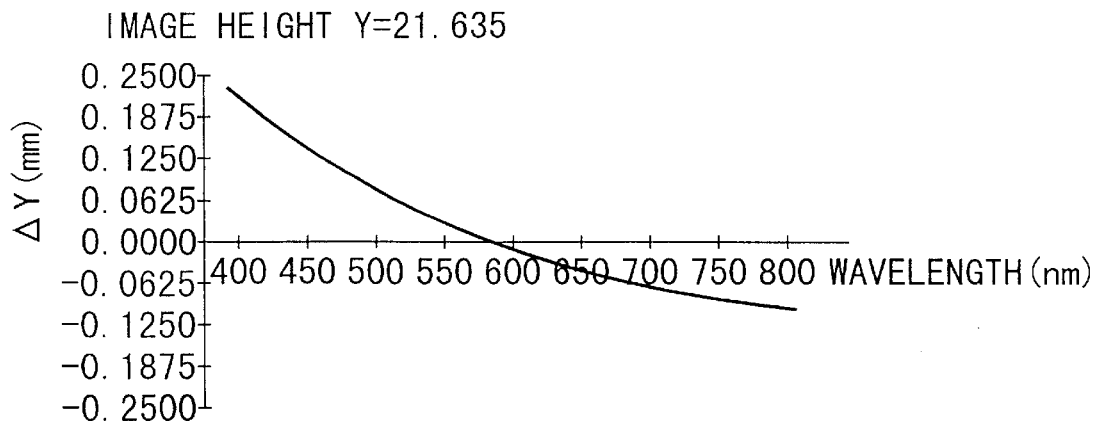

TELEPHOTO

WIDE-ANGLE
IMAGE HEIGHT Y=0

IMAGE HEIGHT Y=15

IMAGE HEIGHT Y=21.635

IMAGE HEIGHT Y=0    WIDE-ANGLE

IMAGE HEIGHT Y=15

IMAGE HEIGHT Y=21.635

IMAGE HEIGHT Y=0          WIDE-ANGLE

IMAGE HEIGHT Y=15

IMAGE HEIGHT Y=21.635

FIG. 52A   TELEPHOTO
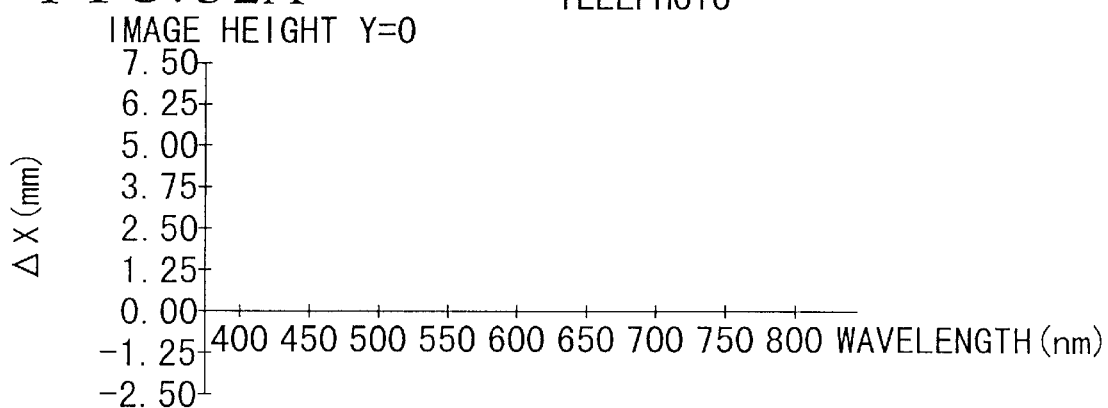
FIG. 52B
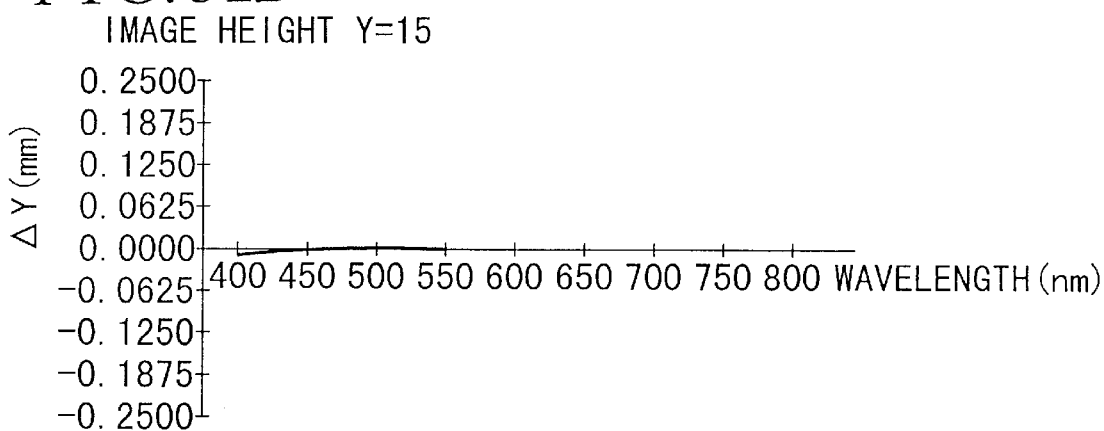
FIG. 52C
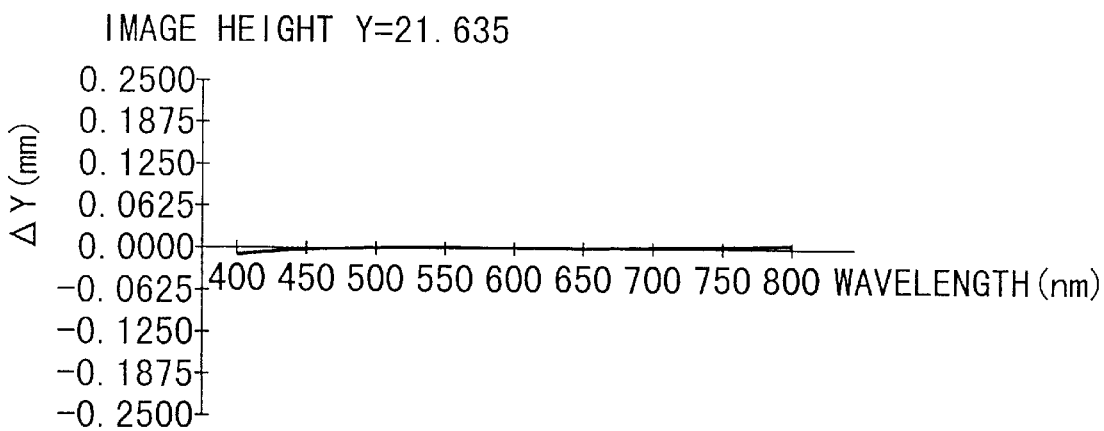

FIG. 53A  WIDE-ANGLE
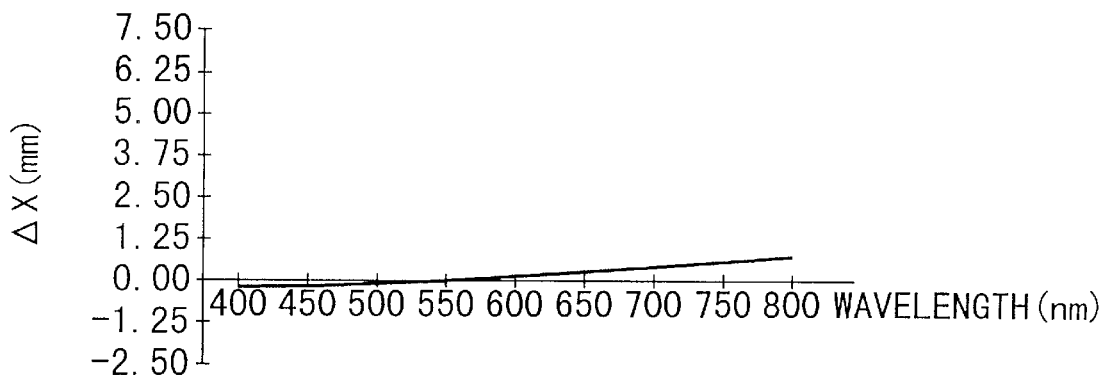
FIG. 53B
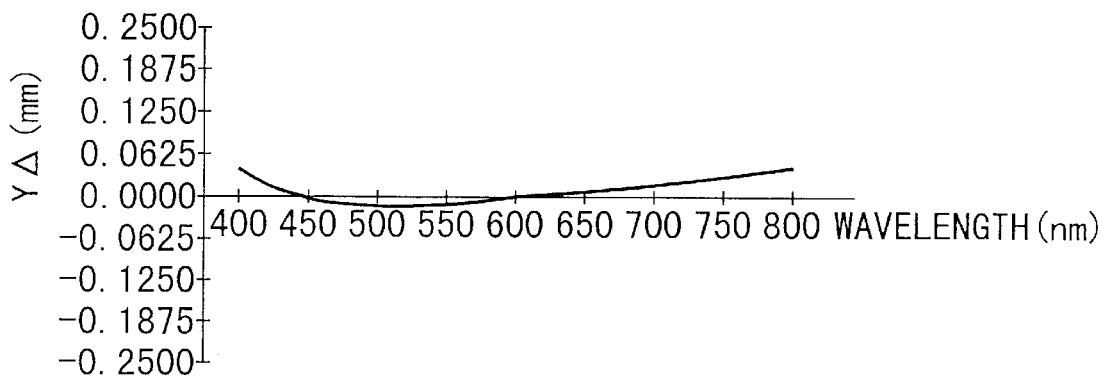
FIG. 53C
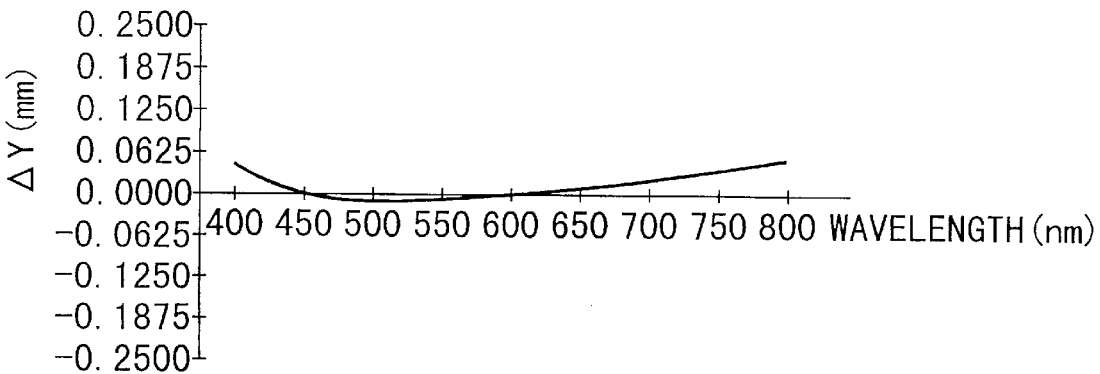

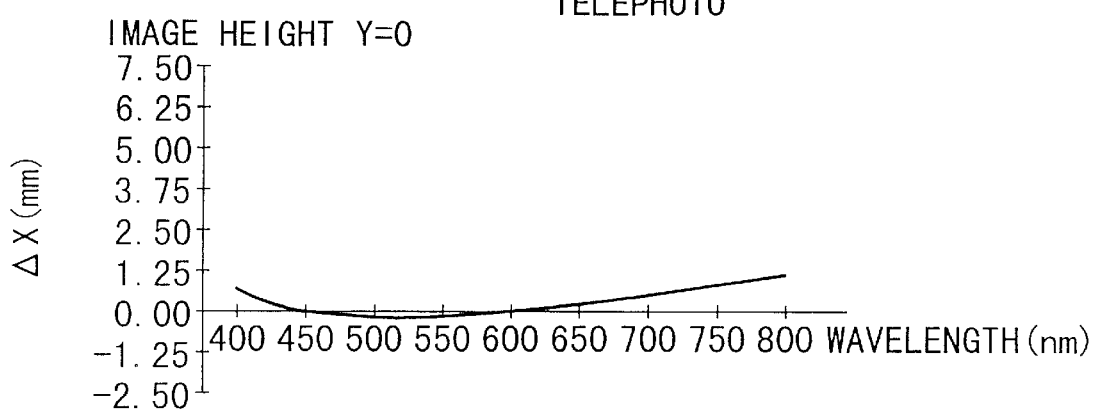
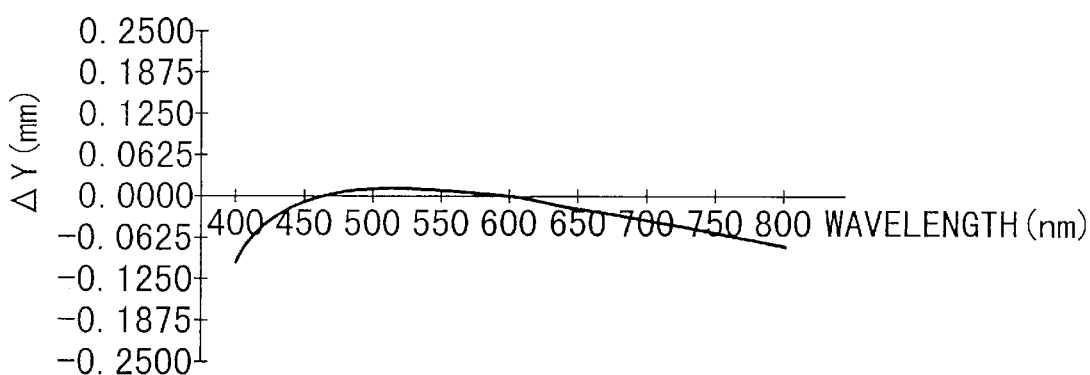
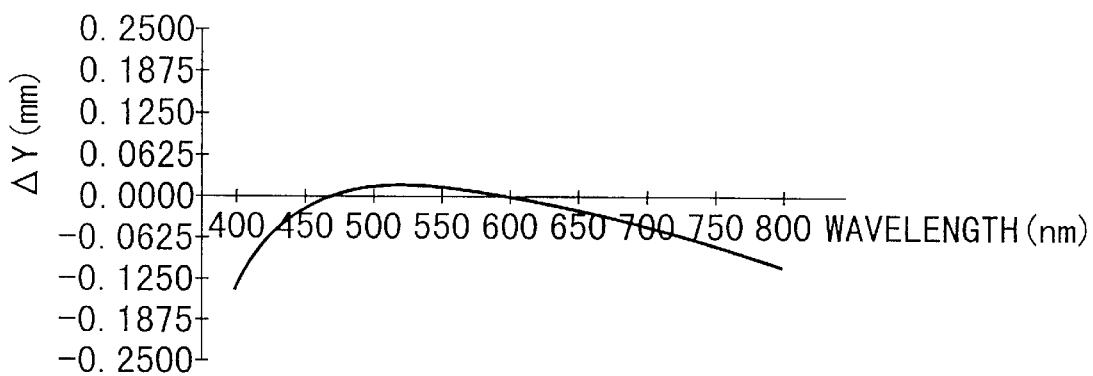

WIDE-ANGLE

FIG. 59A  WIDE-ANGLE
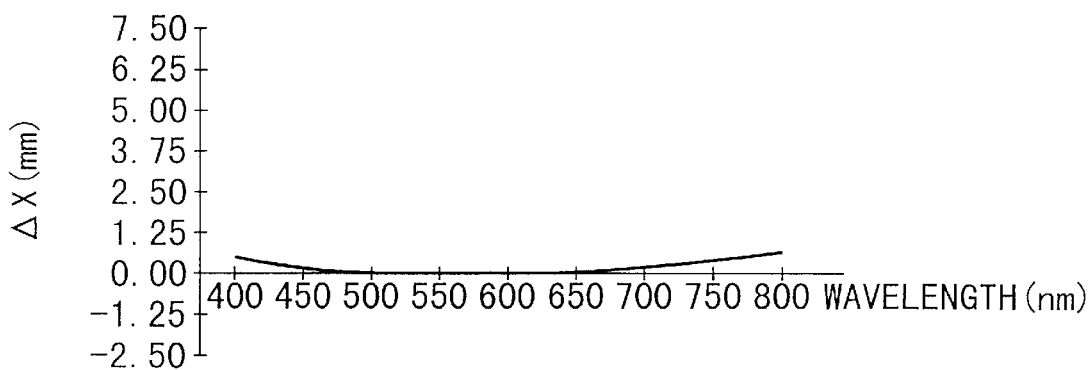
FIG. 59B
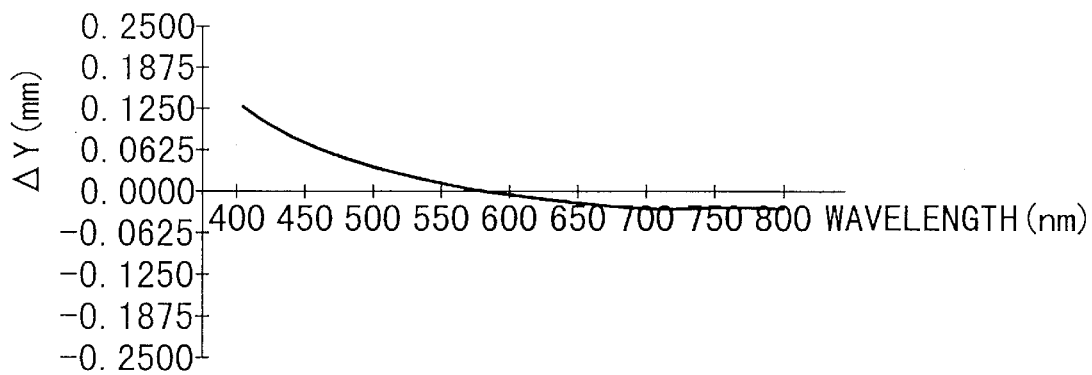
FIG. 59C
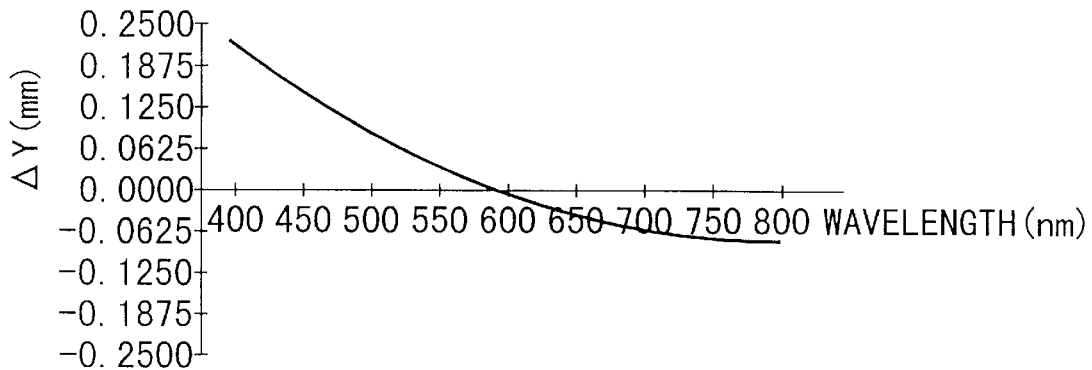

FIG. 60A  TELEPHOTO
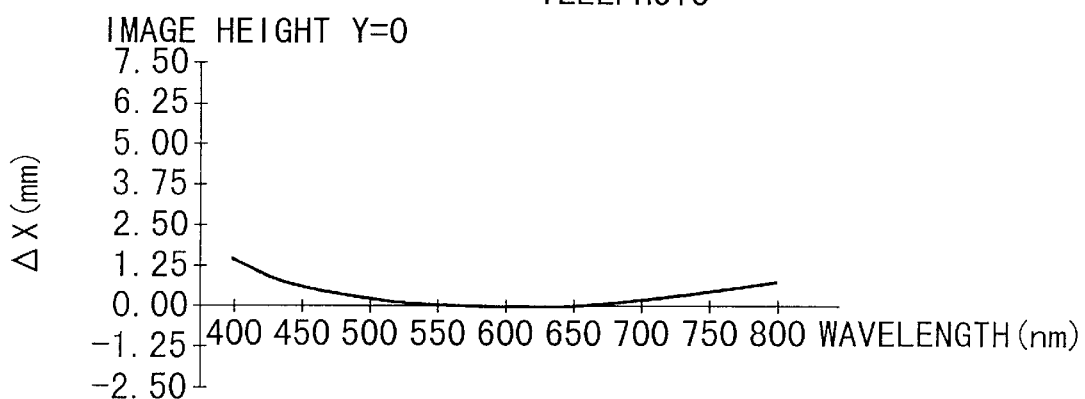
FIG. 60B
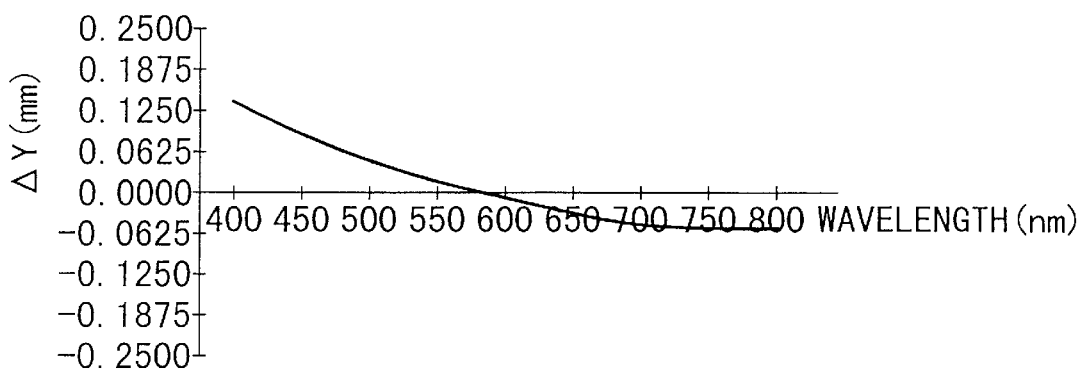
FIG. 60C
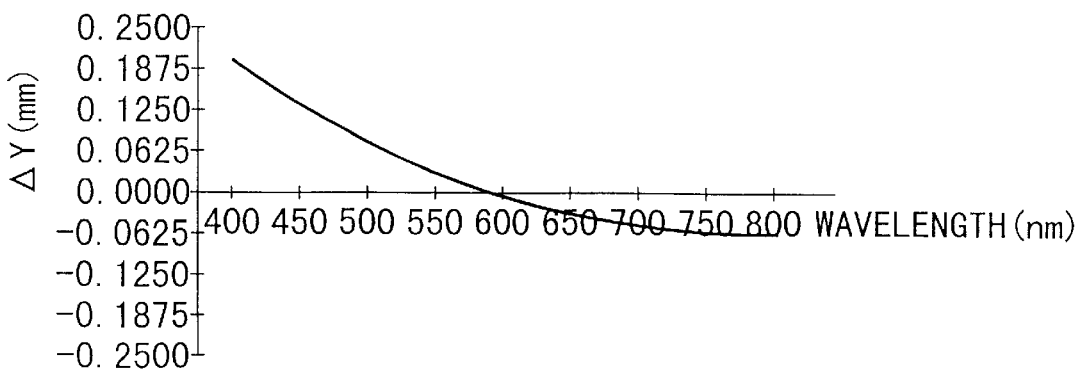

IMAGE HEIGHT Y=0        WIDE-ANGLE

IMAGE HEIGHT Y=15

IMAGE HEIGHT Y=21.635

ZOOM LENS WITH DIFFRACTIVE OPTICAL ELEMENTS

BACKGROUND OF THE INVENTION

1. Field of the Invention

The present invention relates to a zoom lens having a diffractive optical element and, more particularly, to a zoom lens of high range, while still assuring maintenance of high image quality, suited to photographic cameras, video cameras, or digital still cameras.

2. Description of Related Art

As the photographic film or CCD is ever more improved by decreasing the size of silver-halide grains or by increasing the number of pixels, there is a growing demand that the zoom lens for silver-halide film camera, video camera or digital still camera have, despite the high range, to provide pictures of ever higher quality. Recently, the production techniques of aspherical lenses and the design efforts have advanced so greatly that all the aberrations that determine the lens performance become easier to correct even in a lesser number of constituent lenses.

Concerning chromatic aberrations, however, their correction depends on the dispersion differences among colors for the glass materials of the constituent lenses and the combination of positive and negative lenses in the achromatic condition. Therefore, any improvements of the achromatism cannot be expected from the use of the aspherical lens.

Meanwhile, there has been known another method of suppressing the produced amount of chromatic aberrations to a minimum for good stability of image aberrations. So, in recent years, proposals for applying diffractive optical elements to the photographic optical system are made in, for example, Japanese Laid-Open Patent Applications No. Hei 4-213421 (U.S. Pat. No. 5,044,706) and No. Hei 6-324262. These conventional examples are concerned with monofocal lenses to which the diffractive optical element is applied. Although chromatic aberrations have been mentioned there, what is peculiar to the zoom lens, that is, the variation with zooming of aberrations is not considered or described. Hence, the application of the diffractive optical element to the zoom lens is not suggested there.

Concerning the zoom lens, there is a description about adapting the application of the diffractive optical element to the zoom lens in U.S. Pat. No. 5,268,790. In this example, what has been proposed is to arrange the diffractive optical element in the second lens unit as the main variator or in the third lens unit as the compensator. As for the first lens unit, the design is made as usual. In this form, the chromatic aberrations the first lens unit produces are left as they were. In some cases, therefore, the chromatic aberrations of the entire lens system unduly worsen at certain zooming positions.

BRIEF SUMMARY OF THE INVENTION

The present invention is concerned with a certain configuration. Under this condition, an optimum position for the diffractive optical element is found out. It is, therefore, an object of the invention to provide a zoom lens which has its chromatic aberrations prevented from worsening with zooming.

To attain the above object, in accordance with an aspect of the invention, there is provided a zoom lens, which comprises, in order from an object side, a first lens unit of positive refractive power, a second lens unit of negative refractive power, and a subsequent lens unit of positive refractive power as a whole, wherein during zooming from a wide-angle end to a telephoto end, at least the first lens unit is moved along an optical axis such that a separation between the first lens unit and the second lens unit increases, and wherein at least one diffractive optical element is provided in the first lens unit.

Further, in accordance with another aspect of the invention, there is provided a zoom lens, which comprises, in order from an object side, a first lens unit of positive refractive power, a second lens unit of negative refractive power, and a subsequent lens unit of positive refractive power as a whole, wherein during zooming from a wide-angle end to a telephoto end, at least one of the first lens unit and the second lens unit is moved along an optical axis such that a separation between the first lens unit and the second lens unit increases, and wherein at least one diffractive optical element is provided in the first lens unit, the zoom lens satisfying the following condition:

$$0.3 < |F2/Fw| < 0.75$$

where $F2$ is a focal length of the second lens unit, and $Fw$ is a focal length in the wide-angle end of the entire zoom lens.

These and further objects and features of the invention will become apparent from the following detailed description of preferred embodiments thereof taken in conjunction with the accompanying drawings.

BRIEF DESCRIPTION OF THE SEVERAL VIEWS OF THE DRAWING

FIGS. 7A to 7D are graphic representations of the aberrations of the embodiment 1 in the wide-angle end.

FIGS. 8A to 8D are graphic representations of the aberrations of the embodiment 1 in a middle focal length position.

FIGS. 9A to 9D are graphic representations of the aberrations of the embodiment 1 in the telephoto end.

FIGS. 10A to 10D are graphic representations of the aberrations of the embodiment 2 in the wide-angle end.

FIGS. 11A to 11D are graphic representations of the aberrations of the embodiment 2 in a middle focal length position.

FIGS. 12A to 12D are graphic representations of the aberrations of the embodiment 2 in the telephoto end.

FIGS. 13A to 13D are graphic representations of the aberrations of the embodiment 3 in the wide-angle end.

FIGS. 14A to 14D are graphic representations of the aberrations of the embodiment 3 in a middle focal length position.

FIGS. 15A to 15D are graphic representations of the aberrations of the embodiment 3 in the telephoto end.

FIGS. 16A to 16D are graphic representations of the aberrations of the embodiment 4 in the wide-angle end.

FIGS. 17A to 17D are graphic representations of the aberrations of the embodiment 4 in a middle focal length position.

FIGS. 18A to 18D are graphic representations of the aberrations of the embodiment 4 in the telephoto end.

FIGS. 19A to 19D are graphic representations of the aberrations of the embodiment 5 in the wide-angle end.

FIGS. 20A to 20D are graphic representations of the aberrations of the embodiment 5 in a middle focal length position.

FIGS. 21A to 21D are graphic representations of the aberrations of the embodiment 5 in the telephoto end.

FIGS. 22A to 22D are graphic representations of the aberrations of the embodiment 6 in the wide-angle end.

FIGS. 26A to 26D are graphic representations of the aberrations of the reference example in the wide-angle end.

FIGS. 27A to 27D are graphic representations of the aberrations of the reference example in a middle focal length position.

FIGS. 28A to 28D are graphic representations of the aberrations of the reference example in the telephoto end.

FIGS. 32A to 32C are graphic representations of the residual chromatic aberrations of the first lens unit of the embodiment 1 in the telephoto end.

FIGS. 36A to 36C are graphic representations of the residual chromatic aberrations of the third lens unit of the embodiment 1 in the telephoto end.

FIGS. 52A to 52C are graphic representations of the residual chromatic aberrations of the fifth lens unit of the embodiment 2 in the telephoto end.

FIGS. 53A to 53C are graphic representations of the residual chromatic aberrations of the entire optical system of the reference example in the wide-angle end.

FIGS. 54A to 54C are graphic representations of the residual chromatic aberrations of the entire optical system of the reference example in the telephoto end.

FIGS. 59A to 59C are graphic representations of the residual chromatic aberrations of the third lens unit of the reference example in the wide-angle end.

FIGS. 60A to 60C are graphic representations of the residual chromatic aberrations of the third lens unit of the reference example in the telephoto end.

DETAILED DESCRIPTION OF THE INVENTION

Figure 1:
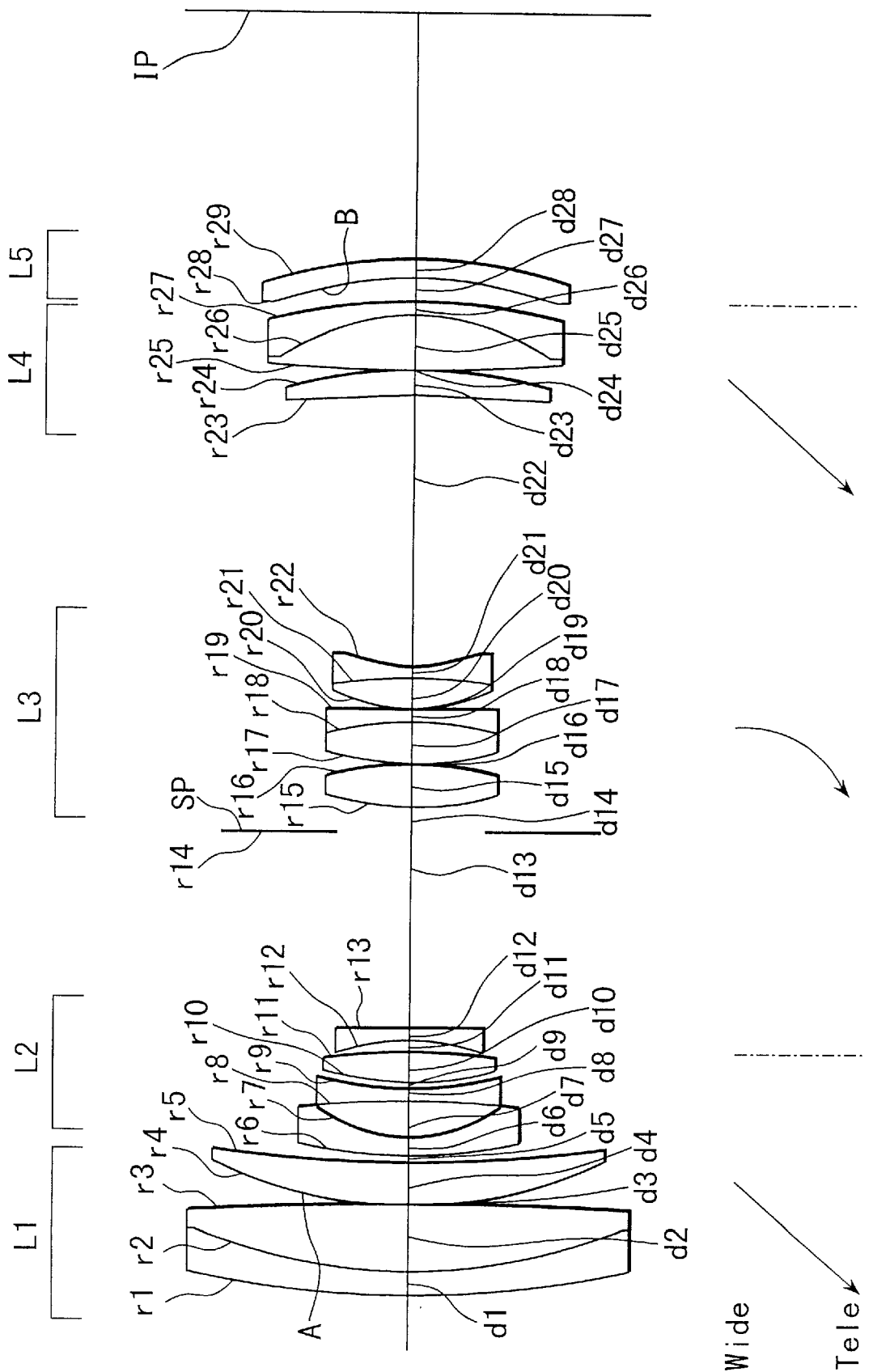
FIG. 1 is a longitudinal section view of an embodiment 1 of the zoom lens.
Figure 2:
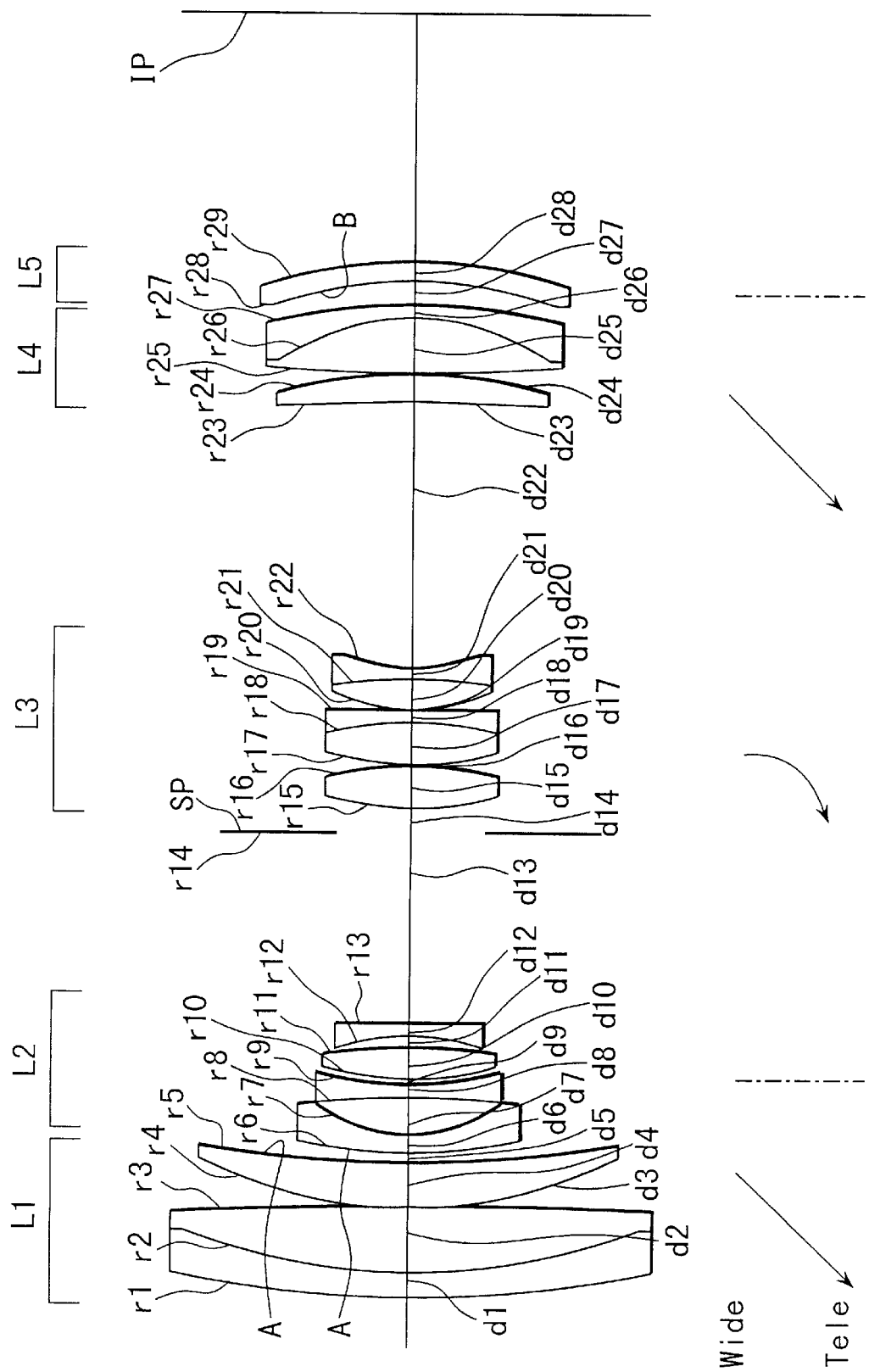
FIG. 2 is a longitudinal section view of an embodiment 2 of the zoom lens.
Figure 3:
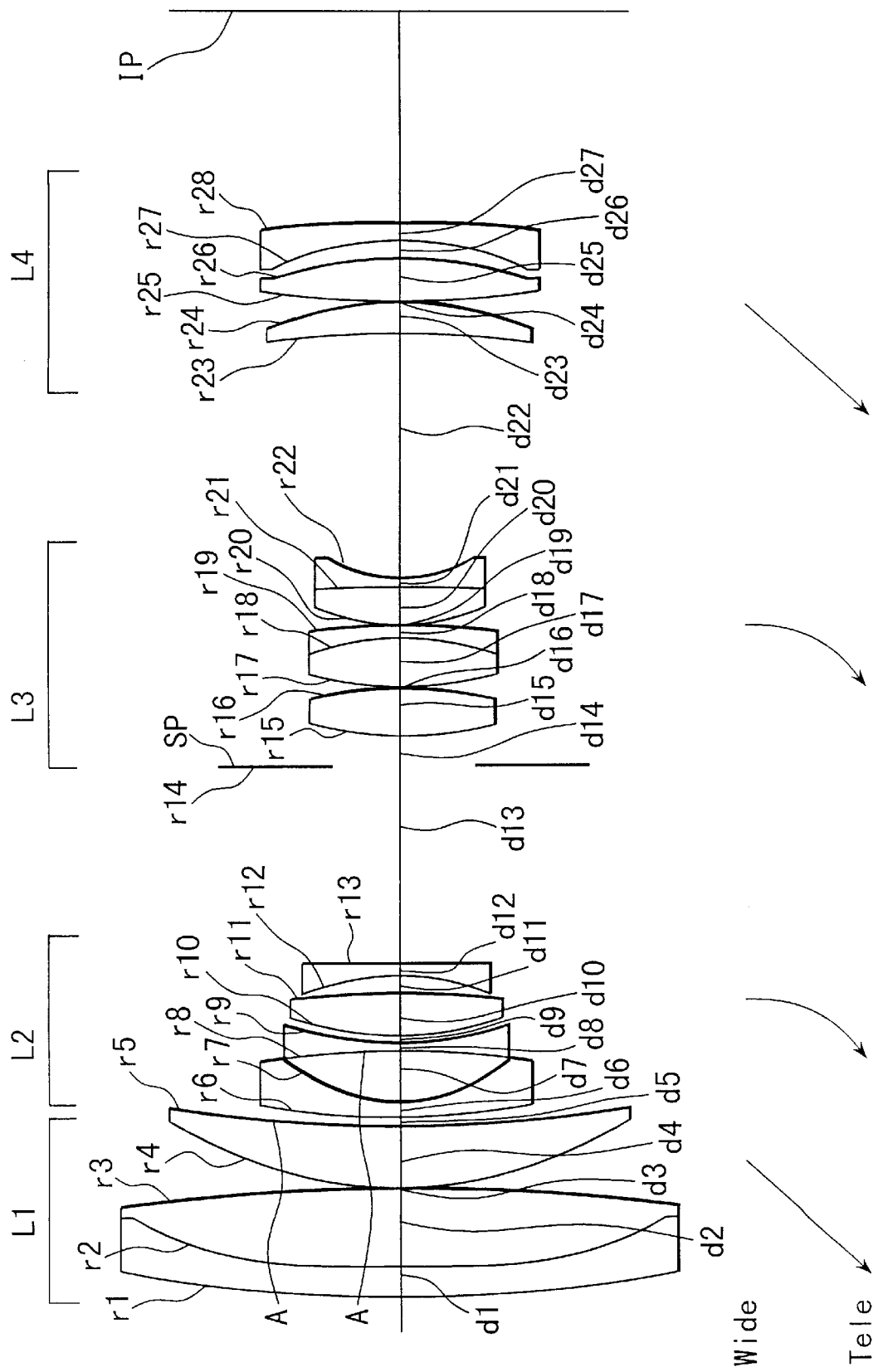
FIG. 3 is a longitudinal section view of an embodiment 3 of the zoom lens.
Figure 4:
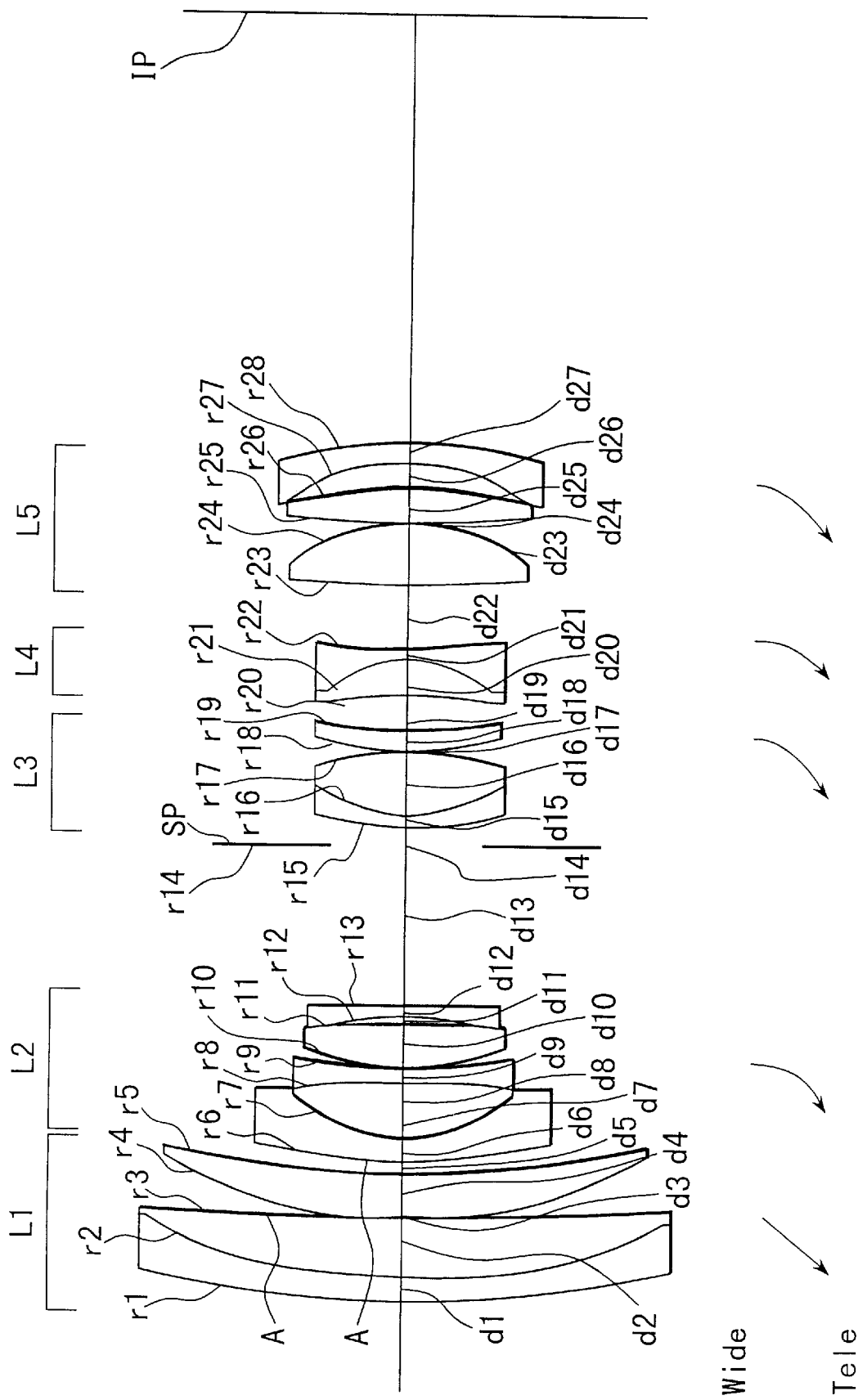
FIG. 4 is a longitudinal section view of an embodiment 4 of the zoom lens.
Figure 5:
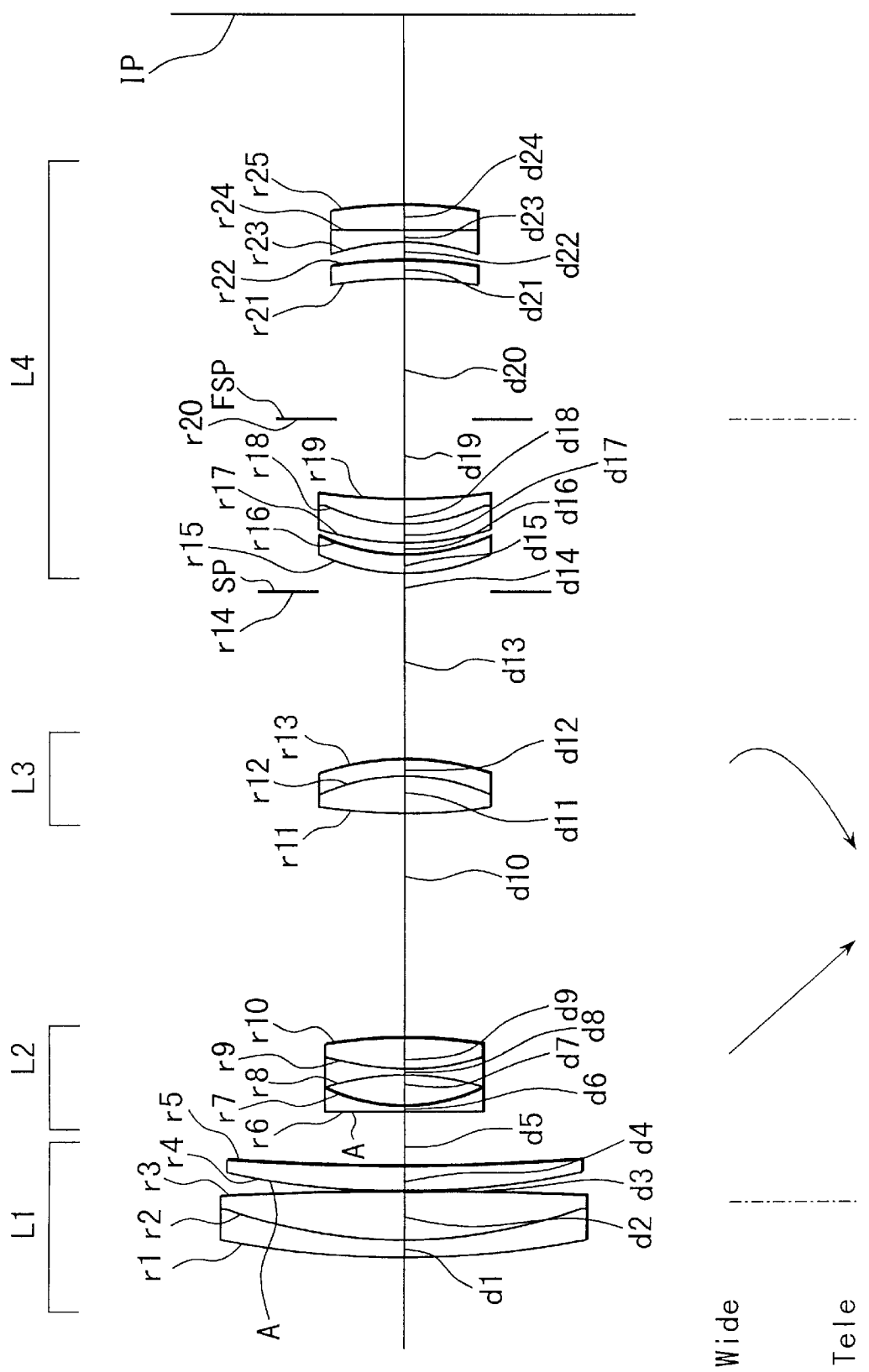
FIG. 5 is a longitudinal section view of an embodiment 5 of the zoom lens.
Figure 6:
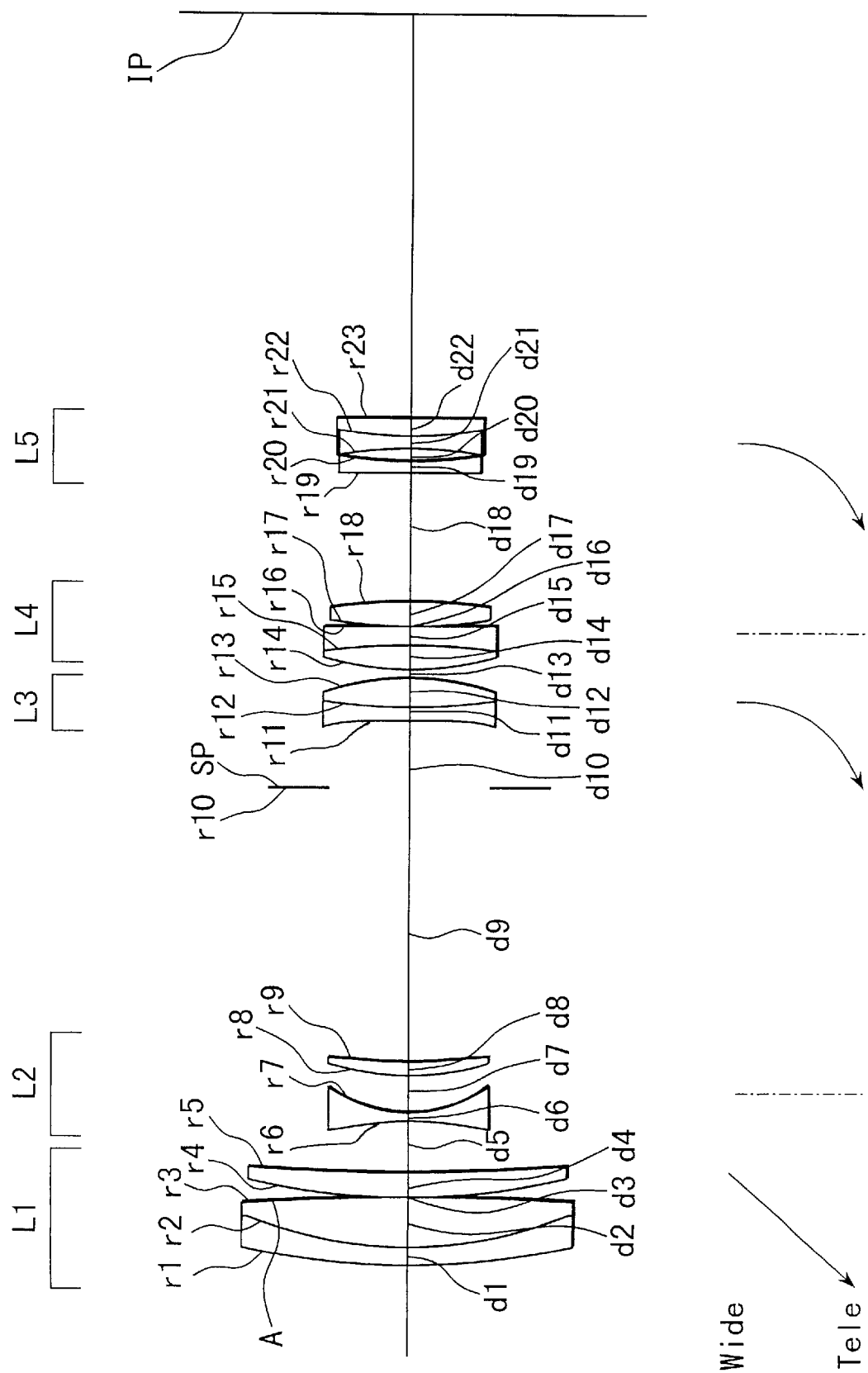
FIG. 6 is a longitudinal section view of an embodiment 6 of the zoom lens.
Figures 23A, 23B, 23C, 23D:
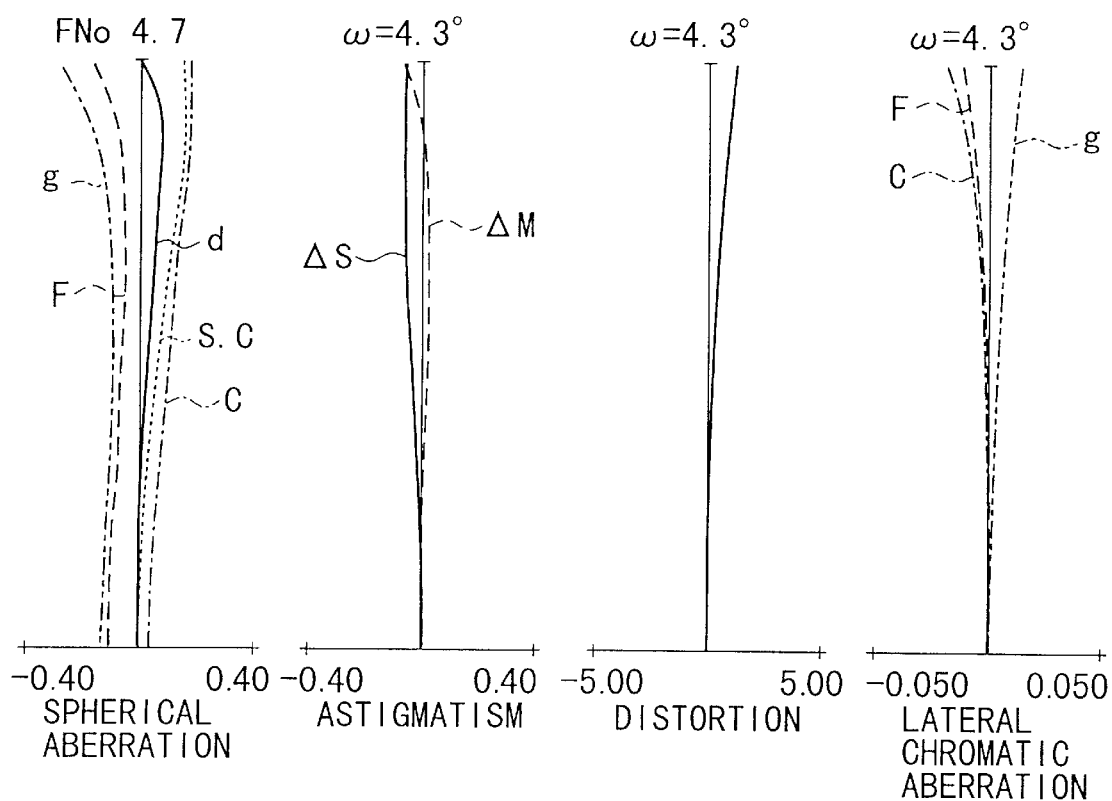
FIGS. 23A to 23D are graphic representations of the aberrations of the embodiment 6 in a middle focal length position.
Figures 24A, 24B, 24C, 24D:
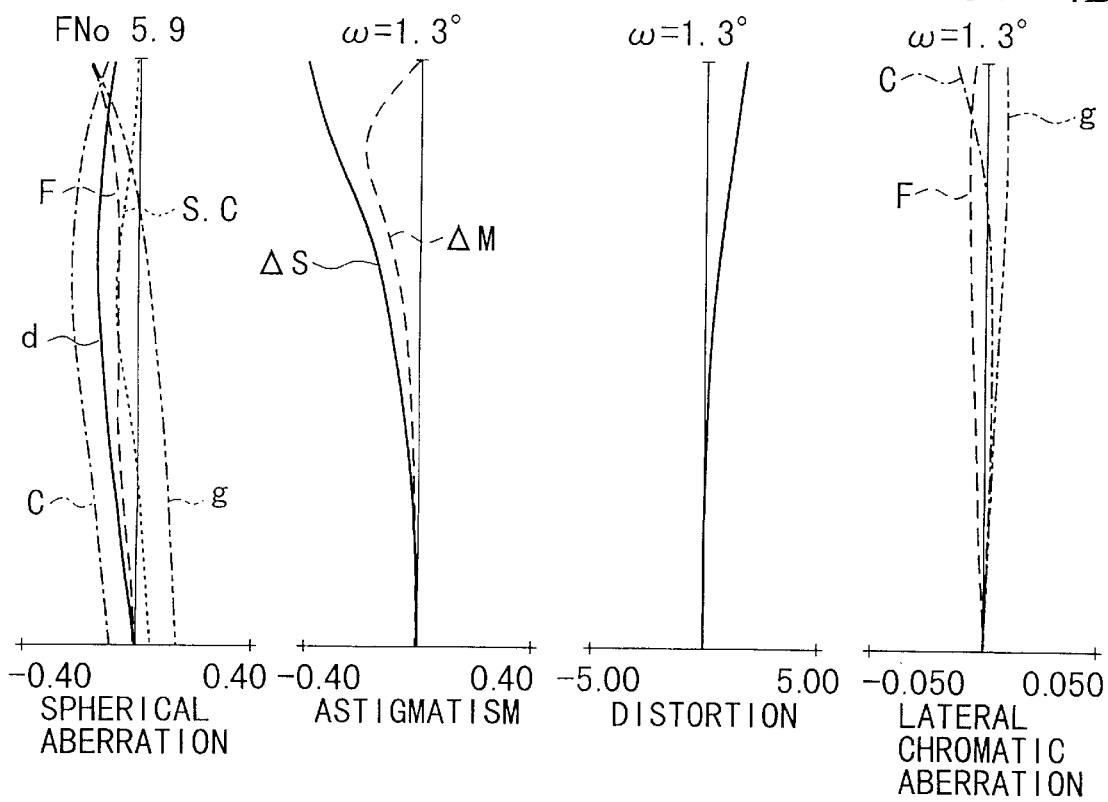
FIGS. 24A to 24D are graphic representations of the aberrations of the embodiment 6 in the telephoto end.

Hereinafter, preferred embodiments of the invention will be described in detail with reference to the drawings.

FIGS. 1 to 6 in block diagram show six embodiments of zoom lenses. The zoom lens shown in each of FIGS. 1 to 6 comprises at least three lens units, i.e., in order from an object side, a first lens unit L1 of positive refractive power, a second lens unit L2 of negative refractive power, a stop SP and a third lens unit L3 of positive refractive power which is an image forming system. In the embodiment 1 shown in FIG. 1, the zoom lens further comprises a fourth lens unit L4 of positive refractive power and a fifth lens unit L5 of negative refractive power in rear of the third lens unit L3. In the embodiment 2 shown in FIG. 2, the zoom lens further comprises a fourth lens unit L4 of positive refractive power and a fifth lens unit L5 of positive refractive power in rear of the third lens unit L3. In the embodiment 3 shown in FIG. 3, the zoom lens further comprises a fourth lens unit L4 of positive refractive power in rear of the third lens unit L3. In the embodiment 4 shown in FIG. 4, the zoom lens further comprises a fourth lens unit L4 of negative refractive power and a fifth lens unit L5 of positive refractive power in rear of the third lens unit L3. In the embodiment 5 shown in FIG. 5, the zoom lens further comprises a fourth lens unit L4 of positive refractive power in rear of the third lens unit L3. In the embodiment 6 shown in FIG. 6, the zoom lens further comprises a fourth lens unit L4 of positive refractive power and a fifth lens unit L5 of negative refractive power in rear of the third lens unit L3. Here, lens units subsequent to the second lens unit L2 (the third lens unit L3, the fourth lens unit L4, the fifth lens unit L5) are generically named "a subsequent lens unit". In each of the embodiments 1 to 6, the subsequent lens unit has a positive refractive power as a whole. In all the embodiments 1 to 6, at least the first lens unit L1 is made to move along an optical axis such that the separation between the first lens unit L1 and the second lens unit L2 increases during zooming from the wide-angle end to the telephoto end. The other lens units are selectively made movable as shown in the individual figures with the arrows indicating the directions of movement as zooming goes from the wide-angle end to the telephoto end. Those lens units which are associated with a dot-and-dash line remain stationary during zooming. Incidentally, IP stands for an image plane. Further, each of the embodiments 1 to 6 is provided with a diffractive optical element at a surface indicated by reference character "A". Another surface indicated by reference character "B" in the embodiments 1 and 2 is an aspherical surface.

In the above zoom lens optical system, to keep hold of balance between the good correction of all aberrations and the size of the optical system, it is preferred to satisfy the following condition:

$$0.3 < |F2/Fw| < 0.75 \qquad (1)$$

where F2 is the focal length of the second lens unit L2, and Fw is the focal length in the wide-angle end of the entire optical system.

When the upper limit of the condition (1) is exceeded, as this means that the refractive power of the second lens unit L2 is too weak, the required amount of relative movement for a certain zoom ratio of the first or second lens unit L1 or L2 increases unduly greatly, causing the optical system to become longer and bulkier. Conversely, when the lower limit of the condition (1) is exceeded, spherical aberrations of higher orders and coma are produced to a large amount in the second lens unit L2, which become difficult to correct by any design of the other lens units including the diffractive optical element.

To facilitate the improvement of the optical performance, it is preferred to alter the numerical range of the condition (1) as follows:

$$0.35 < |F2/Fw| < 0.65 \qquad (11)$$

In this connection, it is to be noted that, if either one of the first and second lens units L1 and L2 is made axially stationary during zooming, the operating mechanism can be simplified in structure.

Another feature is that the first and second lens units L1 and L2 each have at least one positive lens and at least one negative lens. Particularly for a high range zoom lens, this feature is favorable to achieve a good optical performance. Suppose any one of the first and second lens units L1 and L2 is constructed with either a single lens or a plurality of lenses whose refractive powers are of the same sign, then the refractive optical system gets a "curvature in the secondary spectrum curve", which cannot be corrected by the diffractive optical system. To correct its residual chromatic aberrations well, the other lens units must be appropriately designed. However, this is difficult to do.

It is then desired that the ratio of the focal lengths F1 and F2 of the first and second lens units L1 and L2 satisfies the following condition (2):

$$0.2 < |F2/F1| < 0.7 \qquad (2)$$

When the upper limit of the condition (2) is exceeded, as this means that the refracting action of the second lens unit L2 is too weak, the total zooming movement increases to increase the total length and diameter of the entire lens system objectionably. On the other hand, when the lower limit is exceeded, too large a refracting action of the second lens unit L2 results in production of axial aberrations of higher orders, which are difficult to correct.

In the first lens unit L1, there is provided at least one diffractive optical element having a diffractive optical surface of revolution symmetry with respect to the optical axis. As this diffractive optical element has an effect of correcting chromatic aberrations, it is made easier to correct the variation with zooming of chromatic aberrations.

Even to the second lens unit L2, another diffractive optical element may be introduced to thereby further improve the chromatic aberrations.

In the diffractive optical surface of revolution symmetry, letting its phase coefficients be denoted by C(2i), the phase $\phi(H)$ at a distance H from the optical axis is expressed by the following equation:

$$\phi(H) = (2\pi \cdot m/\lambda) \cdot (C2 \cdot C4 \cdot H^4 + C6 \cdot H^6 + \ldots C(2i) \cdot H^{(2i)})$$

where $\lambda$ is the reference wavelength (spectral d-line), and m is the diffraction order.

In general, the Abbe number (reciprocal dispersive power) $\nu d$ of the refractive optical system is expressed by the following formula:

$$\nu d = (Nd-1)/(NF-NC) > 0$$

where Nd, NC and NF are the refractive indices for the wavelengths of the spectral d-line, C-line and F-line, respectively.

Meanwhile, the Abbe number $\nu d$ of the diffractive optical element is expressed by the following formula:

$$\nu d = \lambda d/(\lambda F - \lambda C)$$

where $\nu d$, $\nu C$ and $\nu F$ are the wavelengths of the spectral d-line, C-line and F-line, respectively. It takes a value of $\nu d = -3.453$, exhibiting that, for any wavelengths, the dispersion has a reverse action to that of the refractive optical system.

The optical power $\psi$ of the diffractive optical element with the diffracted light in the first order (m=1) at the reference wavelength is expressed from the above-described equation for the phase of the diffractive optical surface as:

$$\psi = -2 \cdot C2$$

where C2 is the coefficient for the term in the second degree.

Further, the optical power for an arbitrary wavelength $\lambda$ changes from that for the reference wavelength $\lambda_0$ by an amount $\Delta \psi$ expressed as follows:

$$\Delta \psi = (\lambda/\lambda_0) \cdot (-2 \cdot C2)$$

It will be appreciated from the foregoing that, as a characteristic feature of the diffractive optical system, change of the phase coefficient C2 of the equation described before causes change of the weak paraxial optical power, from which a large dispersive power can be obtained. This implies that chromatic aberrations can be corrected without giving no large influence to the other aberrations.

Also, the phase coefficients for the terms of equal or higher orders to or than that of the C4 appear as a change of the optical power for the changed height of incidence of light on the diffractive optical surface. An analogous effect to that of the aspheric surface can thus be obtained. Since, at the same time, the change of the height of incidence of light is translated to a change of the optical power for any given wavelength from that for the reference wavelength, lateral chromatic aberration is corrected advantageously.

As is also understandable from the equation described before, it is in the diffractive optical system that the change of the optical power in any wavelengths takes a proportional relationship with the wavelength. However, in the refractive optical element like the ordinary lens, because the dispersion differs with different wavelengths, the change of the refractive power in any wavelengths does not fall in the proportional relationship with the wavelength. So, a non-linear relationship, that is, "a curvature of the secondary spectrum curve" results. In addition, this leads to the fact that the greater the produced amount of chromatic aberrations by the lens units, the more non-linear the relationship tends to become. Even if a great number of lens elements are used, the difficulty of bringing about the proportional relationship is not so much diminished.

In the embodiments of the invention, to correct chromatic aberrations well, it is of great importance to optimize the value of the phase coefficient of the diffractive optical surface. Particularly, for a diffractive optical element disposed in the first lens unit L1, letting the phase coefficient for the term in the second degree that determines the optical power in the paraxial region of the diffractive optical surface of the diffractive optical element be denoted by C2, and the focal length of the first lens unit L1 be denoted by F1, it is desirable that the diffractive optical surface (in a case where a plurality of diffractive optical surfaces are present in one lens unit, at least one of them) satisfies the following condition:

$$1 \times 10^{-9} < |C2/F1| < 5 \times 10^{-6} \qquad (3)$$

The factor in the condition (3) represents the ratio of the optical power of the diffractive optical element to the refractive power of the first lens unit L1. When the upper limit is exceeded, the diffractive optical element produces too strong an effect of correcting colors and, as, at the same time, the pitches of the grating in the marginal region of the diffractive surface get finer, a disadvantage of making severer the tolerances in manufacturing them is added. When the lower limit is exceeded, the diffractive optical element produces a weak effect of correcting chromatic aberrations. So, these violations are objectionable.

Further, although, in the embodiments of the invention, the diffraction grating of revolution symmetry is formed on the spherical surface as the diffractive optical surface, the base surface for the diffractive optical surface may be of asphere or free curvature. If so, more improvements of the optical performance can be expected.

Next, six numerical examples 1 to 6 corresponding to the embodiments 1 to 6 are shown. In the numerical data for these examples, ri is the radius of curvature of the i-th lens surface, when counted from the object side, di is the i-th lens thickness or air separation, when counted from the object side, and ni and vi are respectively the refractive index and Abbe number of the material of the i-th lens element, when counted from the object side.

The axial deviation X of an aspheric surface from the vertex of the lens in terms of the distance H from the optical axis is given by the following equation:

$$X = \frac{(H^2/R)}{1 + \sqrt{1-(1+K)(H/R)^2}} + A \cdot H^2 + B \cdot H^4 + C \cdot H^6 + D \cdot H^8 + E \cdot H^{10}$$

where R is the radius of the osculating sphere, and K, A, B, C, D and E are the aspheric coefficients.

NUMERICAL EXAMPLE 1

| \multicolumn{4}{c}{f = 35.63~195.03  Fno = 5.23~6.70  2ω = 62.5~12.7} |

| | | | |
|---|---|---|---|
| r1 = 130.941 | d1 = 2.10 | n1 = 1.846660 | ν1 = 23.8 |
| r2 = 60.577 | d2 = 5.90 | n2 = 1.603112 | ν2 = 60.6 |
| r3 = −359.606 | d3 = 0.12 | | |
| r4 = 43.305 | d4 = 4.00 | n3 = 1.696797 | ν3 = 55.5 |
| *r5 = 129.878 | d5 = Variable | | |
| r6 = 91.638 | d6 = 1.20 | n4 = 1.804000 | ν4 = 46.6 |
| r7 = 13.613 | d7 = 3.94 | | |
| r8 = −46.470 | d8 = 1.10 | n5 = 1.772499 | ν5 = 49.6 |
| r9 = 43.443 | d9 = 0.50 | | |
| r10 = 24.686 | d10 = 3.30 | n6 = 1.846660 | ν6 = 23.8 |
| r11 = −60.095 | d11 = 1.14 | | |
| r12 = −24.810 | d12 = 1.00 | n7 = 1.772499 | ν7 = 49.6 |
| r13 = 6419.328 | d13 = Variable | | |
| r14 = Stop | d14 = Variable | | |
| r15 = 28.668 | d15 = 3.90 | n8 = 1.516330 | ν8 = 64.1 |
| r16 = −36.134 | d16 = 0.20 | | |
| r17 = 35.992 | d17 = 3.90 | n9 = 1.516330 | ν9 = 64.1 |
| r18 = −22.614 | d18 = 1.00 | n10 = 1.834000 | ν10 = 37.2 |
| r19 = −187.201 | d19 = 0.20 | | |
| r20 = 19.974 | d20 = 3.10 | n11 = 1.518229 | ν11 = 58.9 |
| r21 = −97.867 | d21 = 0.90 | n12 = 1.743198 | ν12 = 49.3 |
| r22 = 17.663 | d22 = Variable | | |
| r23 = −457.889 | d23 = 2.80 | n13 = 1.517417 | ν13 = 52.4 |
| r24 = −48.323 | d24 = 0.20 | | |
| r25 = 189.733 | d25 = 5.28 | n14 = 1.518229 | ν14 = 58.9 |
| r26 = −24.878 | d26 = 1.40 | n15 = 1.834000 | ν15 = 37.2 |
| r27 = −56.826 | d27 = Variable | | |
| *r28 = −48.186 | d28 = 2.00 | n16 = 1.491710 | ν16 = 57.4 |
| r29 = −51.362 | | | |

| variable | \multicolumn{3}{c}{Focal Length} | | |
|---|---|---|---|
| Separation | 35.63 | 86.61 | 195.03 |
| d5 | 1.05 | 21.40 | 33.40 |
| d13 | 18.21 | 4.82 | 0.88 |
| d22 | 24.40 | 13.90 | 13.28 |
| d27 | 2.00 | 21.27 | 31.31 |

Aspheric Coefficients:

r28: $K = 1.64567 \cdot 10^{-1}$  $A = 0$  $B = -8.19352 \cdot 10^{-7}$
$C = 1.93598 \cdot 10^{-8}$  $D = 9.45641 \cdot 10^{-12}$  $E = -3.67904 \cdot 10^{-14}$ Phase Coefficients:

r5: $C_2 = -9.23077 \cdot 10^{-5}$  $C_4 = -5.42732 \cdot 10^{-9}$
$C_6 = 5.43928 \cdot 10^{-11}$  $C_8 = -6.20366 \cdot 10^{-14}$

NUMERICAL EXAMPLE 2

| \multicolumn{4}{c}{f = 35.05~195.43  Fno = 5.23~6.70  2ω = 63.4~12.6} |

| | | | |
|---|---|---|---|
| r1 = 129.308 | d1 = 2.10 | n1 = 1.846660 | ν1 = 23.8 |
| r2 = 60.701 | d2 = 5.90 | n2 = 1.603112 | ν2 = 60.6 |
| r3 = −341.908 | d3 = 0.12 | | |
| r4 = 43.281 | d4 = 4.00 | n3 = 1.696797 | ν3 = 55.5 |
| *r5 = 126.917 | d5 = Variable | | |
| *r6 = 77.217 | d6 = 1.20 | n4 = 1.804000 | ν4 = 46.6 |
| r7 = 13.757 | d7 = 3.76 | | |
| r8 = −44.494 | d8 = 1.10 | n5 = 1.772499 | ν5 = 49.6 |
| r9 = 43.504 | d9 = 0.50 | | |
| r10 = 24.591 | d10 = 3.30 | n6 = 1.846660 | ν6 = 23.8 |
| r11 = −66.121 | d11 = 1.05 | | |
| r12 = −24.024 | d12 = 1.00 | n7 = 1.772499 | ν7 = 49.6 |
| r13 = 1871.178 | d13 = Variable | | |
| r14 = Stop | d14 = Variable | | |
| r15 = 28.859 | d15 = 3.90 | n8 = 1.516330 | ν8 = 64.1 |
| r16 = −35.790 | d16 = 0.20 | | |
| r17 = 35.819 | d17 = 3.90 | n9 = 1.516330 | ν9 = 64.1 |
| r18 = −22.475 | d18 = 1.00 | n10 = 1.834000 | ν10 = 37.2 |
| r19 = −184.243 | d19 = 0.20 | | |
| r20 = 19.962 | d20 = 3.10 | n11 = 1.518229 | ν11 = 58.9 |
| r21 = −95.632 | d21 = 0.90 | n12 = 1.743198 | ν12 = 49.3 |
| r22 = 17.585 | d22 = Variable | | |
| r23 = −586.989 | d23 = 2.80 | n13 = 1.517417 | ν13 = 52.4 |
| r24 = −49.206 | d24 = 0.20 | | |
| r25 = 198.691 | d25 = 5.30 | n14 = 1.518229 | ν14 = 58.9 |
| r26 = −25.739 | d26 = 1.40 | n15 = 1.834000 | ν15 = 37.2 |
| r27 = −57.857 | d27 = Variable | | |
| *r28 = −47.303 | d28 = 2.00 | n16 = 1.491710 | ν16 = 57.4 |
| r29 = −45.981 | | | |

| variable | \multicolumn{3}{c}{Focal Length} | | |
|---|---|---|---|
| Separation | 35.05 | 85.38 | 195.43 |
| d5 | 1.33 | 21.66 | 33.68 |
| d13 | 18.13 | 4.93 | 1.13 |
| d22 | 24.52 | 13.63 | 13.05 |
| d27 | 2.00 | 21.14 | 31.10 |

Aspheric Coefficients:

r28: $K = 1.64567 \cdot 10^{-1}$  $A = 0$  $B = -8.19352 \cdot 10^{-7}$
$C = 1.93598 \cdot 10^{-9}$  $D = 9.45641 \cdot 10^{-12}$  $E = -3.67904 \cdot 10^{-14}$ Phase Coefficients:

r5: $C_2 = -1.03345 \cdot 10^{-4}$  $C_4 = 1.08482 \cdot 10^{-8}$
$C_6 = -1.31192 \cdot 10^{-11}$  $C_8 = 2.75364 \cdot 10^{-14}$
r6: $C_2 = 1.69785 \cdot 10^{-4}$  $C_4 = 4.59640 \cdot 10^{-7}$
$C_6 = 2.31925 \cdot 10^{-9}$  $C_8 = -6.89863 \cdot 10^{-12}$

NUMERICAL EXAMPLE 3

| \multicolumn{4}{c}{f = 35.00~207.07  Fno = 4.86~6.70  2ω = 63.4~11.9} |

| | | | |
|---|---|---|---|
| r1 = 144.449 | d1 = 2.10 | n1 = 1.846660 | ν1 = 23.8 |
| r2 = 69.295 | d2 = 8.00 | n2 = 1.603112 | ν2 = 60.6 |
| r3 = −211.583 | d3 = 0.12 | | |
| r4 = 41.727 | d4 = 5.00 | n3 = 1.696797 | ν3 = 55.5 |
| *r5 = 89.605 | d5 = Variable | | |
| r6 = 67.184 | d6 = 1.20 | n4 = 1.804000 | ν4 = 46.6 |
| r7 = 14.542 | d7 = 5.30 | | |
| *r8 = −49.485 | d8 = 1.10 | n5 = 1.772499 | ν5 = 49.6 |
| r9 = 46.800 | d9 = 0.50 | | |
| r10 = 26.465 | d10 = 3.30 | n6 = 1.846660 | ν6 = 23.8 |
| r11 = −96.471 | d11 = 1.57 | | |
| r12 = −24.927 | d12 = 1.00 | n7 = 1.772499 | ν7 = 49.6 |
| r13 = −267.244 | d13 = Variable | | |
| r14 = Stop | d14 = Variable | | |
| r15 = 34.415 | d15 = 3.90 | n8 = 1.516330 | ν8 = 64.2 |
| r16 = −34.181 | d16 = 0.20 | | |
| r17 = 26.512 | d17 = 4.00 | n9 = 1.516330 | ν9 = 64.1 |
| r18 = −27.395 | d18 = 1.00 | n10 = 1.834000 | ν10 = 37.2 |
| r19 = −312.456 | d19 = 0.20 | | |
| r20 = 23.218 | d20 = 3.50 | n11 = 1.516330 | ν11 = 64.2 |
| r21 = −54.954 | d21 = 0.90 | n12 = 1.804000 | ν12 = 46.6 |
| r22 = 20.631 | d22 = Variable | | |
| r23 = −94.614 | d23 = 3.00 | n13 = 1.518229 | ν13 = 59.0 |
| r24 = −27.492 | d24 = 0.20 | | |
| r25 = 90.069 | d25 = 3.80 | n14 = 1.517417 | ν14 = 52.4 |
| r26 = −40.173 | d26 = 1.91 | | |
| r27 = −28.084 | d27 = 1.40 | n15 = 1.834807 | ν15 = 42.7 |
| r28 = −112.927 | | | |

| Variable | \multicolumn{3}{c}{Focal Length} | | |
|---|---|---|---|
| Separation | 35.00 | 83.89 | 207.07 |
| d5 | 1.62 | 21.81 | 32.62 |
| d13 | 19.56 | 9.58 | 1.16 |
| d22 | 23.32 | 13.05 | 14.53 |

Phase Coefficients:

r5: $C_2 = -1.34868 \cdot 10^{-4}$  $C_4 = -9.70773 \cdot 10^{-9}$
$C_6 = -1.76126 \cdot 10^{-11}$  $C_8 = 2.90512 \cdot 10^{-14}$ -continued

| | | | |
|---|---|---|---|
| r8: | $C_2 = 2.20163 \cdot 10^{-4}$ | $C_4 = 1.63190 \cdot 10^{-6}$ | |
| | $C_6 = -1.81818 \cdot 10^{-9}$ | $C_8 = 3.68799 \cdot 10^{-11}$ | |

NUMERICAL EXAMPLE 4 f = 28.52~101.50   Fno = 3.50~4.67   2ω = 74.4~24.1

| | | | |
|---|---|---|---|
| r1 = 102.671 | d1 = 2.00 | n1 = 1.846659 | ν1 = 23.8 |
| r2 = 53.149 | d2 = 5.67 | n2 = 1.696797 | ν2 = 55.5 |
| *r3 = 263.494 | d3 = 0.12 | | |
| r4 = 45.795 | d4 = 4.81 | n3 = 1.712995 | ν3 = 53.8 |
| r5 = 126.700 | d5 = Variable | | |
| *r6 = 59.612 | d6 = 1.20 | n4 = 1.834000 | ν4 = 37.2 |
| r7 = 13.322 | d7 = 6.14 | | |
| r8 = −72.600 | d8 = 1.10 | n5 = 1.804000 | ν5 = 46.6 |
| r9 = 35.106 | d9 = 0.10 | | |
| r10 = 22.860 | d10 = 4.40 | n6 = 1.846658 | ν6 = 23.9 |
| r11 = −53.615 | d11 = 0.60 | | |
| r12 = −30.389 | d12 = 1.10 | n7 = 1.834807 | ν7 = 42.7 |
| r13 = 259.025 | d13 = Variable | | |
| r14 = Stop | d14 = 1.00 | | |
| r15 = 25.860 | d15 = 1.20 | n8 = 1.846659 | ν8 = 23.8 |
| r16 = 14.543 | d16 = 5.83 | n9 = 1.603112 | ν9 = 60.7 |
| r17 = −39.747 | d17 = 0.12 | | |
| r18 = 29.605 | d18 = 2.10 | n10 = 1.772499 | ν10 = 49.6 |
| r19 = 70.836 | d19 = Variable | | |
| r20 = −44.026 | d20 = 3.35 | n11 = 1.755199 | ν11 = 27.5 |
| r21 = −13.220 | d21 = 1.10 | n12 = 1.804000 | ν12 = 46.6 |
| r22 = 82.687 | d22 = Variable | | |
| r23 = 244.005 | d23 = 5.45 | n13 = 1.487490 | ν13 = 70.2 |
| r24 = −17.781 | d24 = 0.12 | | |
| r25 = 68.402 | d25 = 2.58 | n14 = 1.696797 | ν14 = 5.55 |
| r26 = −93.016 | d26 = 3.00 | | |
| r27 = −19.199 | d27 = 1.40 | n15 = 1.846659 | ν15 = 23.8 |
| r28 = −55.904 | | | |

| Variable | Focal Length | | |
|---|---|---|---|
| Separation | 28.52 | 53.80 | 101.50 |
| d5 | 1.22 | 15.85 | 29.10 |
| d13 | 15.51 | 8.16 | 2.10 |
| d19 | 3.23 | 6.23 | 7.74 |
| d22 | 6.68 | 3.56 | 1.61 |

Phase Coefficients:

| | | |
|---|---|---|
| r3: | $C_2 = -5.42089 \cdot 10^{-5}$ | $C_4 = 2.31418 \cdot 10^{-8}$ |
| | $C_6 = -5.53092 \cdot 10^{-11}$ | $C_8 = 4.43480 \cdot 10^{-14}$ |
| r6: | $C_2 = 1.41208 \cdot 10^{-4}$ | $C_4 = -1.52038 \cdot 10^{-7}$ |
| | $C_6 = 4.36482 \cdot 10^{-9}$ | $C_8 = -1.29261 \cdot 10^{-11}$ |

NUMERICAL EXAMPLE 5 f = 100.03~293.50   Fno = 5.70~5.70   2ω = 24.4~8.4

| | | | |
|---|---|---|---|
| r1 = 146.261 | d1 = 3.00 | n1 = 1.805177 | ν1 = 25.4 |
| r2 = 85.187 | d2 = 7.00 | n2 = 1.589130 | ν2 = 61.2 |
| r3 = 16103.450 | d3 = 0.20 | | |
| *r4 = 116.055 | d4 = 5.00 | n3 = 1.516330 | ν3 = 64.2 |
| r5 = 1171.861 | d5 = Variable | | |
| *r6 = 7637.252 | d6 = 1.50 | n4 = 1.696797 | ν4 = 55.5 |
| r7 = 44.705 | d7 = 4.00 | | |
| r8 = −48.564 | d8 = 1.50 | n5 = 1.696797 | ν5 = 55.5 |
| r9 = 48.707 | d9 = 3.60 | n6 = 1.805177 | ν6 = 25.4 |
| r10 = −294.937 | d10 = Variable | | |
| r11 = 117.800 | d11 = 5.70 | n7 = 1.531717 | ν7 = 48.9 |
| r12 = −33.410 | d12 = 2.40 | n8 = 1.805177 | ν8 = 25.4 |
| r13 = −58.876 | d13 = Variable | | |
| r14 = Stop | d14 = 2.00 | | |
| r15 = 36.267 | d15 = 4.00 | n9 = 1.613749 | ν9 = 56.4 |
| r16 = 66.735 | d16 = 1.10 | | |
| r17 = 58.823 | d17 = 2.50 | n10 = 1.805177 | ν10 = 25.4 |
| r18 = 29.038 | d18 = 4.00 | n11 = 1.592701 | ν11 = 35.3 |
| r19 = 77.581 | d19 = 12.80 | | |
| r20 = Fixed Stop | d20 = 21.78 | | |
| r21 = 295.201 | d21 = 3.50 | n12 = 1.603112 | ν12 = 60.7 |
| r22 = −76.406 | d22 = 3.55 | | |
| r23 = −31.505 | d23 = 1.50 | n13 = 1.772499 | ν13 = 49.6 |
| r24 = −270.608 | d24 = 3.90 | n14 = 1.647689 | ν14 = 33.8 |
| r25 = −63.977 | | | |

| Variable | Focal Length | | |
|---|---|---|---|
| Separation | 100.03 | 210.40 | 293.50 |
| d5 | 9.18 | 55.12 | 66.60 |
| d10 | 36.55 | 15.77 | 0.33 |
| d13 | 27.47 | 2.32 | 6.27 |

Phase Coefficients:

| | | |
|---|---|---|
| r3: | $C_2 = -1.40710 \cdot 10^{-5}$ | $C_4 = -3.63575 \cdot 10^{-9}$ |
| | $C_6 = 1.89207 \cdot 10^{-12}$ | $C_8 = -1.70670 \cdot 10^{-15}$ |
| r6: | $C_2 = -9.44142 \cdot 10^{-5}$ | $C_4 = 5.37259 \cdot 10^{-8}$ |
| | $C_6 = -6.33318 \cdot 10^{-10}$ | $C_8 = 1.59824 \cdot 10^{-12}$ |

NUMERICAL EXAMPLE 6 f = 77.50~290.10   Fno = 4.17~5.96   2ω = 31.2~8.5

| | | | |
|---|---|---|---|
| r1 = 100.056 | d1 = 2.60 | n1 = 1.805181 | ν1 = 25.4 |
| r2 = 69.260 | d2 = 6.40 | n2 = 1.516330 | ν2 = 64.2 |
| *r3 = 5087.059 | d3 = 0.20 | | |
| r4 = 92.173 | d4 = 4.50 | n3 = 1.516330 | ν3 = 64.2 |
| r5 = 336.513 | d5 = Variable | | |
| r6 = −215.916 | d6 = 1.50 | n4 = 1.834807 | ν4 = 42.7 |
| r7 = 28.436 | d7 = 5.90 | | |
| r8 = 39.034 | d8 = 3.00 | n5 = 1.846659 | ν5 = 25.4 |
| r9 = 142.364 | d9 = Variable | | |
| r10 = Stop | d10 = 10.19 | | |
| r11 = −181.951 | d11 = 2.20 | n6 = 1.805181 | ν6 = 25.4 |
| r12 = 150.977 | d12 = 4.60 | n7 = 1.517417 | ν7 = 52.4 |
| r13 = −36.395 | d13 = Variable | | |
| r14 = 75.739 | d14 = 5.25 | n8 = 1.487490 | ν8 = 70.2 |
| r15 = −30.444 | d15 = 1.40 | n9 = 1.894000 | ν9 = 37.2 |
| r16 = −137.869 | d16 = 0.15 | | |
| r17 = 54.603 | d17 = 3.70 | n10 = 1.571351 | ν10 = 53.0 |
| r18 = −87.354 | d18 = Variable | | |
| r19 = 375.447 | d19 = 1.30 | n11 = 1.772499 | ν11 = 49.6 |
| r20 = 39.229 | d20 = 2.40 | | |
| r21 = −73.176 | d21 = 1.30 | n12 = 1.712995 | ν12 = 53.8 |
| r22 = 39.945 | d22 = 3.10 | n13 = 1.728249 | ν13 = 28.5 |
| r23 = −671.186 | | | |

| Variable | Focal Length | | |
|---|---|---|---|
| Separation | 77.50 | 150.85 | 290.10 |
| d5 | 8.79 | 41.59 | 63.04 |
| d9 | 43.12 | 21.95 | 5.71 |
| d13 | 1.00 | 22.18 | 38.41 |
| d19 | 21.08 | 14.56 | 1.07 |

Phase Coefficients:

| | | |
|---|---|---|
| r3: | $C_2 = -4.45171 \cdot 10^{-5}$ | $C_4 = -2.66792 \cdot 10^{-9}$ |
| | $C_6 = 5.87851 \cdot 10^{-12}$ | $C_8 = 2.74559 \cdot 10^{-15}$ |

The values of the factors in the above-described conditions (1) to (3) for the numerical examples 1 to 6 are listed in the following table.

| Numerical | Condition Factor | | |
|---|---|---|---|
| Example No. | |F2/FW| | |F2/F1| | |C2/F1| |
| 1 | 0.209 | 0.388 | $1.393 \cdot 10^{-6}$ |
| 2 | 0.205 | 0.385 | $1.567 \cdot 10^{-9}$ |
| 3 | 0.213 | 0.414 | $1.979 \cdot 10^{-6}$ |
| 4 | 0.198 | 0.536 | $7.013 \cdot 10^{-7}$ |
| 5 | 0.277 | 0.400 | $9.724 \cdot 10^{-8}$ |
| 6 | 0.545 | 0.890 | $3.518 \cdot 10^{-7}$ |

FIGS. 7A to 7D through FIGS. 24A to 24D show the aberrations of the zoom lenses of the embodiments 1 to 6 in the wide-angle, a middle focal length position and the telephoto end, respectively. In these aberration curves, d, g, C and F stand for the spectral d-line, g-line, C-line and F-line, respectively, ΔS stands for the sagittal image surface, ΔM stands for the meridional image surface, and S.C stands for the curve satisfying the sine condition.

Figure 25:
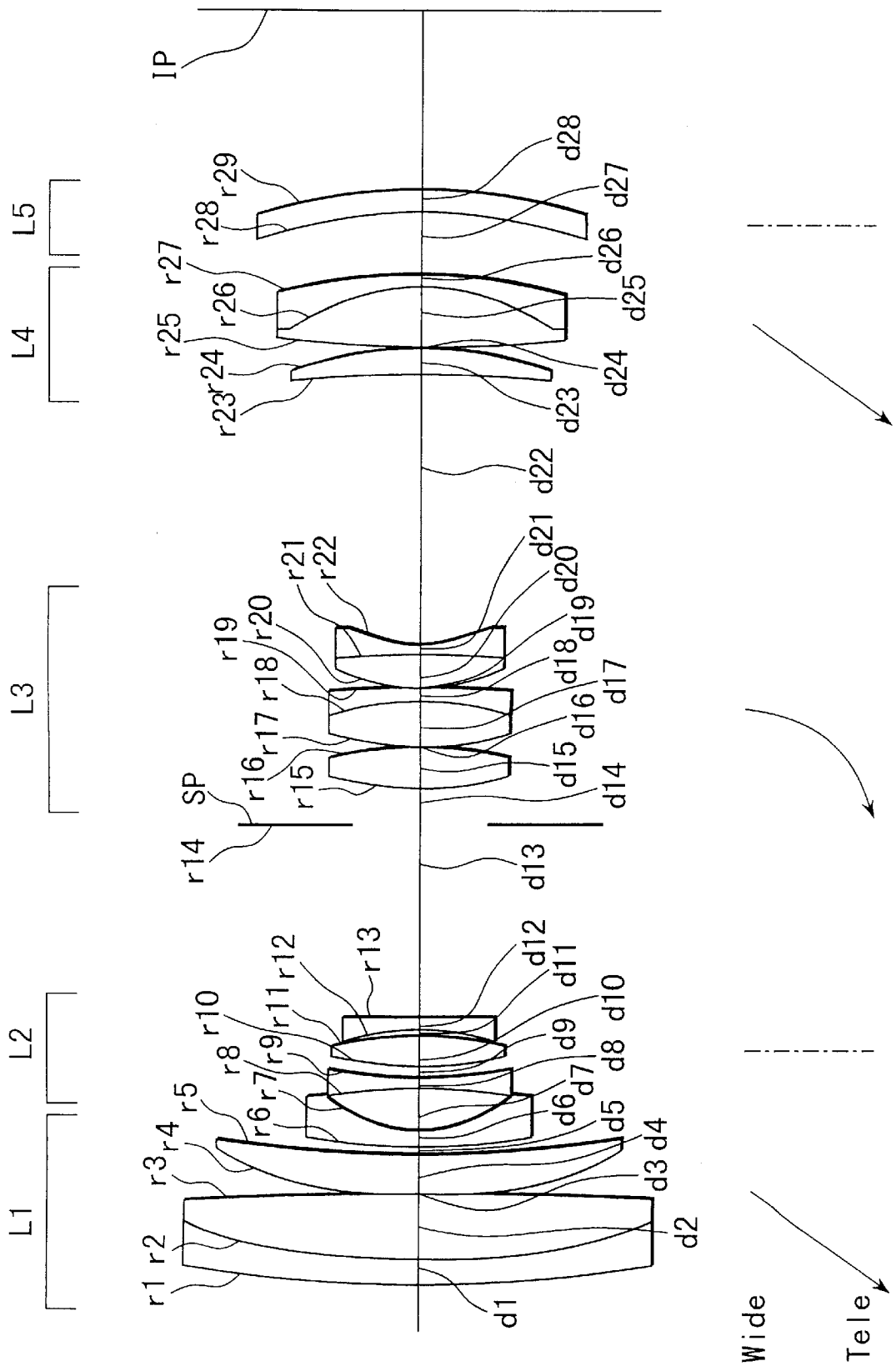
FIG. 25 is a longitudinal section view of a reference example of the zoom lens.
Figure 29A:
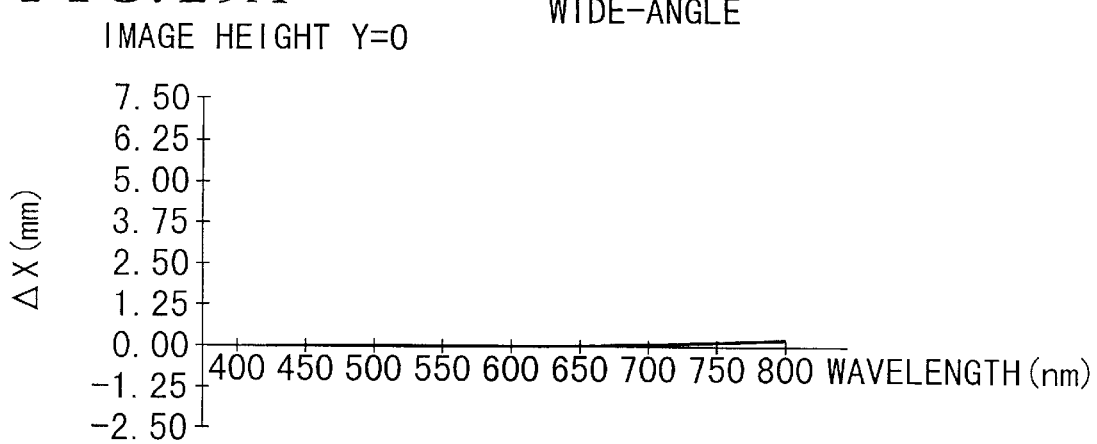
FIGS. 29A to 29C are graphic representations of the residual chromatic aberrations of the entire optical system of the embodiment 1 in the wide-angle end.
Figure 29B:
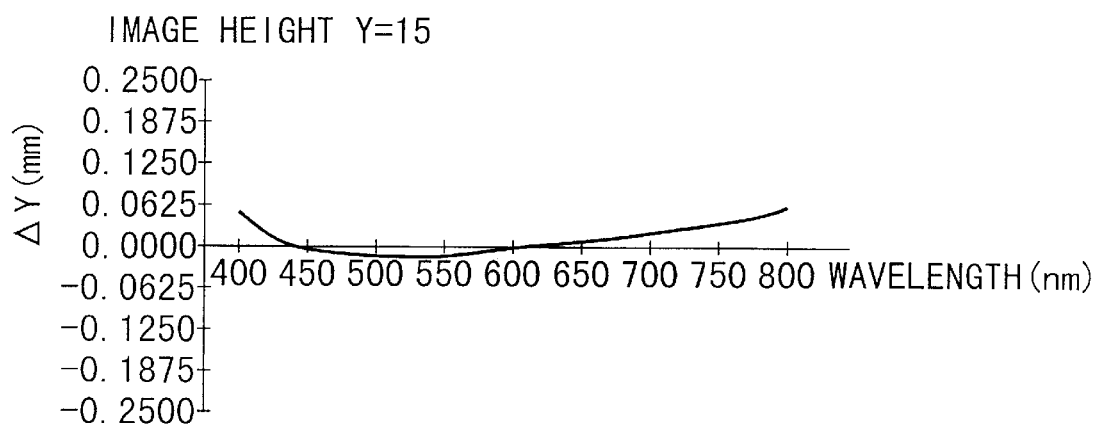
Figure 29C:
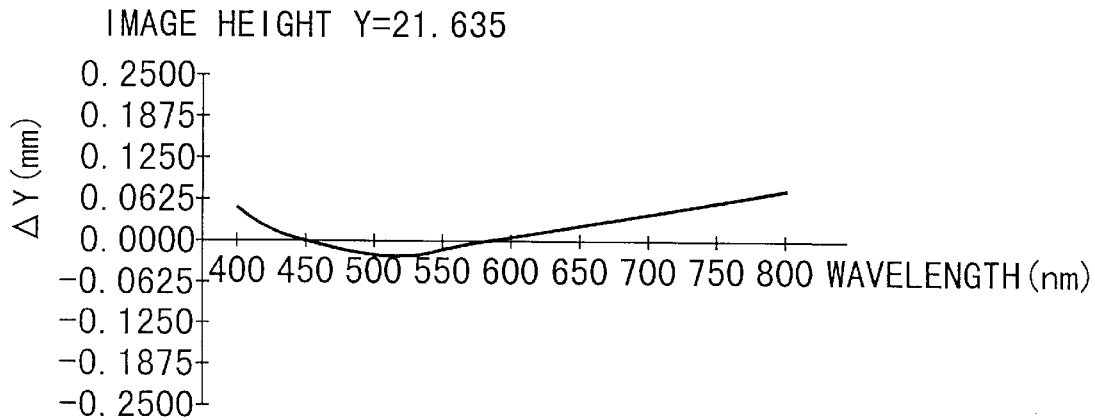
Figure 30A:
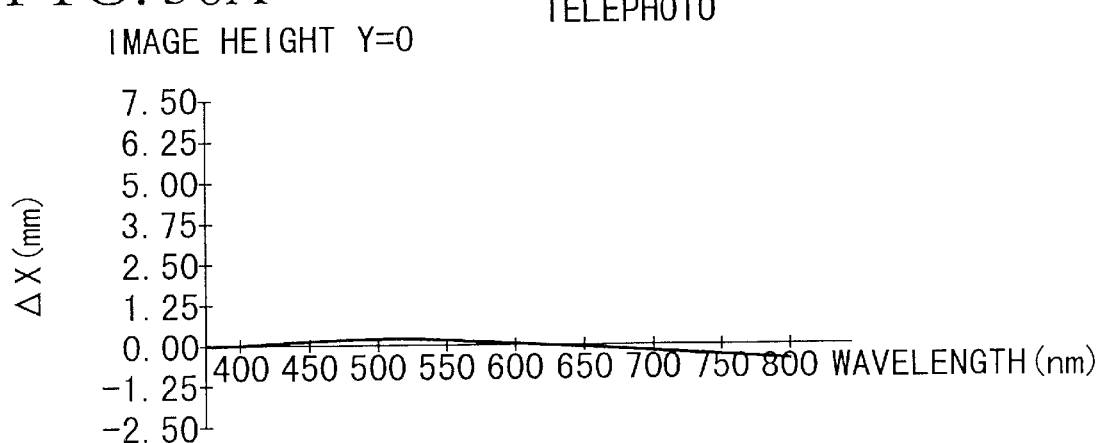
FIGS. 30A to 30C are graphic representations of the residual chromatic aberrations of the entire optical system of the embodiment 1 in the telephoto end.
Figure 30B:
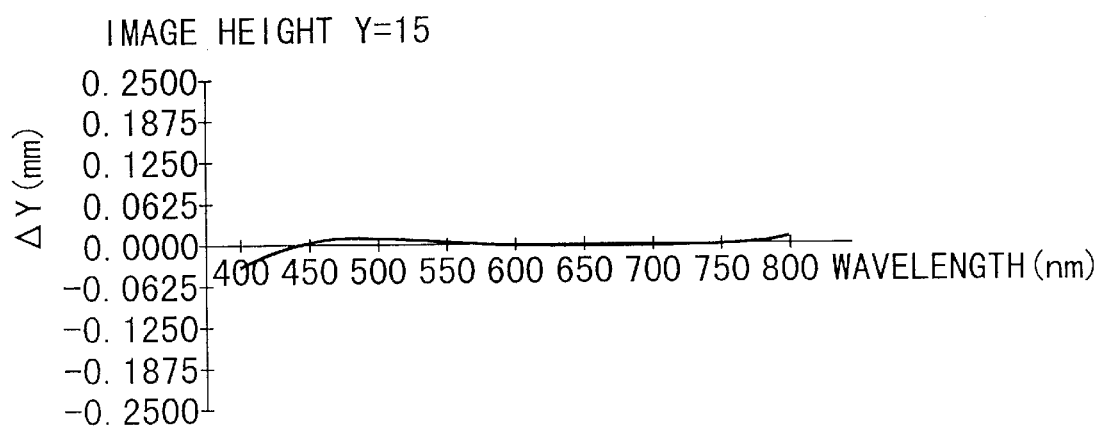
Figure 30C:
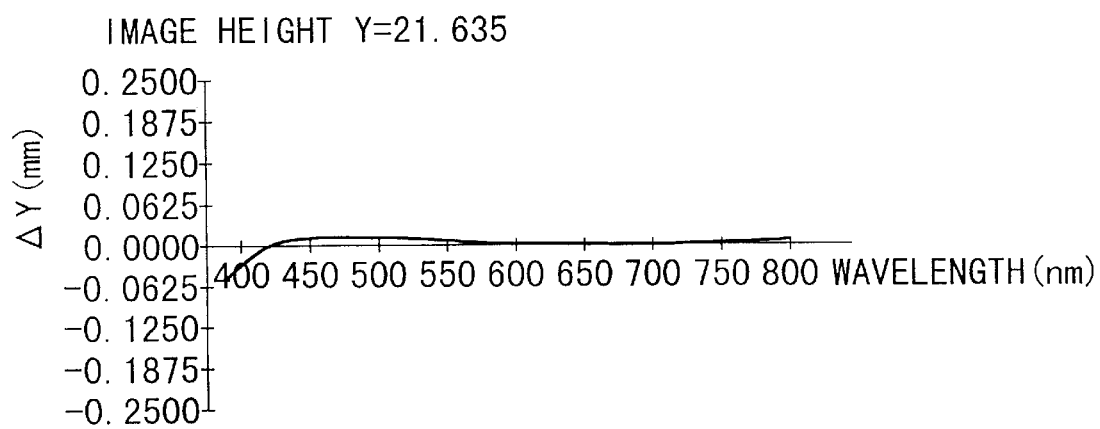
Figure 31A:
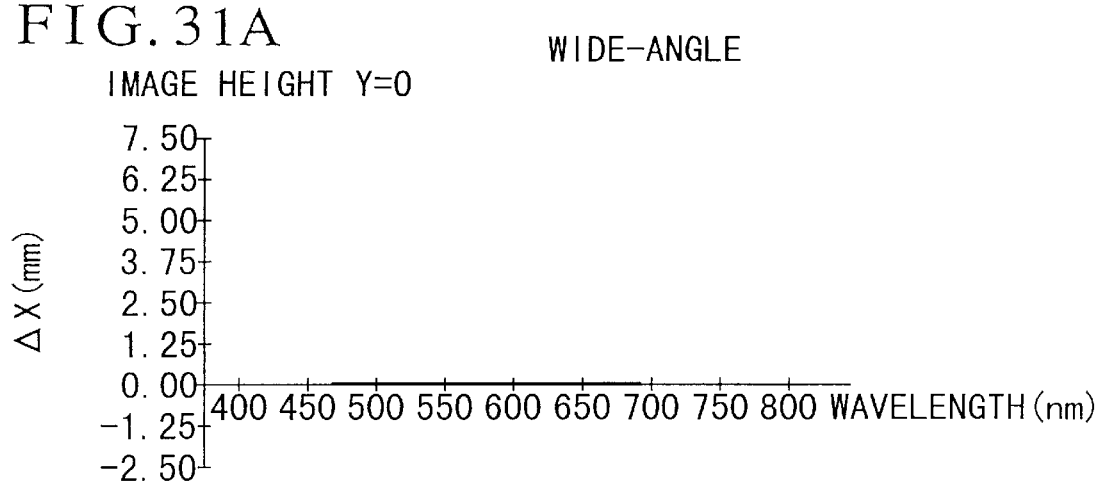
FIGS. 31A to 31C are graphic representations of the residual chromatic aberrations of the first lens unit of the embodiment 1 in the wide-angle end.
Figure 31B:
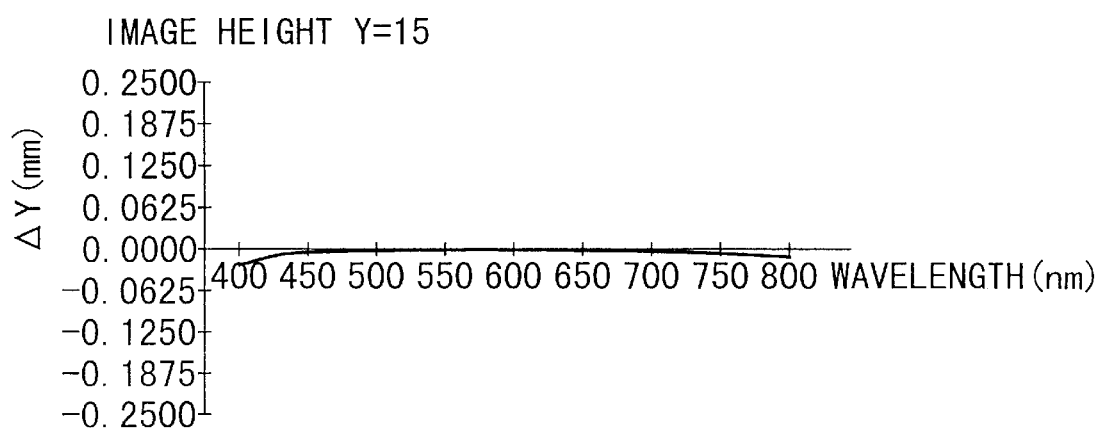
Figure 31C:
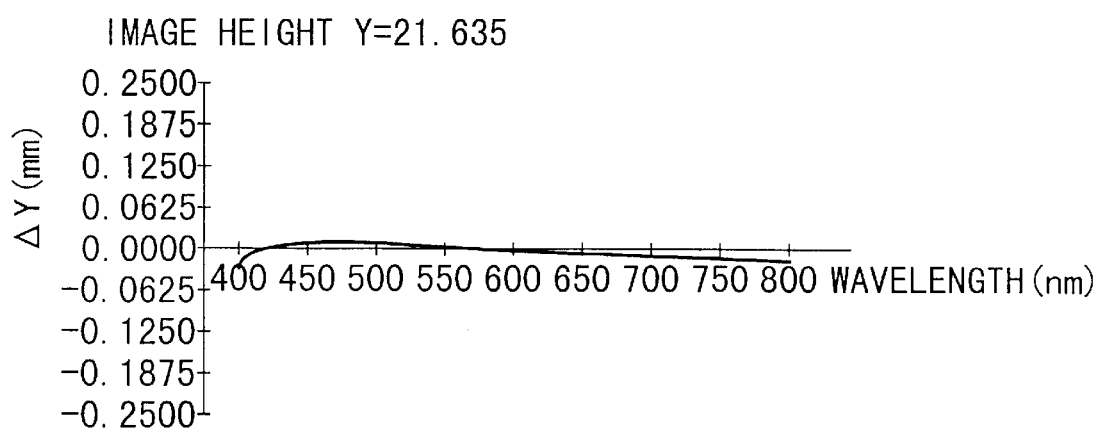
Figure 33A:
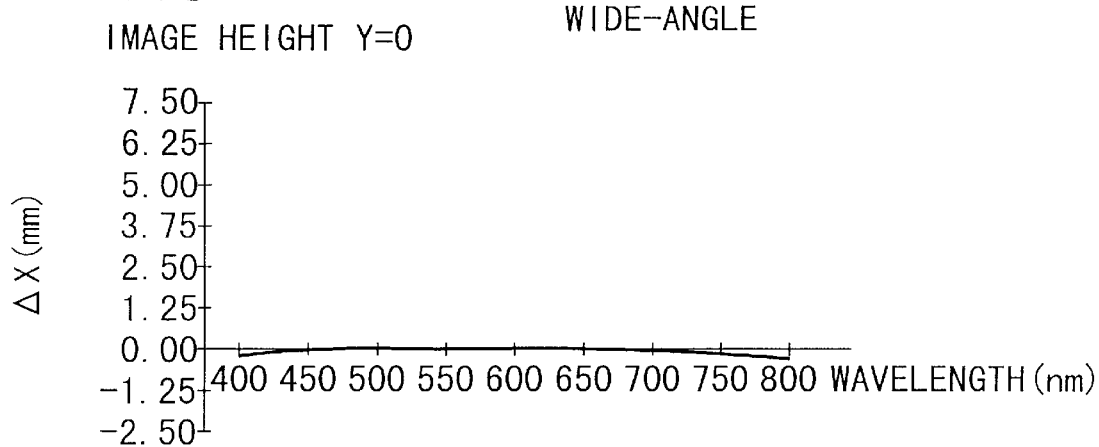
FIGS. 33A to 33C are graphic representations of the residual chromatic aberrations of the second lens unit of the embodiment 1 in the wide-angle end.
Figure 33B:
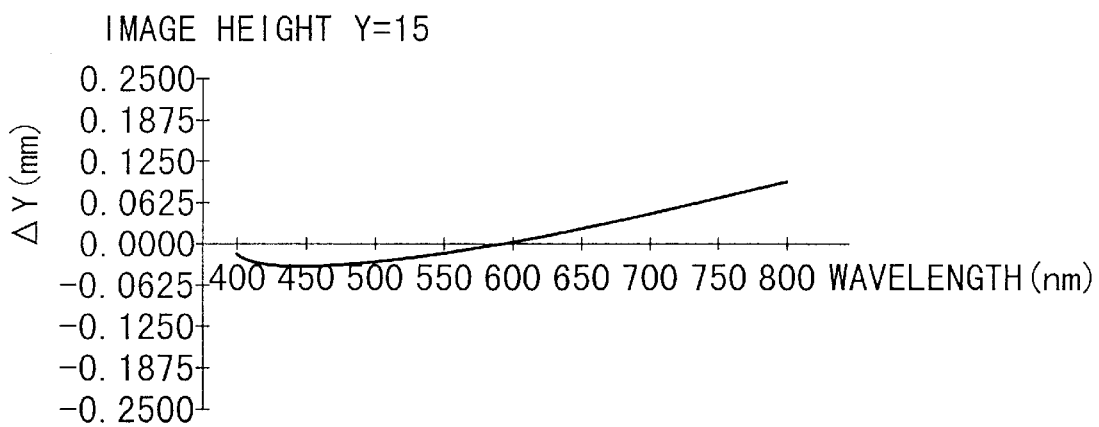
Figure 33C:
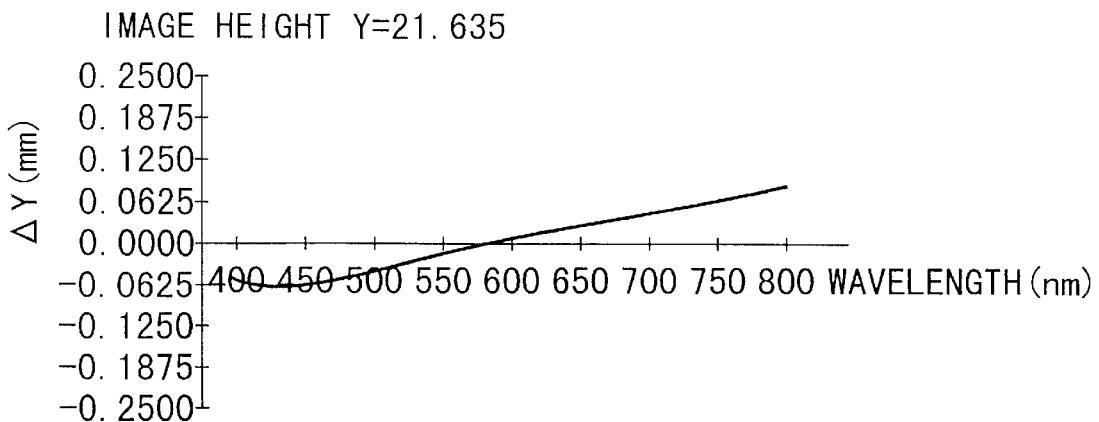
Figure 34A:
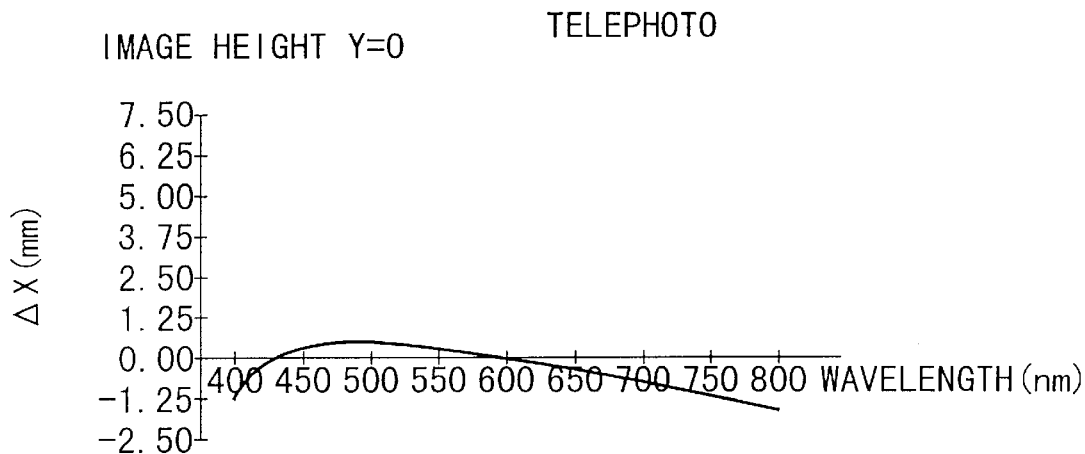
FIGS. 34A to 34C are graphic representations of the residual chromatic aberrations of the second lens unit of the embodiment 1 in the telephoto end.
Figure 34B:
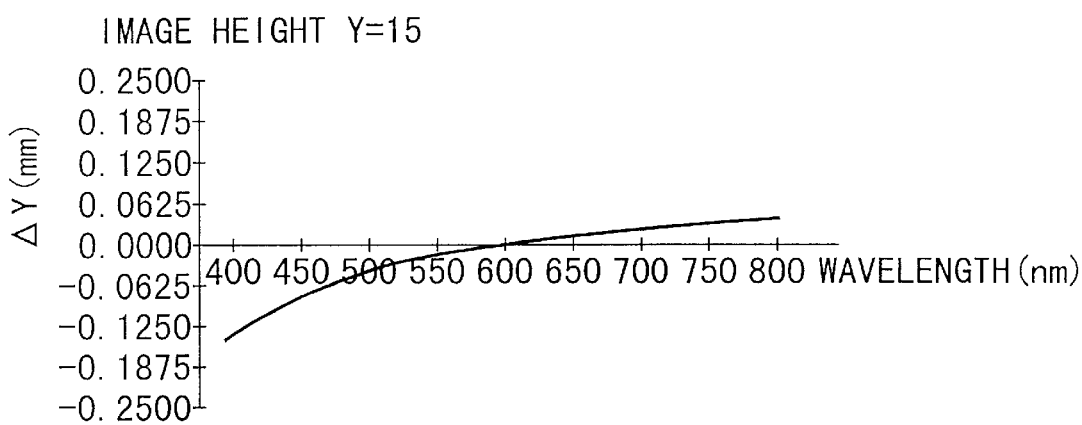
Figure 34C:
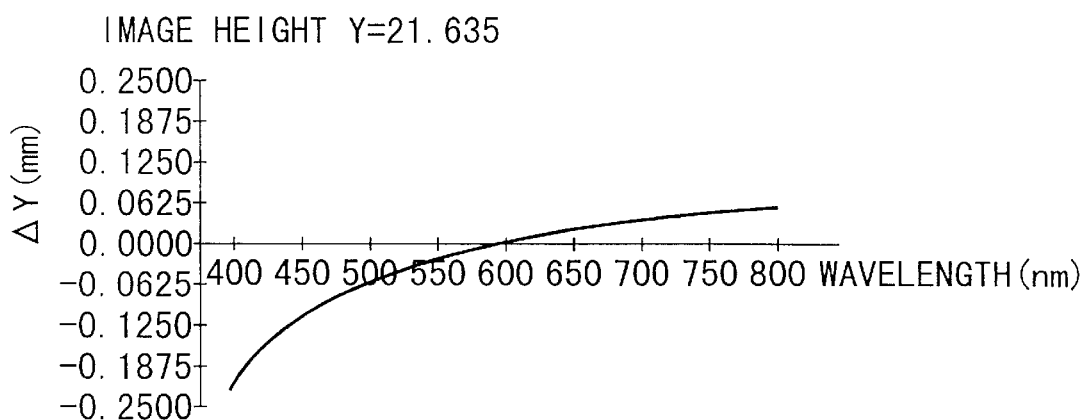
Figure 35A:
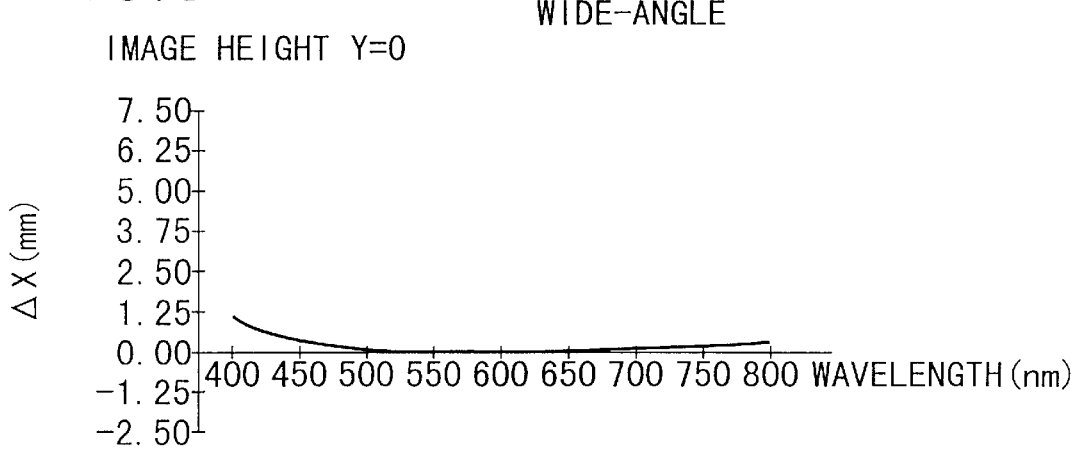
FIGS. 35A to 35C are graphic representations of the residual chromatic aberrations of the third lens unit of the embodiment 1 in the wide-angle end.
Figure 35B:
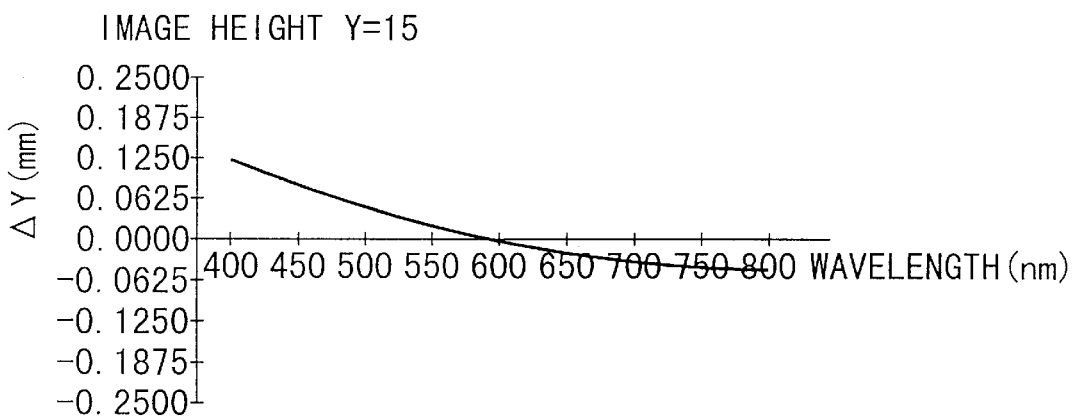
Figure 35C:
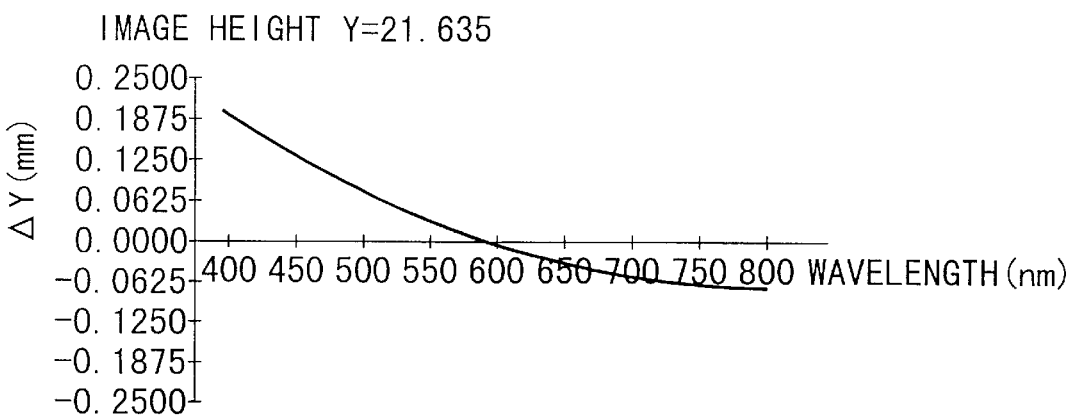
Figure 37A:
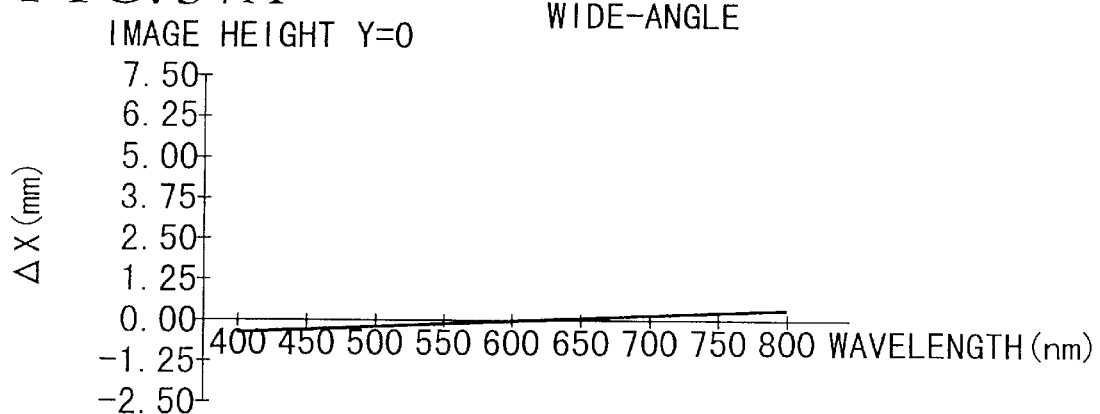
FIGS. 37A to 37C are graphic representations of the residual chromatic aberrations of the fourth lens unit of the embodiment 1 in the wide-angle end.
Figure 37B:
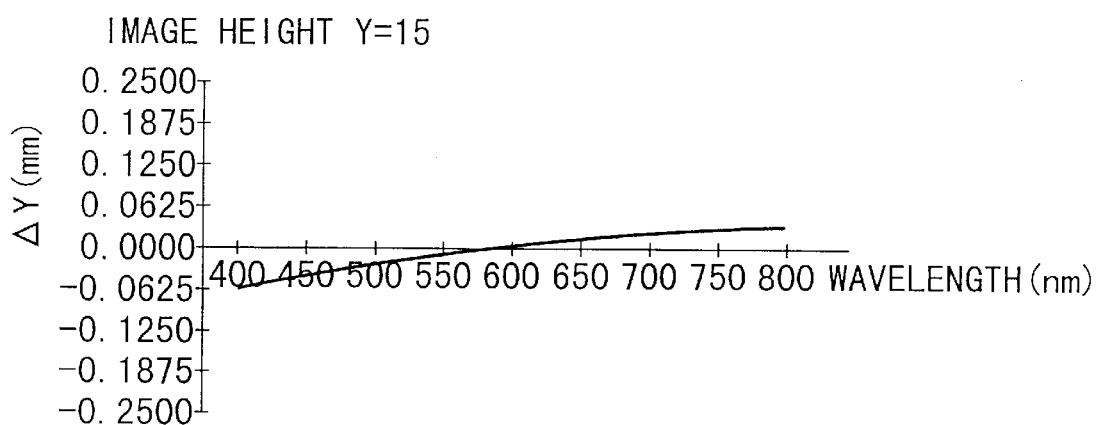
Figure 37C:
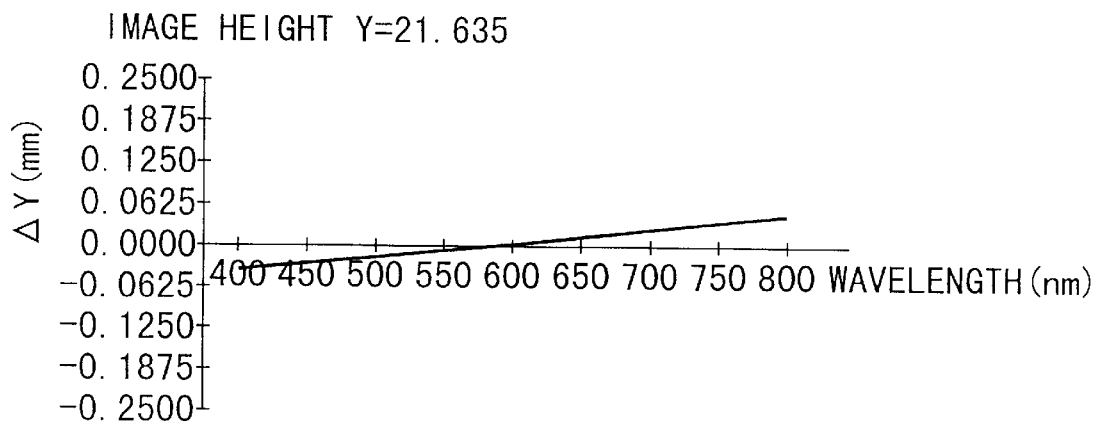
Figure 38A:
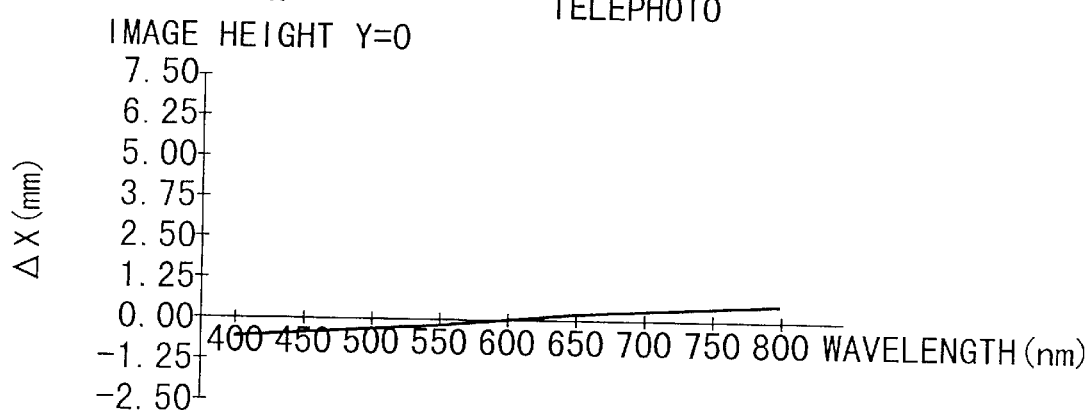
FIGS. 38A to 38C are graphic representations of the residual chromatic aberrations of the fourth lens unit of the embodiment 1 in the telephoto end.
Figure 38B:
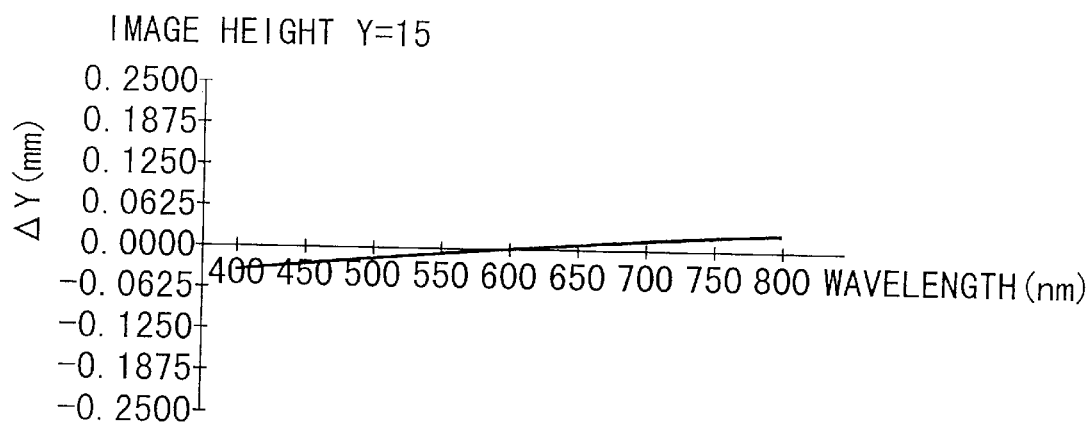
Figure 38C:
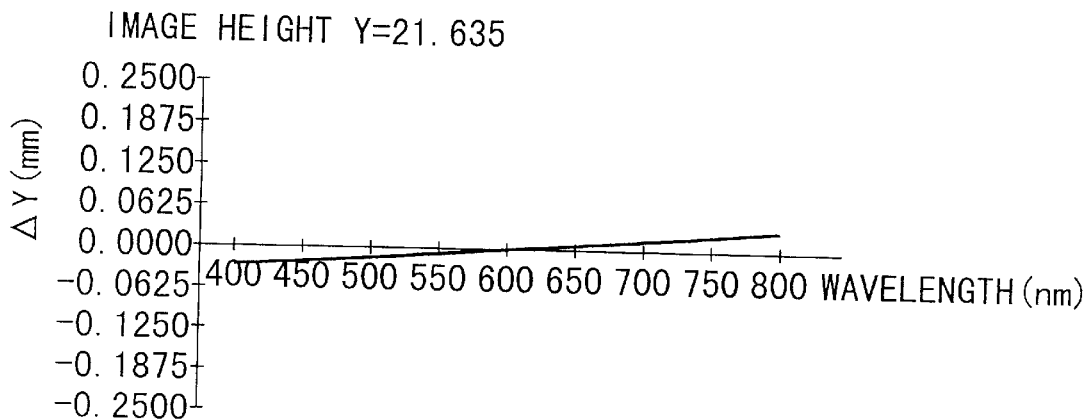
Figure 39A:
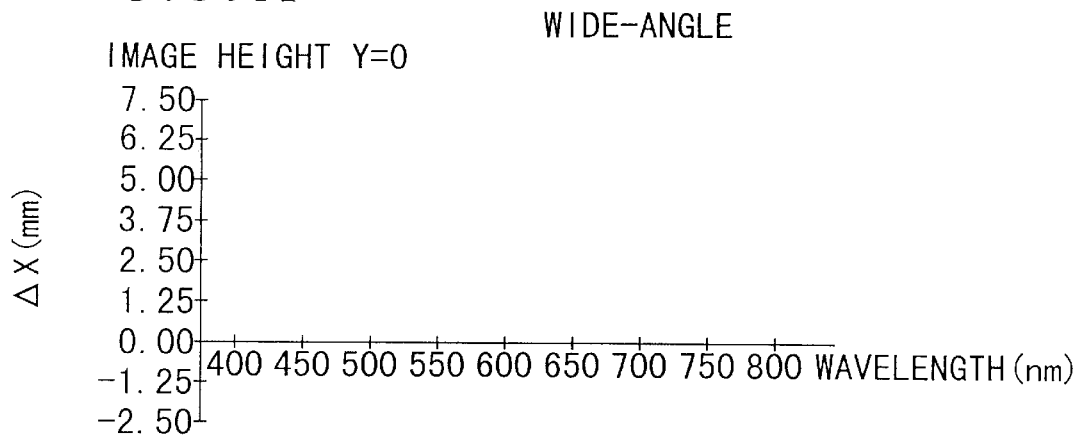
FIGS. 39A to 39C are graphic representations of the residual chromatic aberrations of the fifth lens unit of the embodiment 1 in the wide-angle end.
Figure 39B:
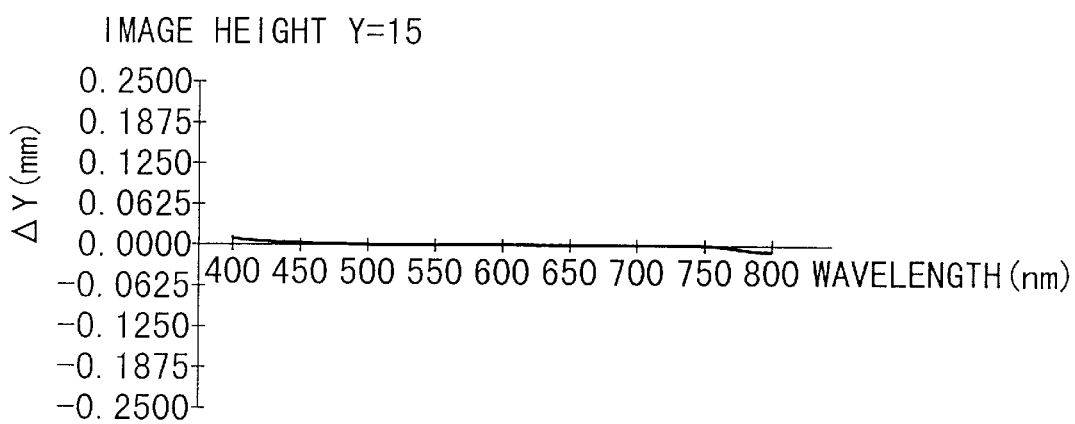
Figure 39C:
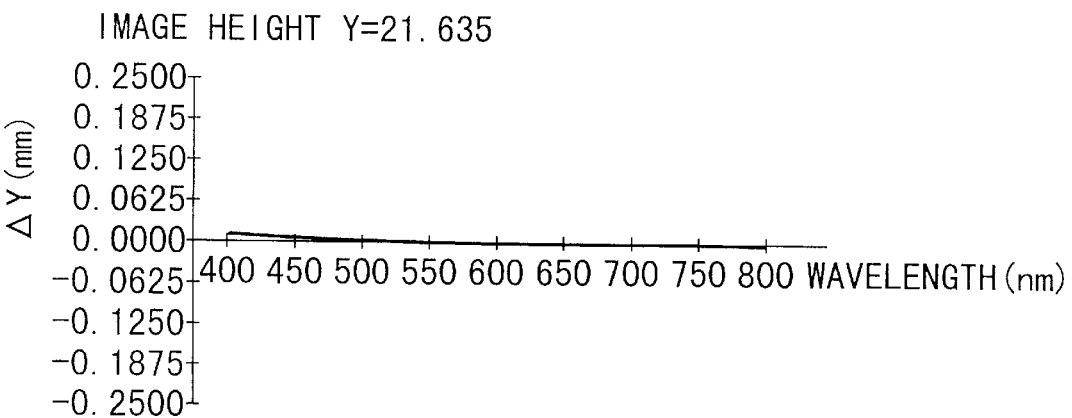
Figure 40A:
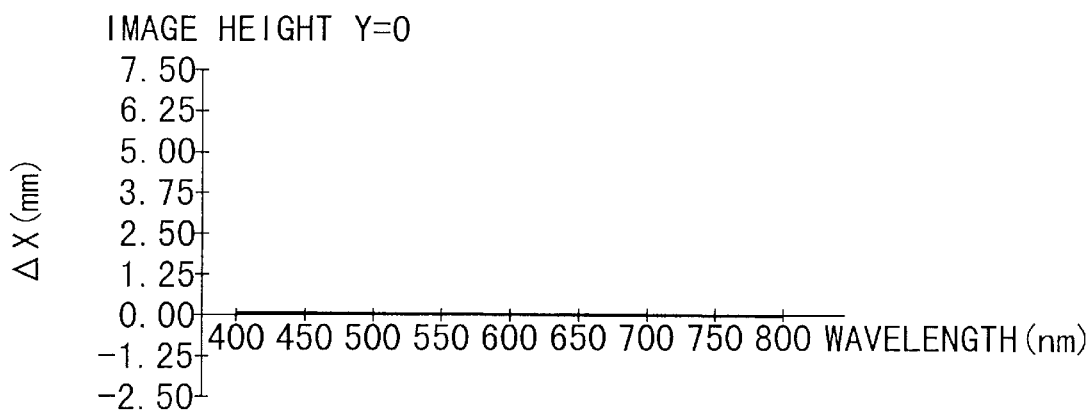
FIGS. 40A to 40C are graphic representations of the residual chromatic aberrations of the fifth lens unit of the embodiment 1 in the telephoto end.
Figure 40B:
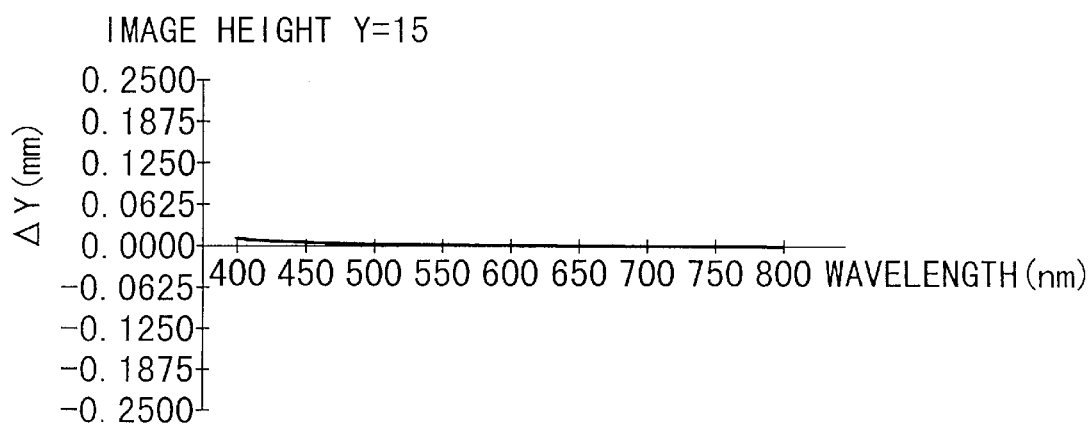
Figure 40C:
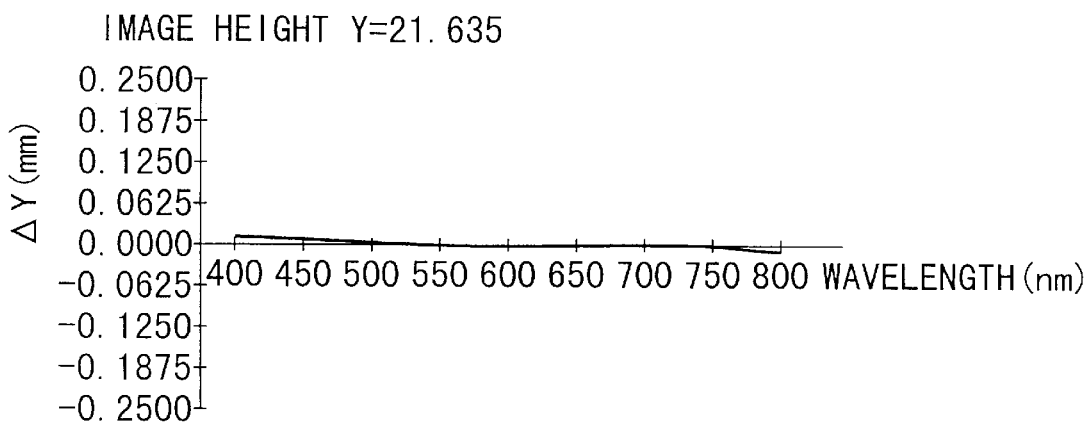
Figure 41A:
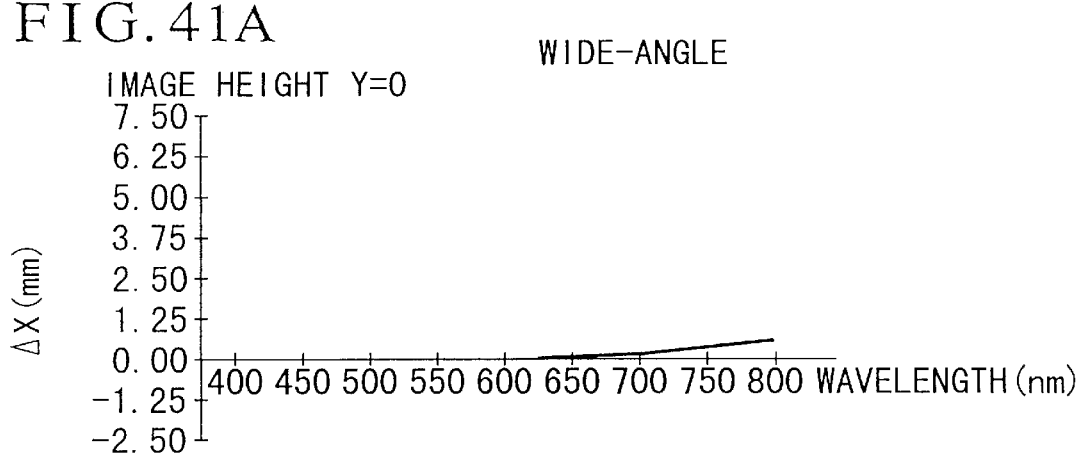
FIGS. 41A to 41C are graphic representations of the residual chromatic aberrations of the entire optical system of the embodiment 2 in the wide-angle end.
Figure 41B:
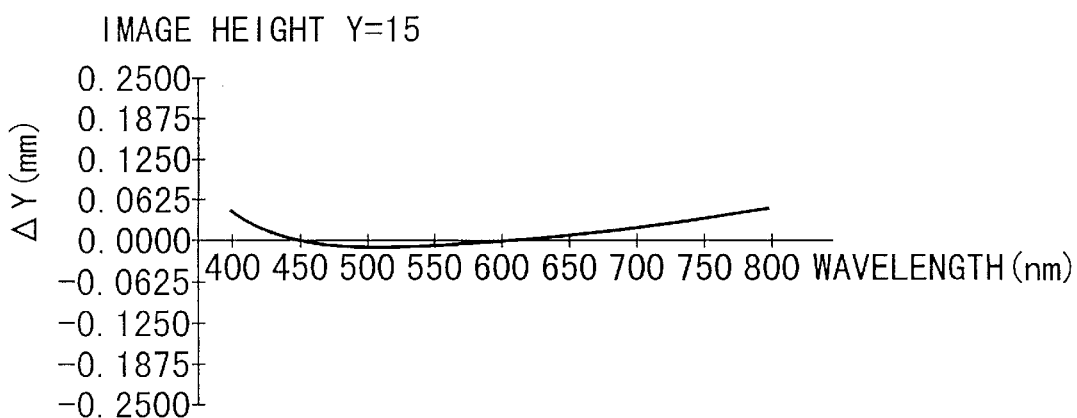
Figure 41C:
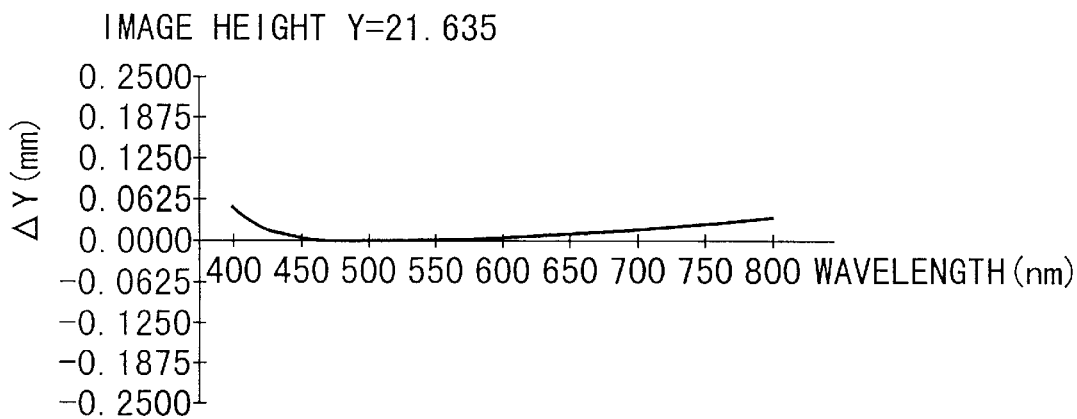
Figure 42A:
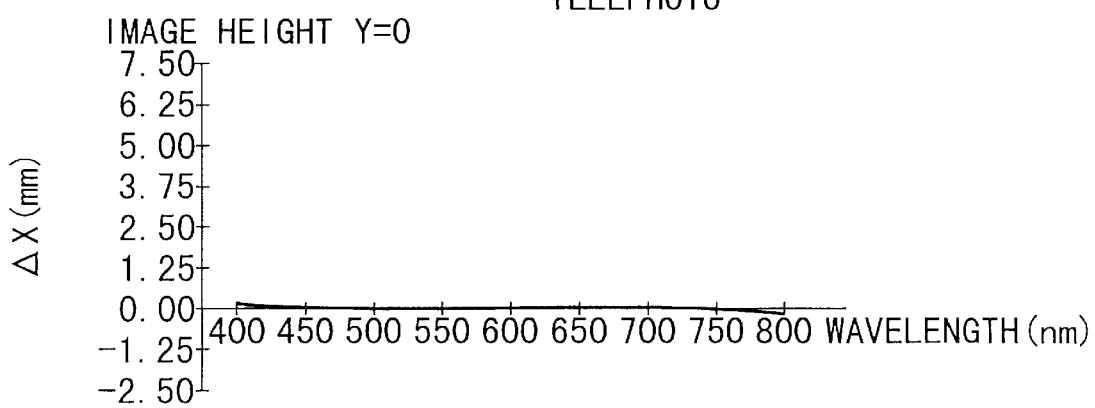
FIGS. 42A to 42C are graphic representations of the residual chromatic aberrations of the entire optical system of the embodiment 2 in the telephoto end.
Figure 42B:
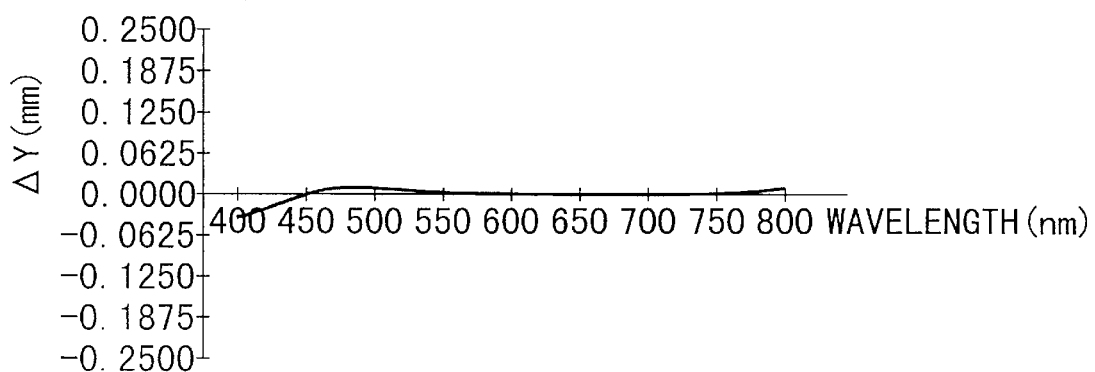
Figure 42C:
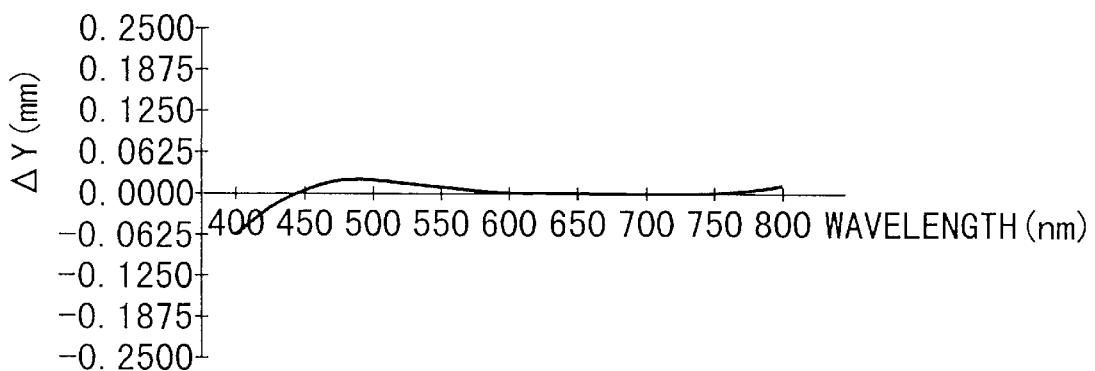
Figure 43A:
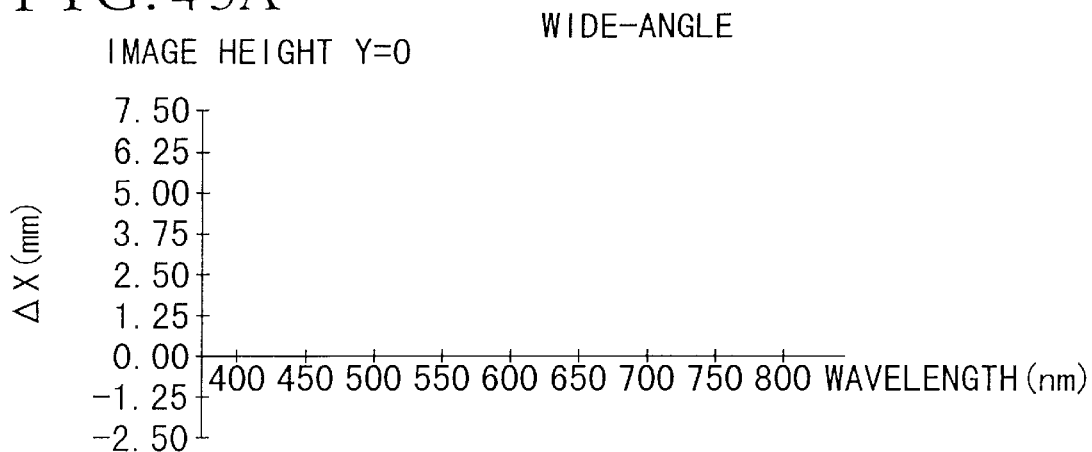
FIGS. 43A to 43C are graphic representations of the residual chromatic aberrations of the first lens unit of the embodiment 2 in the wide-angle end.
Figure 43B:
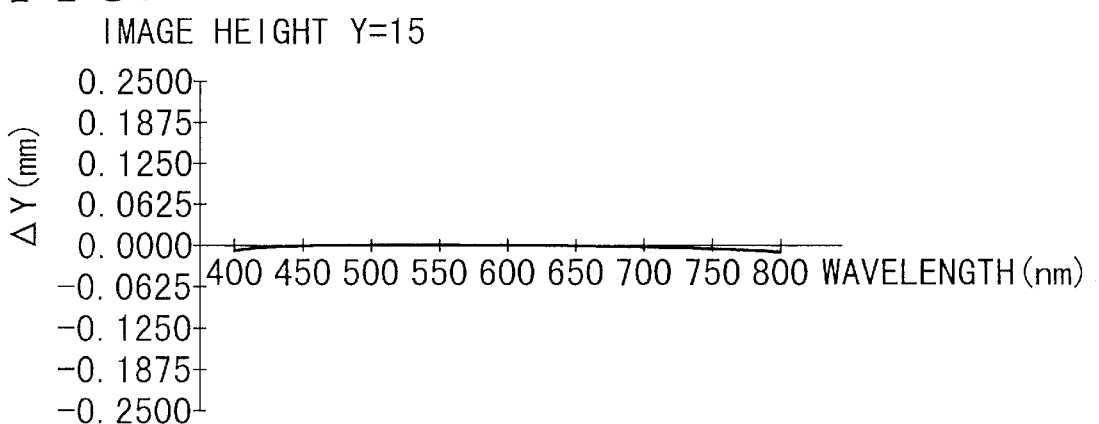
Figure 43C:
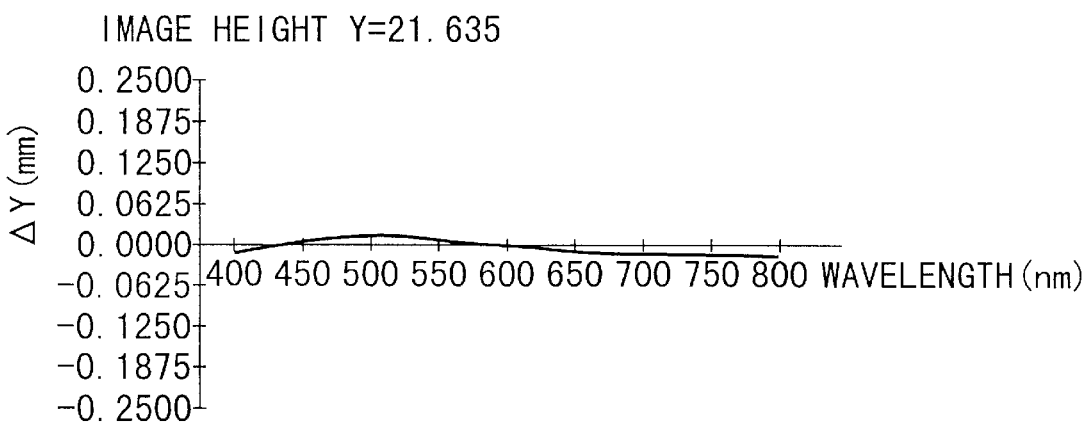
Figure 44A:
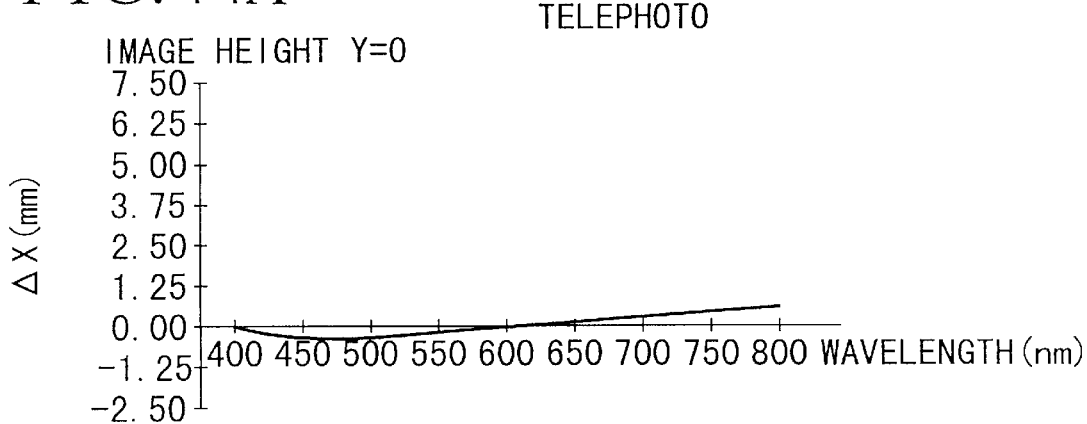
FIGS. 44A to 44C are graphic representations of the residual chromatic aberrations of the first lens unit of the embodiment 2 in the telephoto end.
Figure 44B:
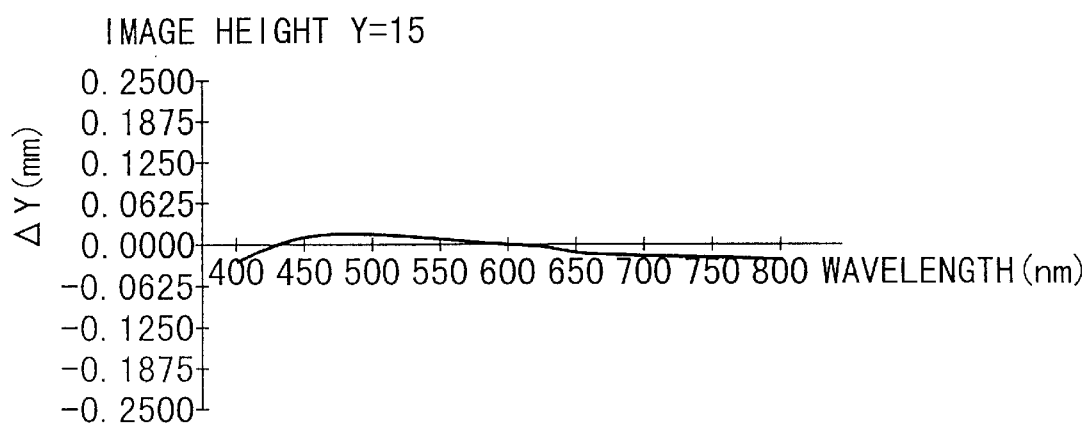
Figure 44C:
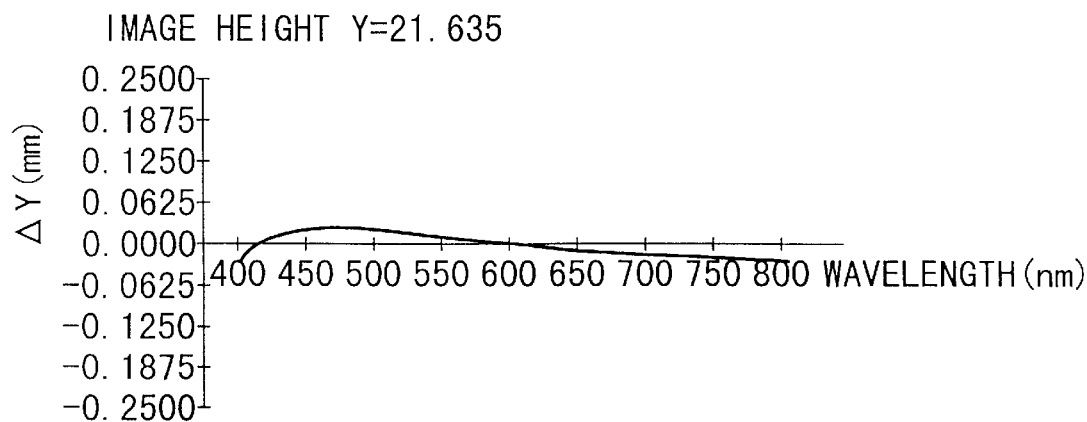
Figure 45A:
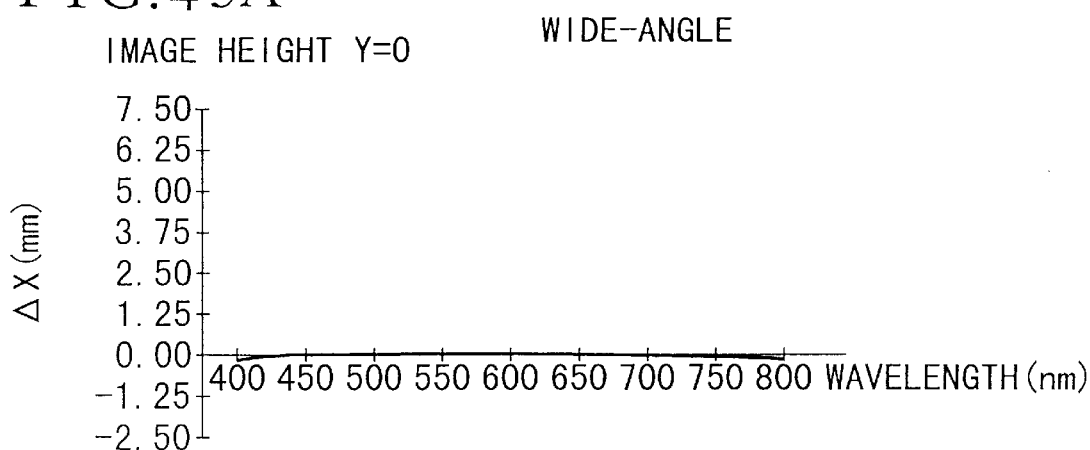
FIGS. 45A to 45C are graphic representations of the residual chromatic aberrations of the second lens unit of the embodiment 2 in the wide-angle end.
Figure 45B:
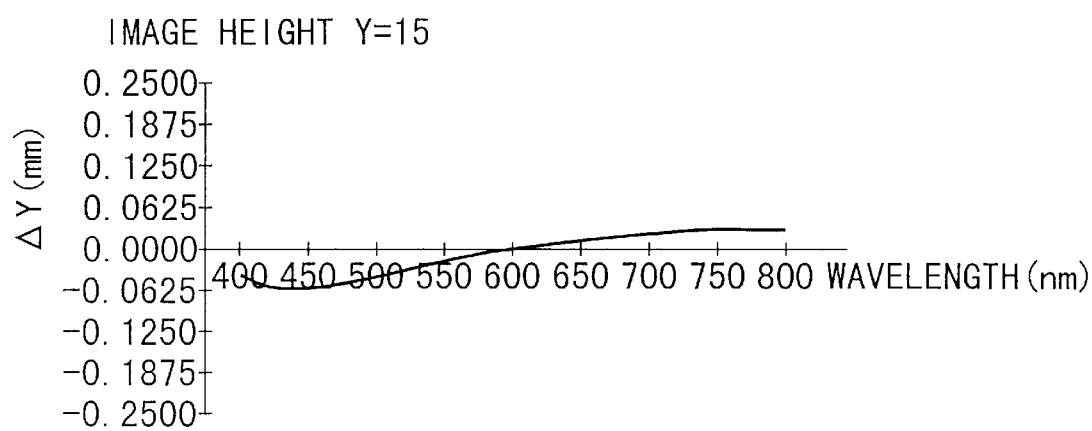
Figure 45C:
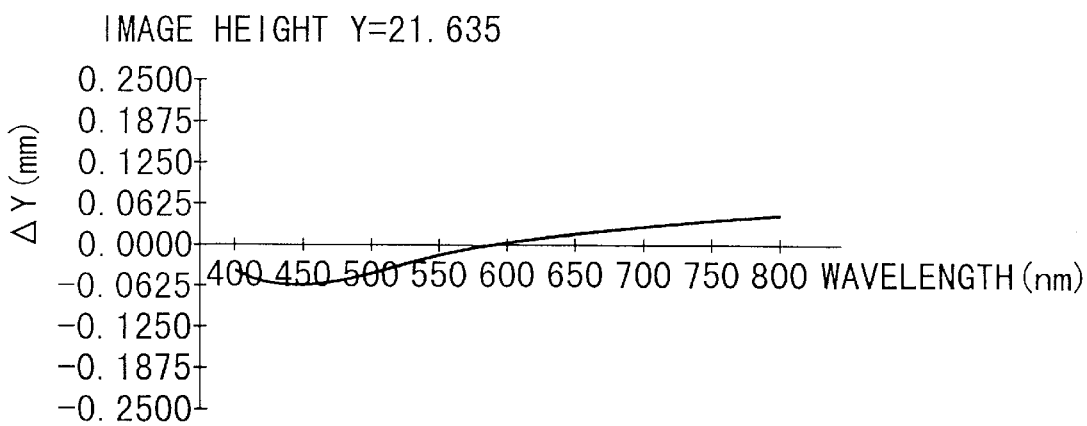
Figure 46A:
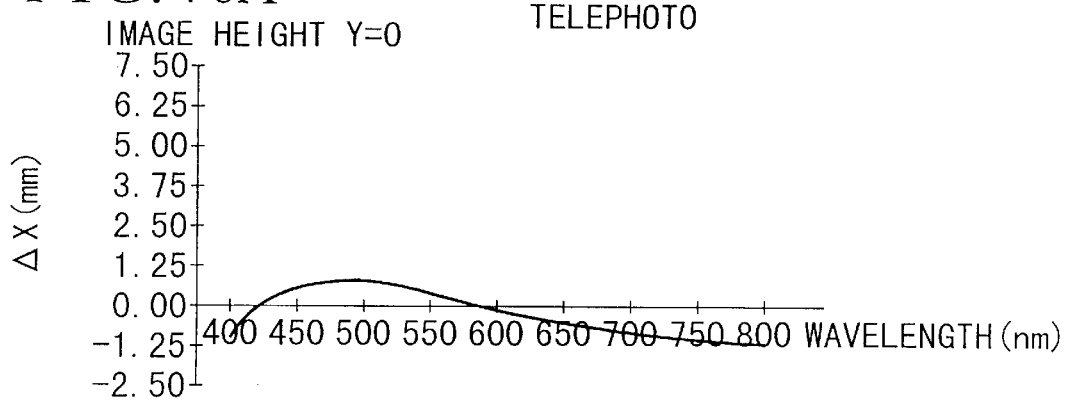
FIGS. 46A to 46C are graphic representations of the residual chromatic aberrations of the second lens unit of the embodiment 2 in the telephoto end.
Figure 46B:
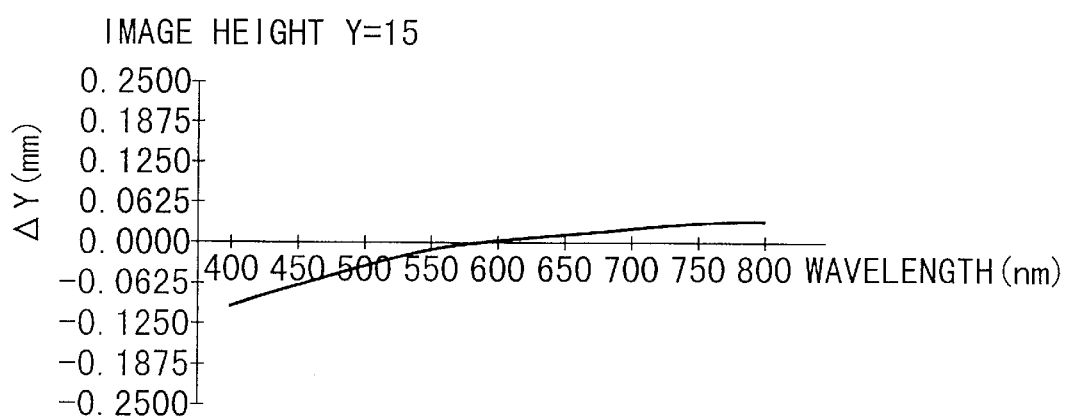
Figure 46C:
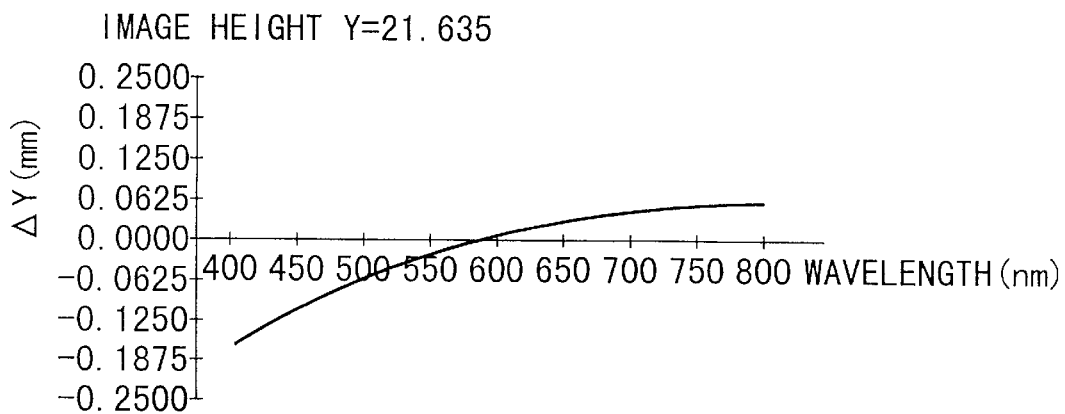
Figure 47A:
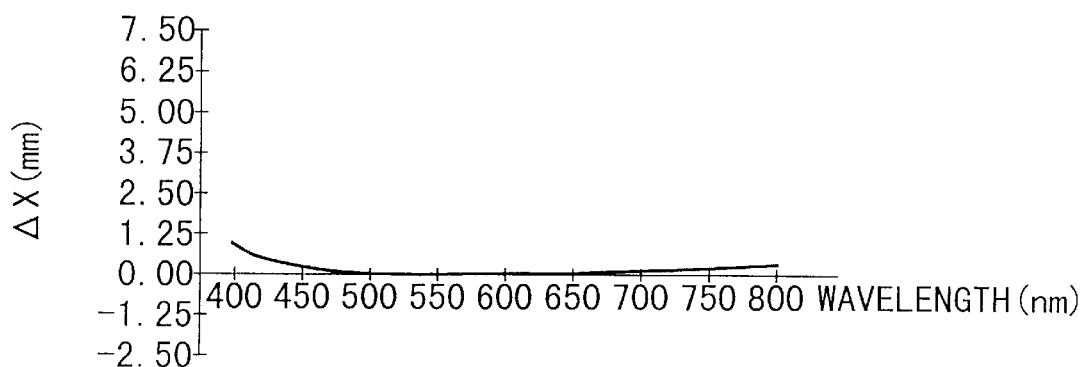
FIGS. 47A to 47C are graphic representations of the residual chromatic aberrations of the third lens unit of the embodiment 2 in the wide-angle end.
Figure 47B:
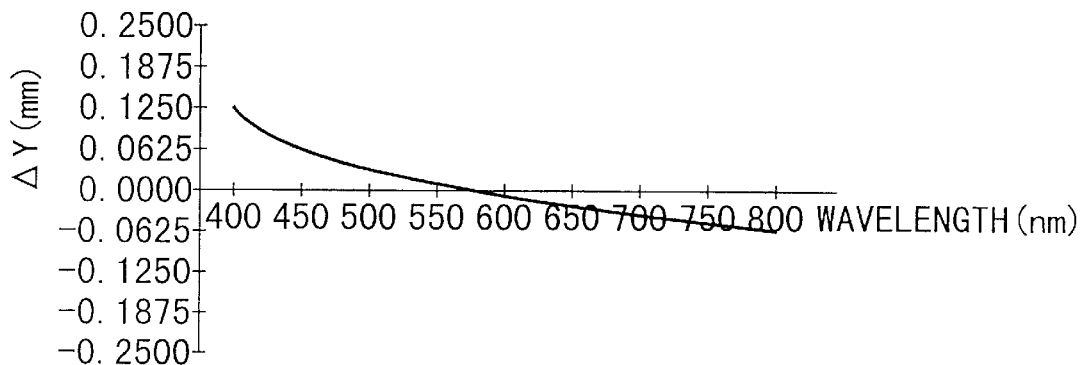
Figure 47C:
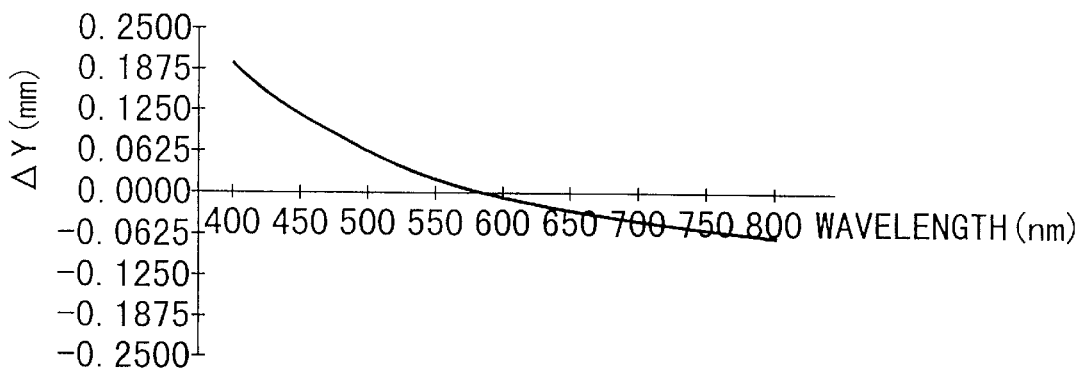
Figure 48A:
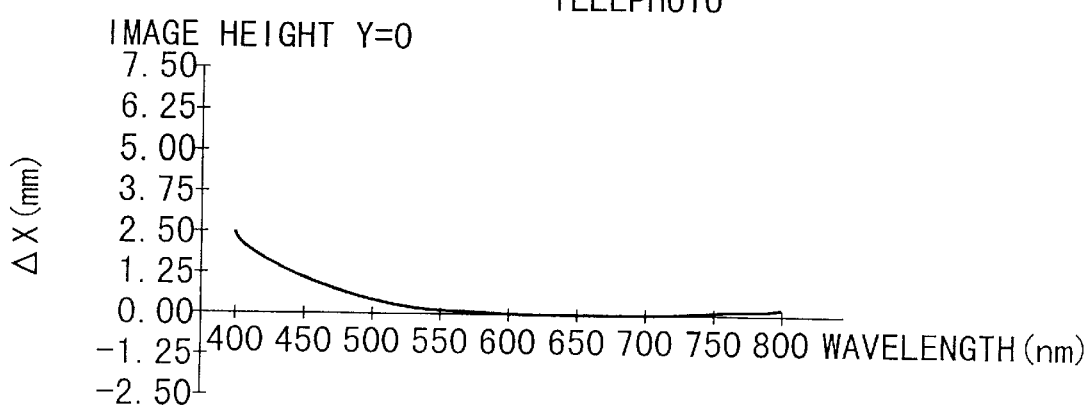
FIGS. 48A to 48C are graphic representations of the residual chromatic aberrations of the third lens unit of the embodiment 2 in the telephoto end.
Figure 48B:
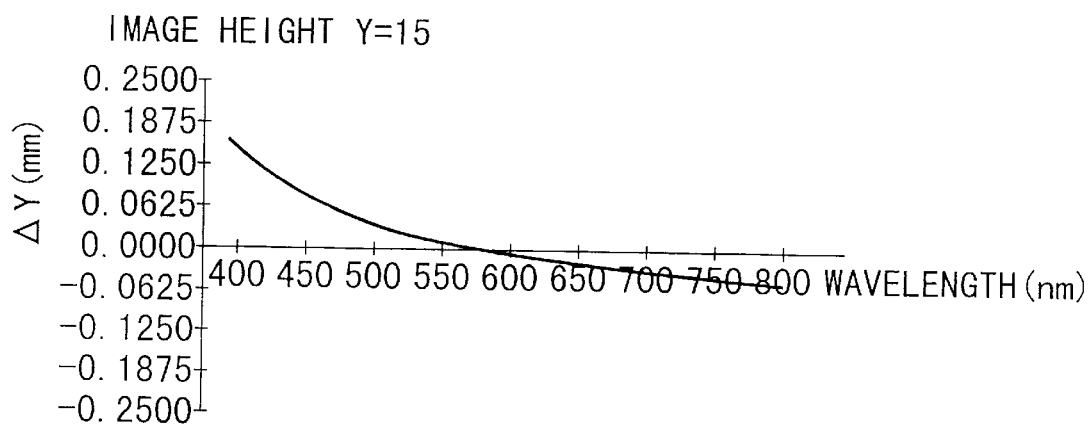
Figure 48C:
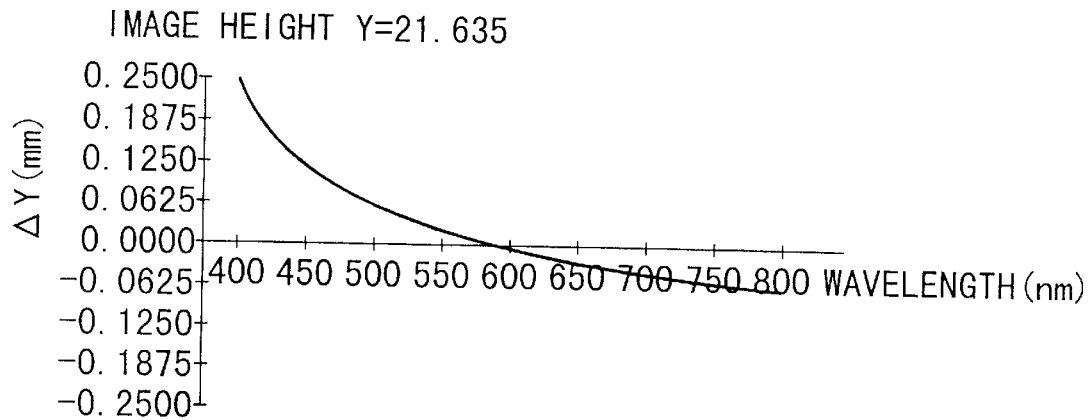
Figure 49A:
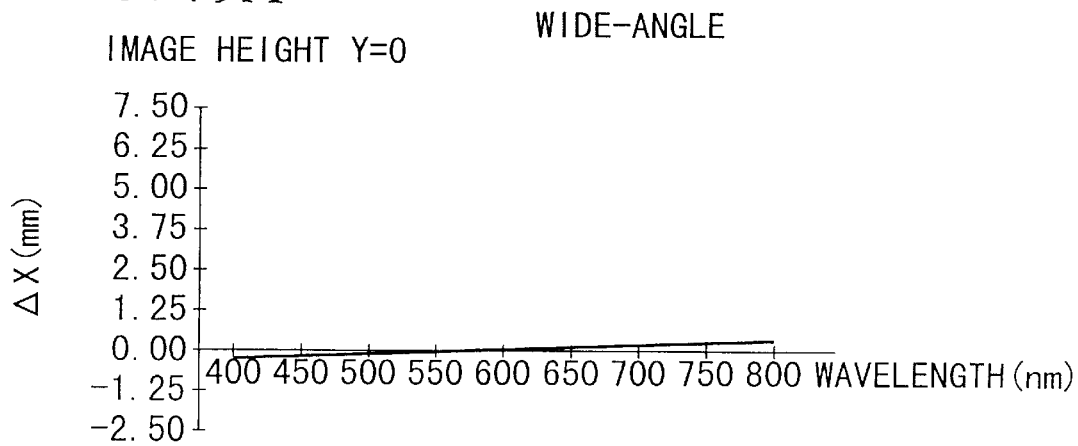
FIGS. 49A to 49C are graphic representations of the residual chromatic aberrations of the fourth lens unit of the embodiment 2 in the wide-angle end.
Figure 49B:
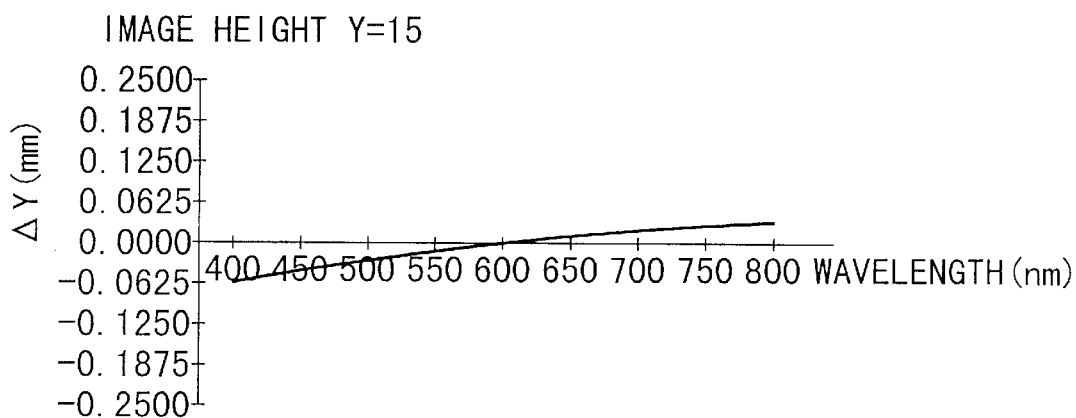
Figure 49C:
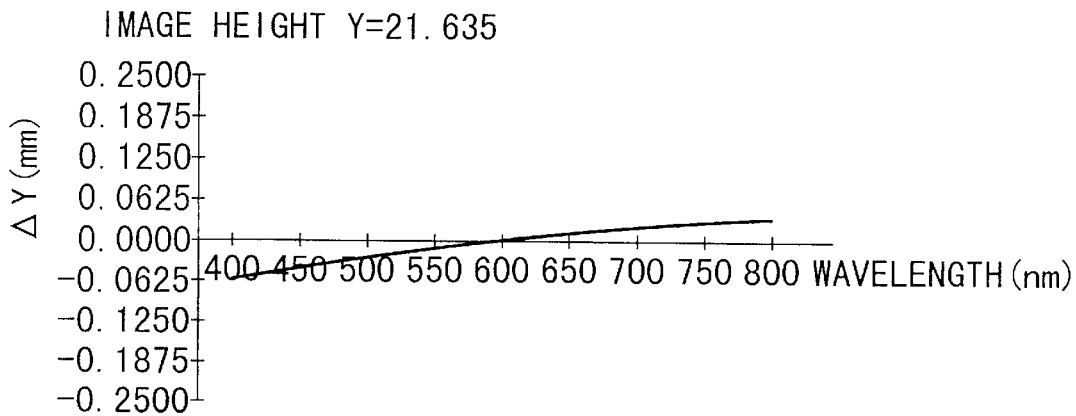
Figure 50A:
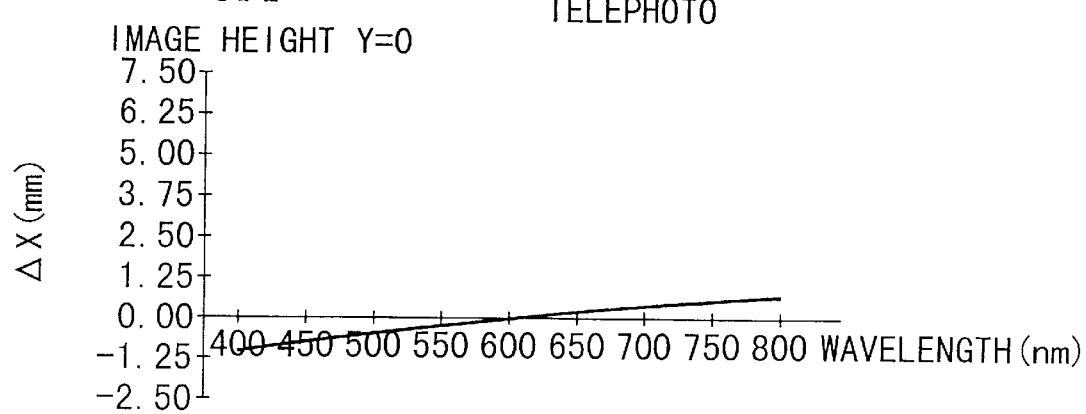
FIGS. 50A to 50C are graphic representations of the residual chromatic aberrations of the fourth lens unit of the embodiment 2 in the telephoto end.
Figure 50B:
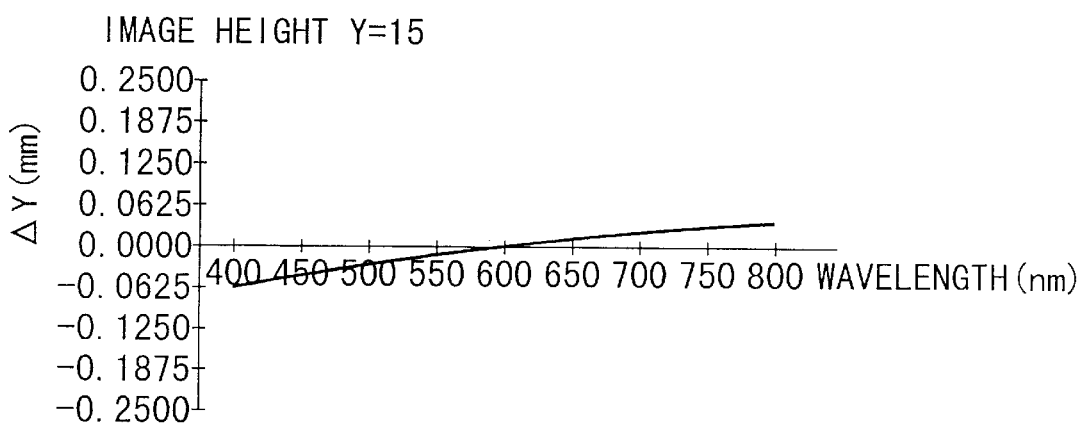
Figure 50C:
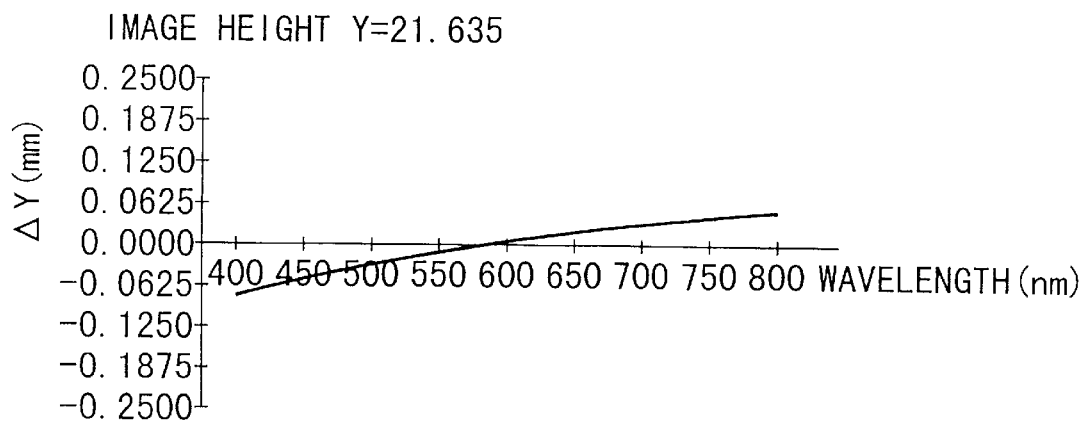
Figure 51A:
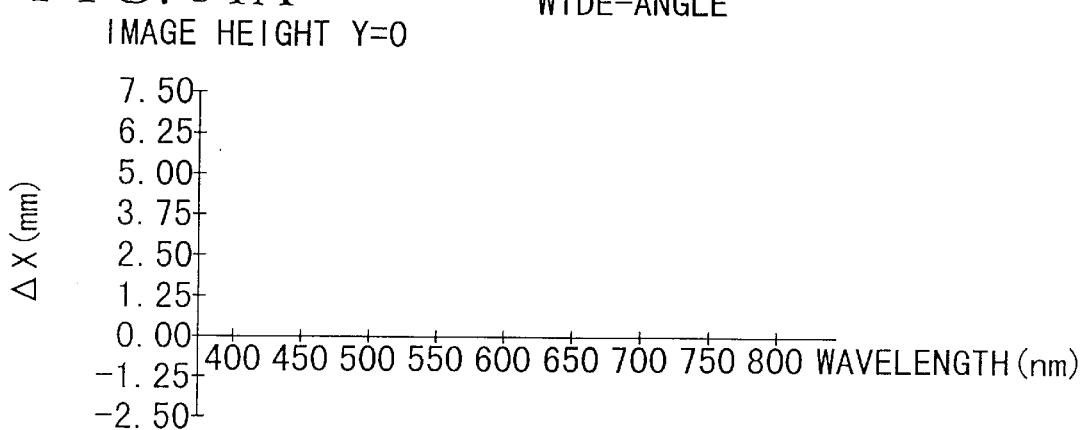
FIGS. 51A to 51C are graphic representations of the residual chromatic aberrations of the fifth lens unit of the embodiment 2 in the wide-angle end.
Figure 51B:
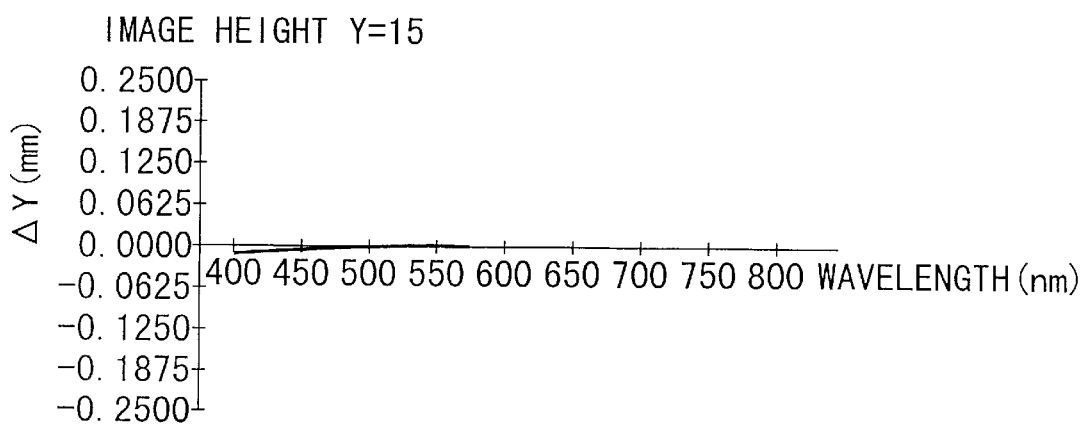
Figure 51C:
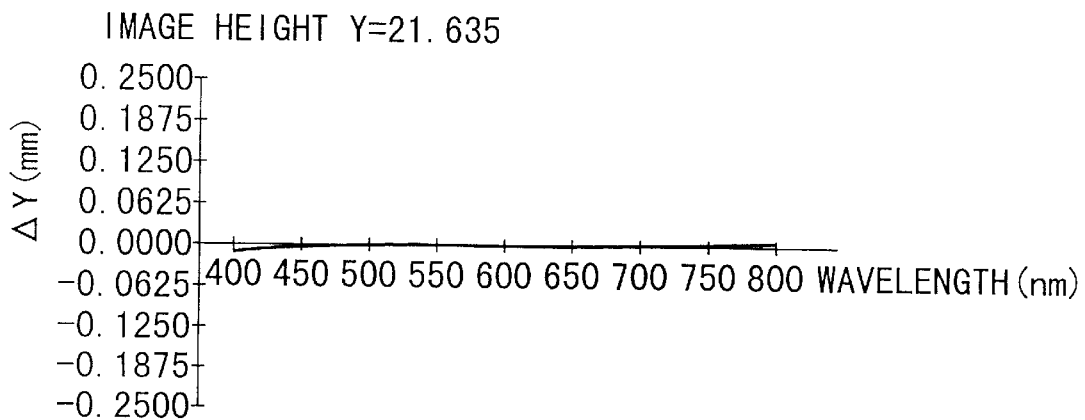
Figure 55A:
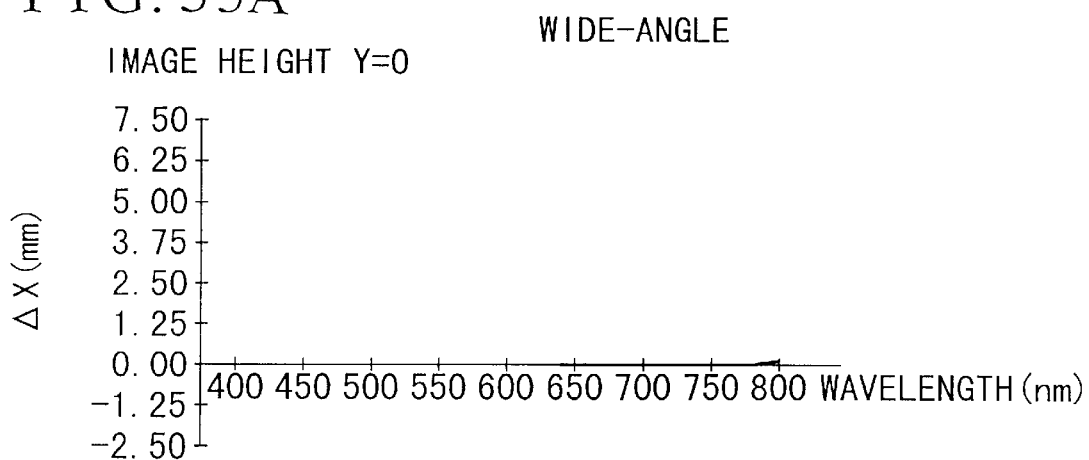
FIGS. 55A to 55C are graphic representations of the residual chromatic aberrations of the first lens unit of the reference example in the wide-angle end.
Figure 55B:
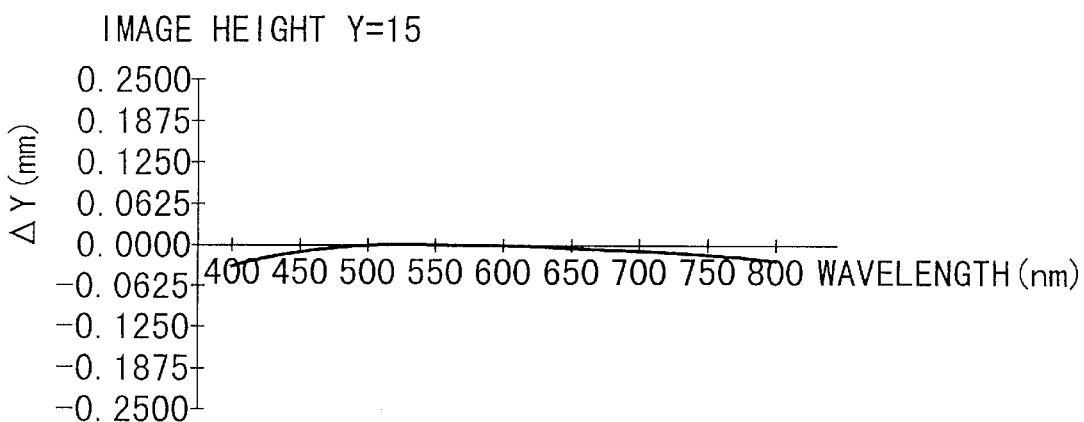
Figure 55C:
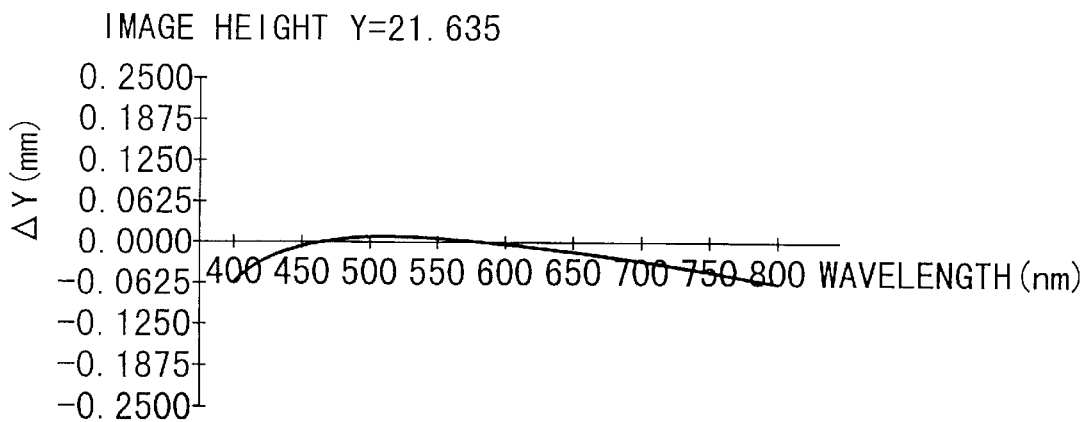
Figure 56A:
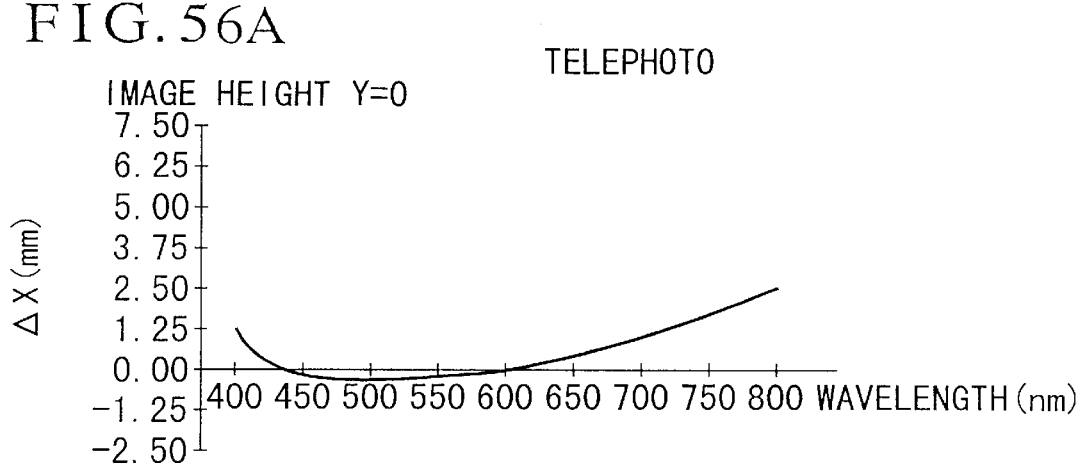
FIGS. 56A to 56C are graphic representations of the residual chromatic aberrations of the first lens unit of the reference example in the telephoto end.
Figure 56B:
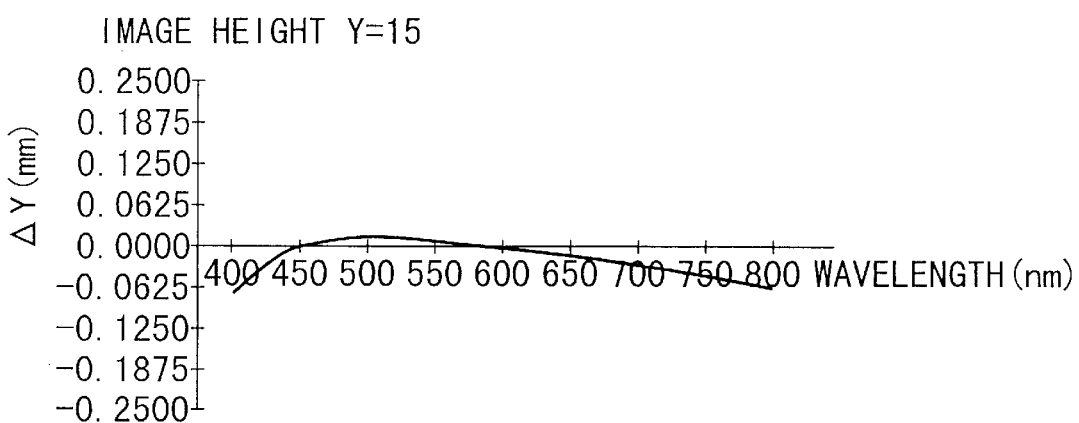
Figure 56C:
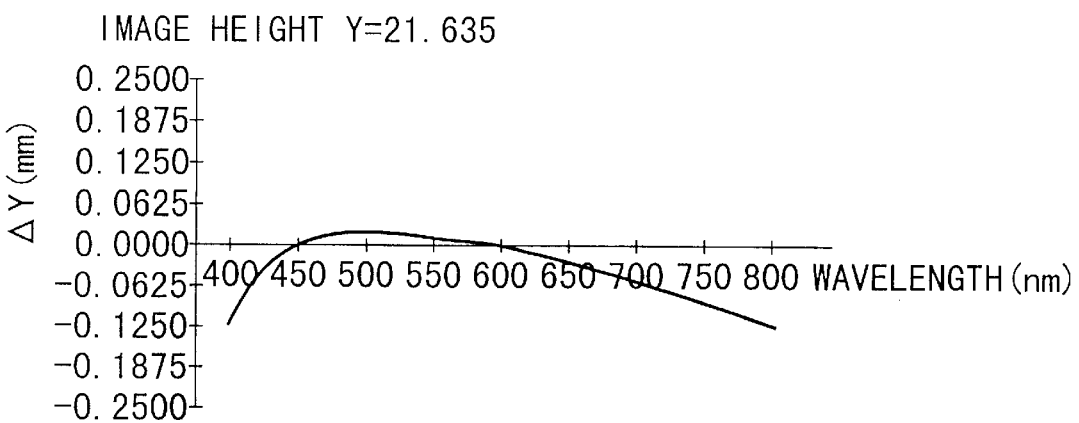
Figure 57A:
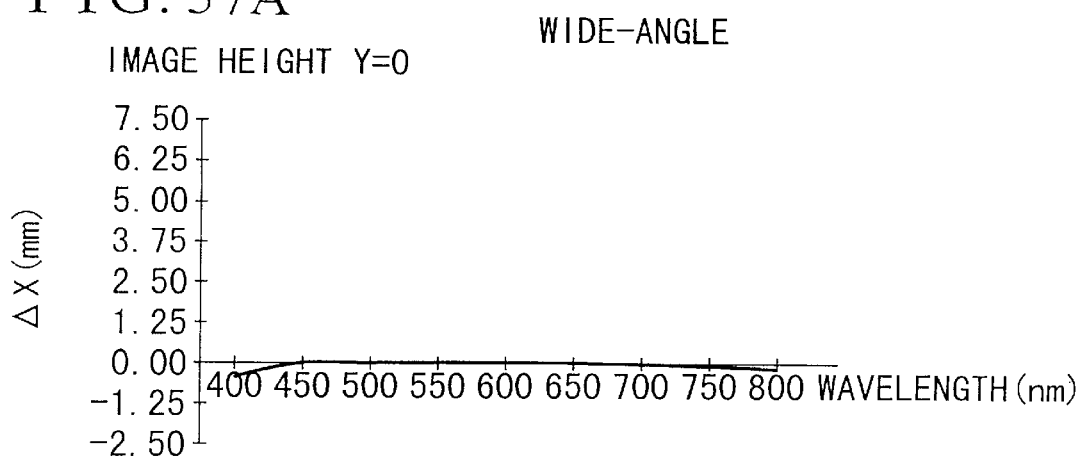
FIGS. 57A to 57C are graphic representations of the residual chromatic aberrations of the second lens unit of the reference example in the wide-angle end.
Figure 57B:
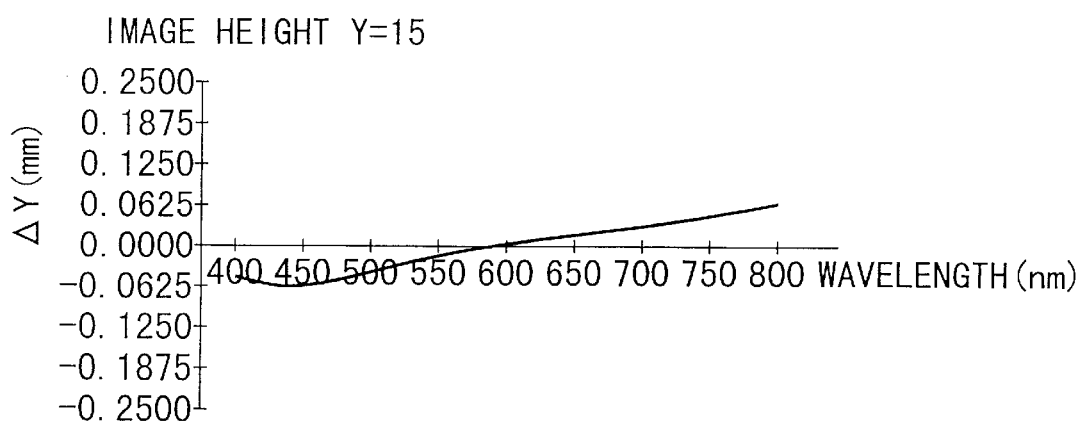
Figure 57C:
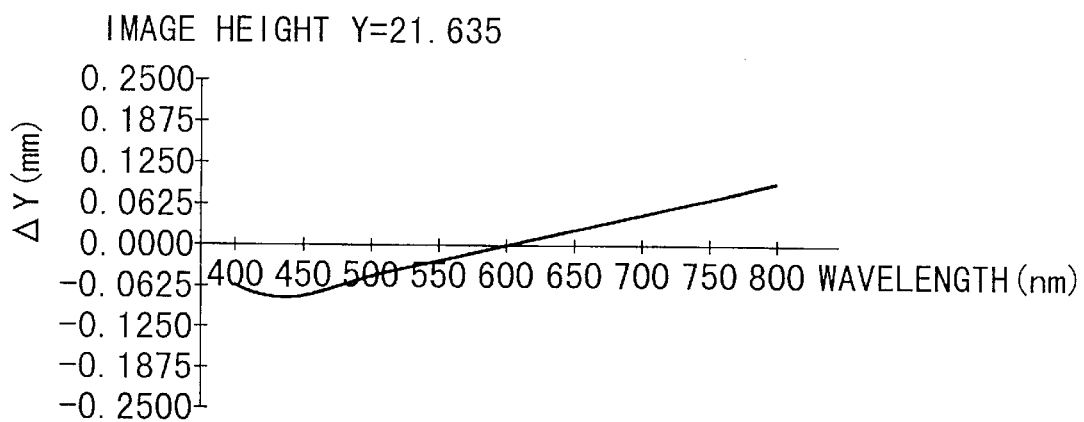
Figure 58A:
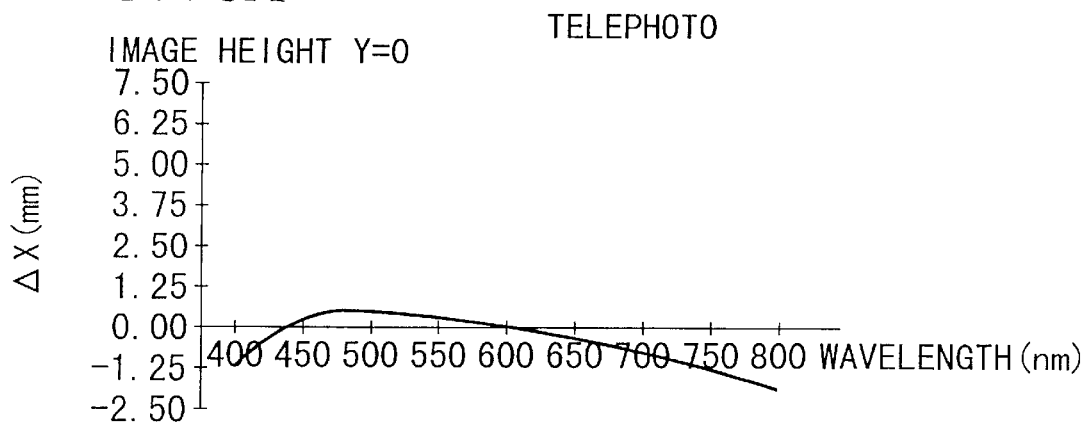
FIGS. 58A to 58C are graphic representations of the residual chromatic aberrations of the second lens unit of the reference example in the telephoto end.
Figure 58B:
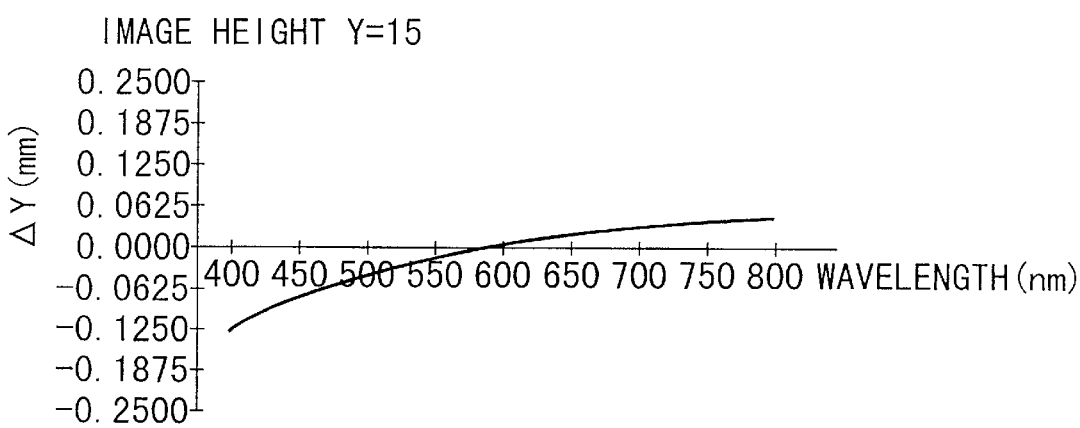
Figure 58C:
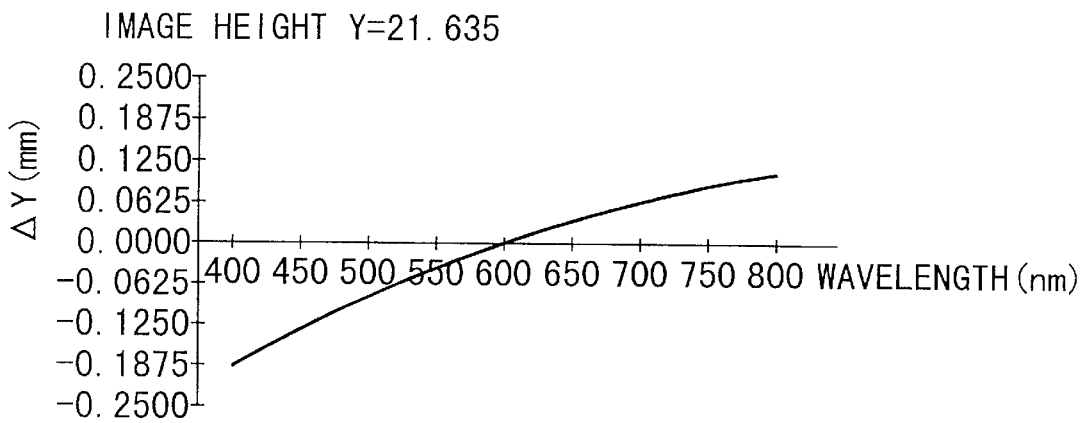
Figure 61A:
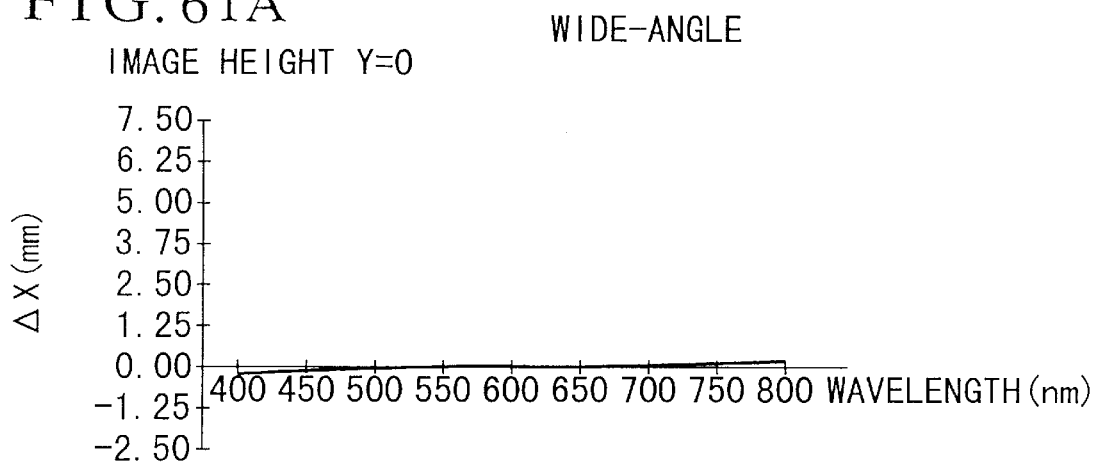
FIGS. 61A to 61C are graphic representations of the residual chromatic aberrations of the fourth lens unit of the reference example in the wide-angle end.
Figure 61B:
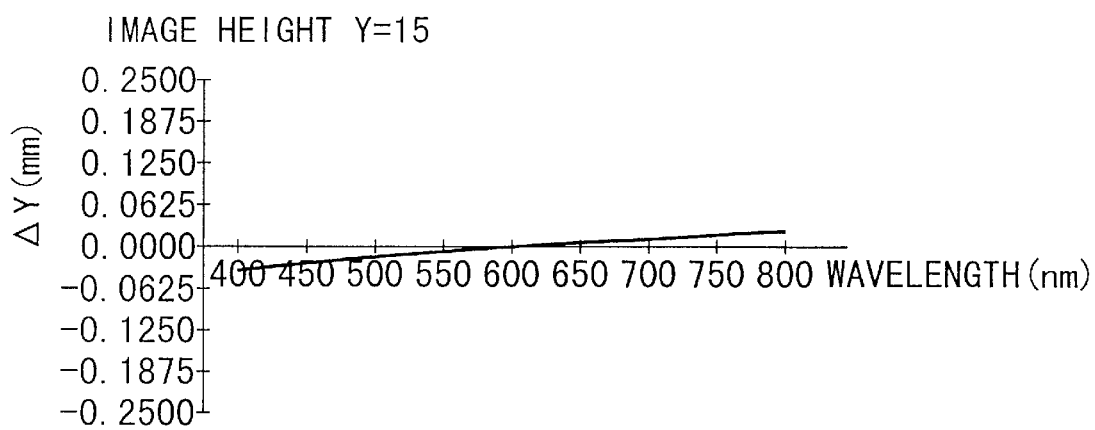
Figure 61C:
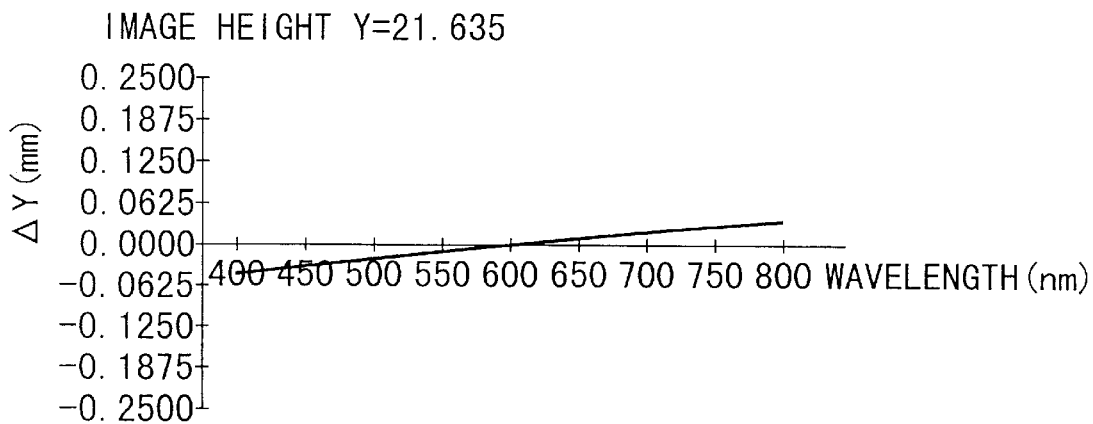
Figure 62A:
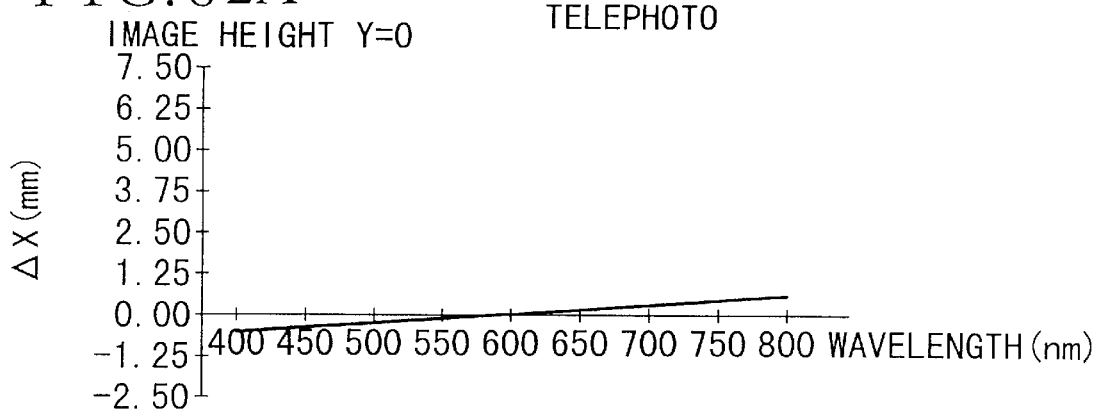
FIGS. 62A to 62C are graphic representations of the residual chromatic aberrations of the fourth lens unit of the reference example in the telephoto end.
Figure 62B:
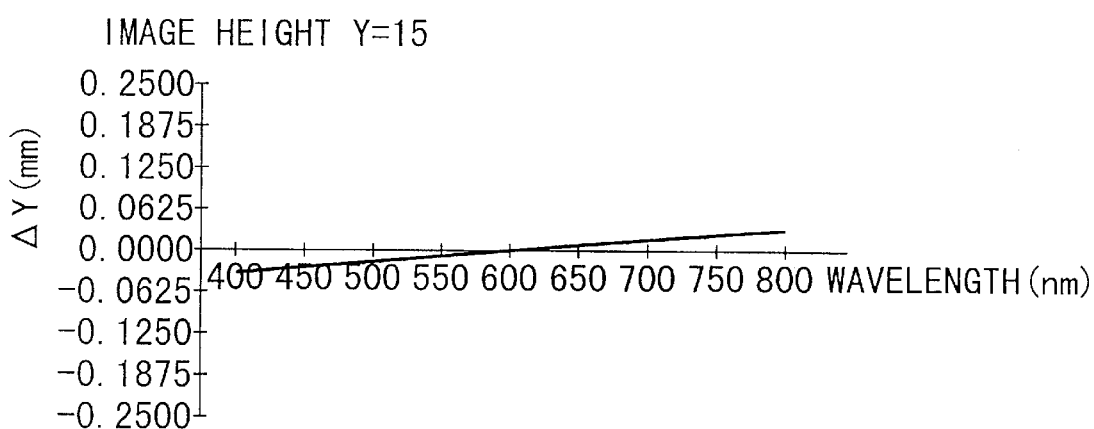
Figure 62C:
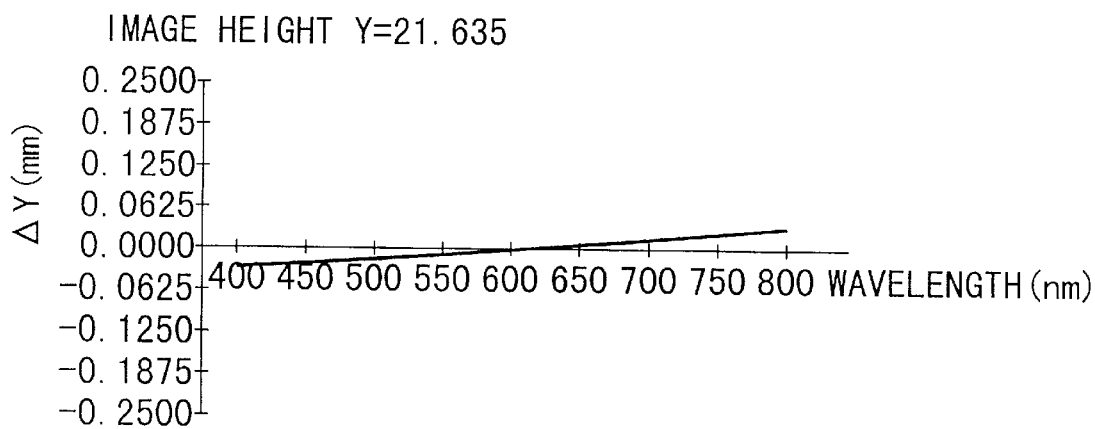
Figure 63A:
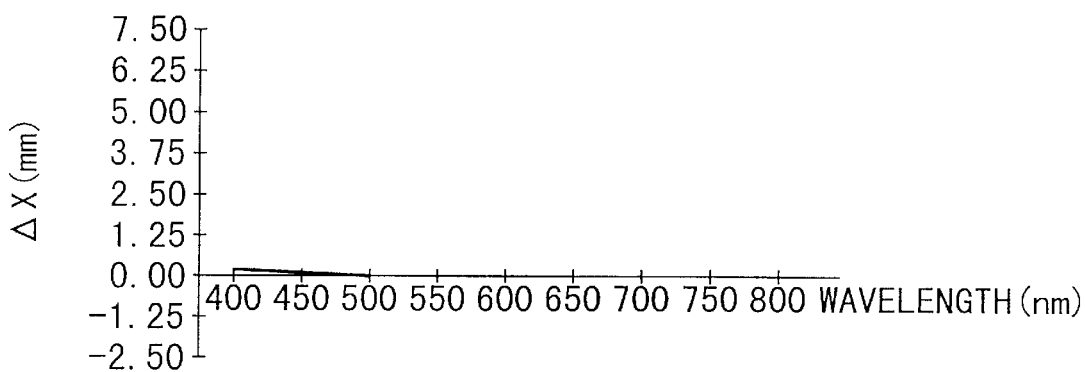
FIGS. 63A to 63C are graphic representations of the residual chromatic aberrations of the fifth lens unit of the reference example in the wide-angle end.
Figure 63B:
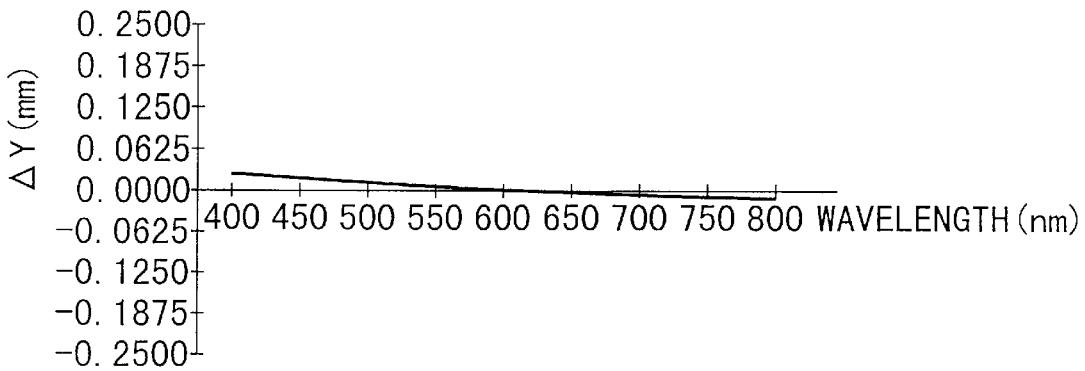
Figure 63C:
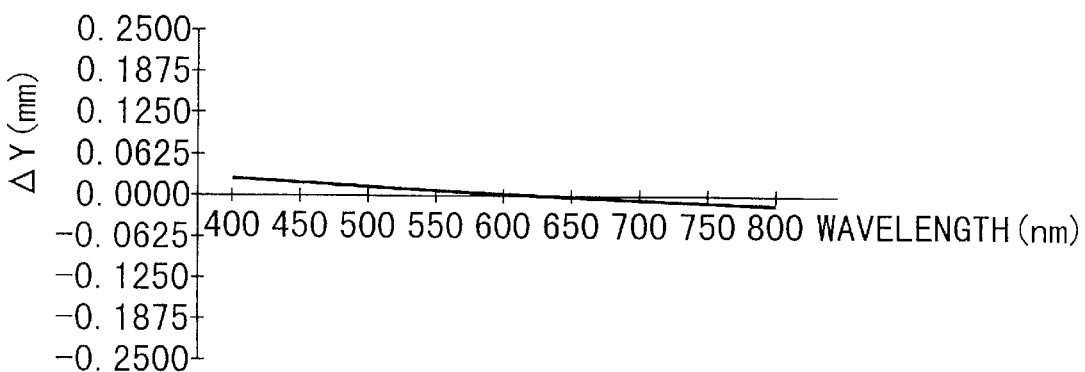
Figure 64A:
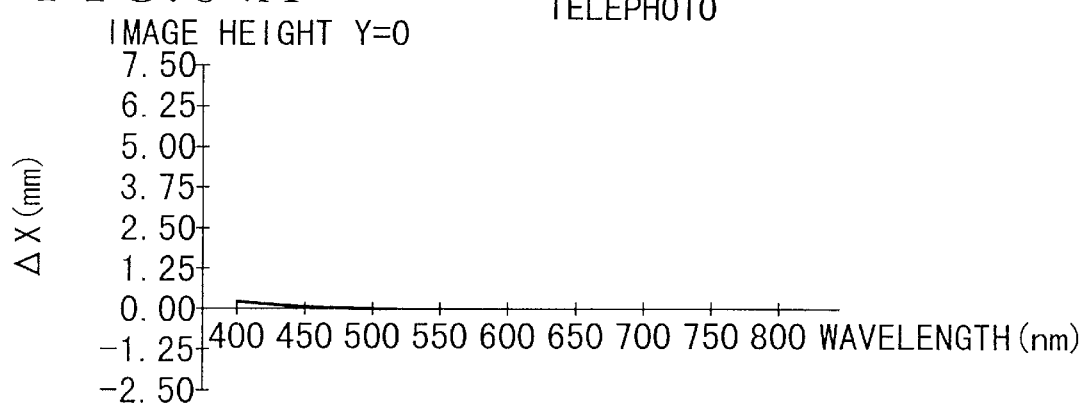
FIGS. 64A to 64C are graphic representations of the residual chromatic aberrations of the fifth lens unit of the reference example in the telephoto end.
Figure 64B:
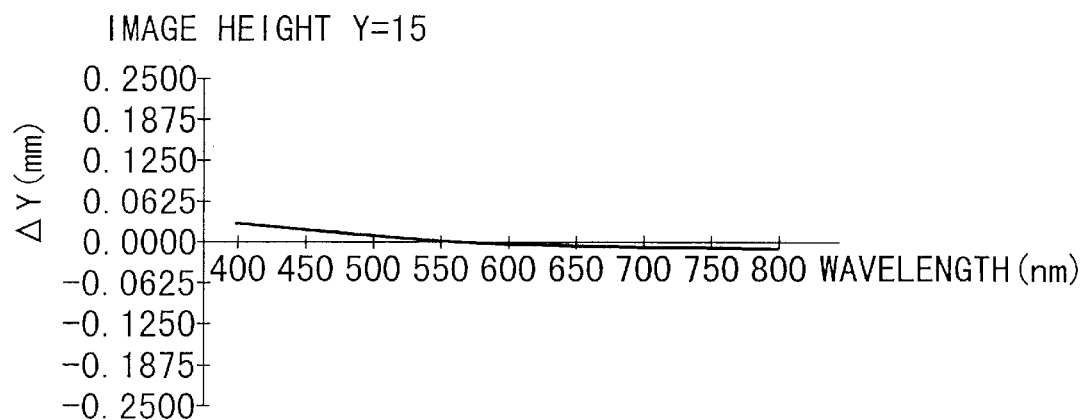
Figure 64C:
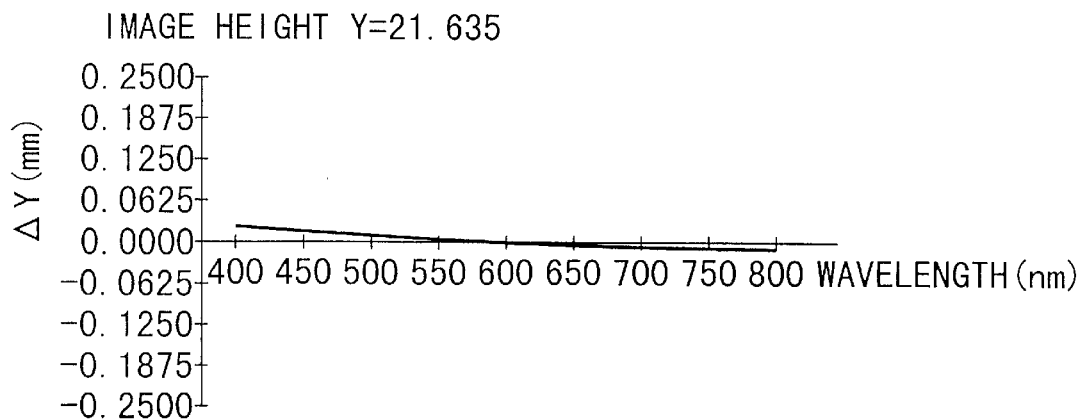

FIG. 25 is similar to the embodiment 1 except that no diffractive optical element is in use. This zoom lens is taken as a reference example. The numerical data for this reference example are shown in a table below. FIGS. 26A and 26D through FIGS. 28A to 28D show the aberrations of the zoom lens of the reference example in the wide-angle, the middle focal length position and the telephoto end, respectively. Upon comparison with every one of the aberration curves of the embodiment 1 (see FIGS. 7A to 7D through FIGS. 9A to 9D), it is understandable that, particularly in the telephoto end, the lateral chromatic aberration is not sufficiently improved.

REFERENCE EXAMPLE f = 25.21~195.50   Fno = 5.00~6.7   2ω = 63.1~12.6

| r1 = 131.592 | d1 = 2.10 | n1 = 1.846660 | v1 = 23.8 |
| r2 = 55.993 | d2 = 5.90 | n2 = 1.603112 | v2 = 60.7 |
| r3 = −324.423 | d3 = 0.12 | | |
| r4 = 44.580 | d4 = 4.00 | n3 = 1.696797 | v3 = 55.5 |
| r5 = 131.490 | d5 = Variable | | |
| r6 = 51.851 | d6 = 1.20 | n4 = 1.804000 | v4 = 46.6 |
| r7 = 13.730 | d7 = 4.47 | | |
| r8 = −39.705 | d8 = 1.10 | n5 = 1.772499 | v5 = 49.6 |
| r9 = 39.701 | d9 = 0.50 | | |
| r10 = 25.262 | d10 = 3.30 | n6 = 1.846660 | v6 = 28.8 |
| r11 = −54.626 | d11 = 0.74 | | |
| r12 = −23.804 | d12 = 1.00 | n7 = 1.772499 | v7 = 49.6 |
| r13 = 605.607 | d13 = Variable | | |
| r14 = Stop | d14 = Variable | | |
| r15 = 28.895 | d15 = 3.90 | n8 = 1.516330 | v8 = 64.2 |
| r16 = −37.851 | d16 = 0.20 | | |
| r17 = 33.335 | d17 = 3.90 | n9 = 1.516330 | v9 = 64.2 |
| r18 = −23.033 | d18 = 1.00 | n10 = 1.834000 | v10 = 37.2 |
| r19 = −150.718 | d19 = 0.20 | | |
| r20 = 19.925 | d20 = 3.10 | n11 = 1.518229 | v11 = 59.0 |
| r21 = −110.130 | d21 = 0.90 | n12 = 1.743198 | v12 = 49.3 |
| r22 = 17.202 | d22 = Variable | | |
| r23 = −6426.447 | d23 = 2.80 | n13 = 1.517417 | v13 = 52.4 |
| r24 = −50.610 | d24 = 0.20 | | |
| r25 = 241.216 | d25 = 5.30 | n14 = 1.518229 | v14 = 59.0 |
| r26 = −25.090 | d26 = 1.40 | n15 = 1.834000 | v15 = 37.2 |
| r27 = −58.988 | d27 = Variable | | |
| *r28 = −45.317 | d28 = 2.00 | n16 = 1.491710 | v16 = 57.4 |
| r29 = −52.030 | | | |

| Variable | Focal Length | | |
|---|---|---|---|
| Separation | 35.21 | 85.50 | 195.50 |
| d5 | 1.30 | 22.17 | 34.75 |
| d9 | 17.36 | 3.38 | 1.34 |
| d13 | 25.12 | 13.46 | 9.80 |
| d19 | 6.00 | 26.87 | 39.45 |

Aspheric Coefficients:

r28: $K = 4.20834 \cdot 10^{-1}$   $A = 0$   $B = -1.28470 \cdot 10^{-6}$
     $C = 1.05811 \cdot 10^{-9}$   $D = 6.29307 \cdot 10^{-12}$   $E = 0$ Referring now to FIGS. 29A to 29C through FIGS. 40A to 40C for the numerical example 1 and FIGS. 41A to 41C through FIGS. 52A to 52C for the numerical example 2, there are graphically shown the amounts of chromatic aberrations of the entire optical system and each of the lens units L1 to L5 with an object at infinity. In these graphs, the ordinate is in the image height Y (mm) and the abscissa is in the wavelength λ (nm). For Y=0, the ordinate shows the amount of longitudinal chromatic aberration relative to wavelengths. For Y=15 and Y=21.635, the ordinate shows the amount of lateral chromatic aberration. The amounts of chromatic aberrations of each of the individual lens units L1 to L5 are calculated on the assumption that the other lens units are the ideal optical systems.

FIGS. 53A to 53C through FIGS. 64A to 64C for the reference example graphically show similar amounts of chromatic aberrations to those described above. Now at a glance on the graphs of the reference example, whilst the tendency and amount in and by which each of the other lens units produces chromatic aberrations are similar in both of the wide-angle and telephoto ends, the first and second lens units L1 and L2 that contribute to a variation of the focal length of the zoom lens each produce chromatic aberrations which differ in the tendency and amount between the wide-angle and telephoto ends. It is understandable that such a canceling relationship is used in correcting the variation with zooming of the chromatic aberrations. In this case, as compared with the wide-angle end, it is in the telephoto end that the "curvature of the secondary spectrum curve" cannot be canceled out, so this exhibits that there are large chromatic residuals.

It is, therefore, to be understood that in the zoom lens type, the produced amounts of chromatic aberrations of the first and second lens units L1 and L2 have to be adjusted by using the diffractive optical element without affecting the other aberrations.

In particular, the improvements as shown in FIGS. 29A to 29C through FIGS. 40A to 40C result from the introduction of a diffractive optical element to the optical system of the reference example taken as the basic configuration. In converting the optical system to a telephoto form, the residual chromatic aberration the first lens unit L1 produces is suppressed, thus achieving an optical system corrected well for chromatic aberrations in the telephoto end. As is apparent from FIGS. 31A to 31C and FIGS. 32A to 32C, the produced amount of chromatic aberrations by the first lens unit L1 is far reduced from that shown in FIGS. 55A to 55C and FIGS. 56A to 56C with the reference example. Therefore, the second lens unit L2 needs only to produce chromatic aberrations small enough to cancel out those of the first lens unit L1. The before-described "curvature of the secondary spectrum curve" is thus suppressed to a minimum. So, it becomes possible to achieve an optical system which is corrected well for the variation with zooming of chromatic aberrations.

Figure 65:
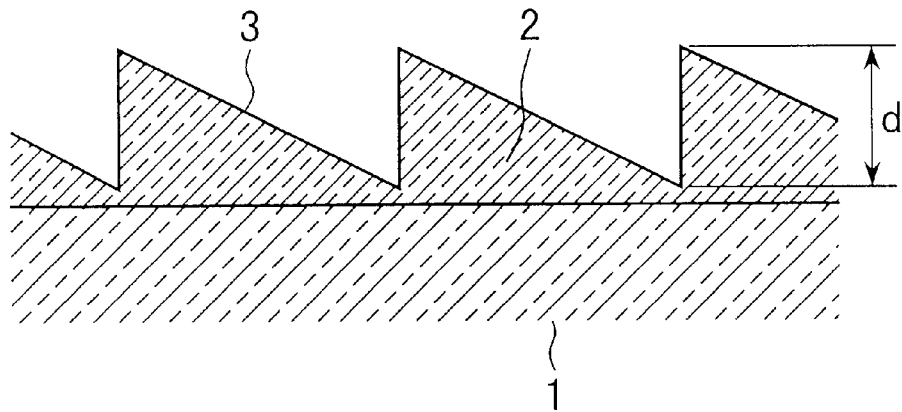
FIG. 65 is a fragmentary section view of a diffractive optical element of the mono-layer structure.

The diffractive optical elements may be manufactured in a similar way to that for holographic optical elements (HOEs), where the diffraction grating is formed to "binary optics" by using lithographic techniques. In this case, to further raise the diffraction efficiency, there is a choice of making the surface in a sawtooth form in cross-section, or what is called the "kinoform" like that shown in FIG. 65. It is also possible to use the molding techniques where a form die is made up by the method described above.

These diffractive optical elements are to be applied on optical surfaces. Their bases may take any of spherical, flat planer and aspherical forms without suffering drawbacks. Another method may be used in which casts are taken from a thin layer of plastic material and then deposited as the diffractive optical surfaces on those substrates. That is, the so-called "replica" technique may be used in manufacturing them. If the optical power of this diffractive optical element is strengthened, the difference in pitch between the paraxial and marginal regions becomes large, making it difficult to manufacture them. Another problem is that the finished products have no good diffraction efficiency.

In any complete lens, the frontmost surface is exposed directly to the outside. Except for special cases such as that of making most of it on aberration correction, therefore, the diffractive optical element had better not be placed on the frontmost surface. The diffractive optical element is formed by grooves of a considerably narrow width in several microns or in the order of submicron. To protect the lens surface from scratches or dust, it is preferred to put the diffractive optical element inside the optical system.

Figure 66:
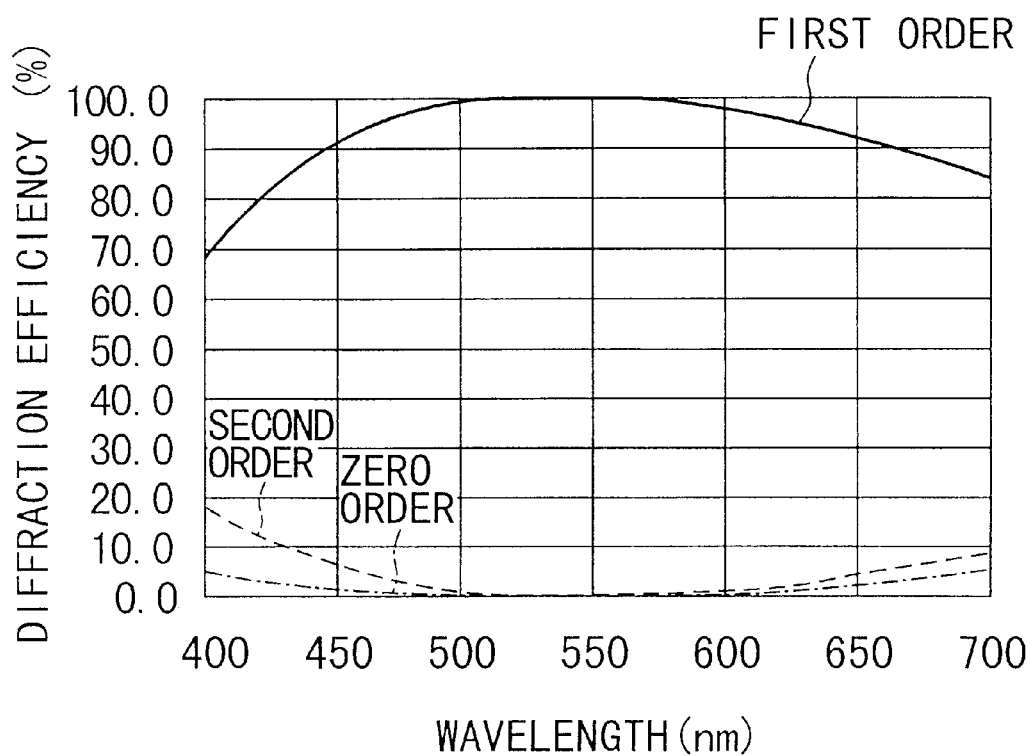
FIG. 66 is a graph of the diffraction efficiency of the mono-layer structure
Figure 67:
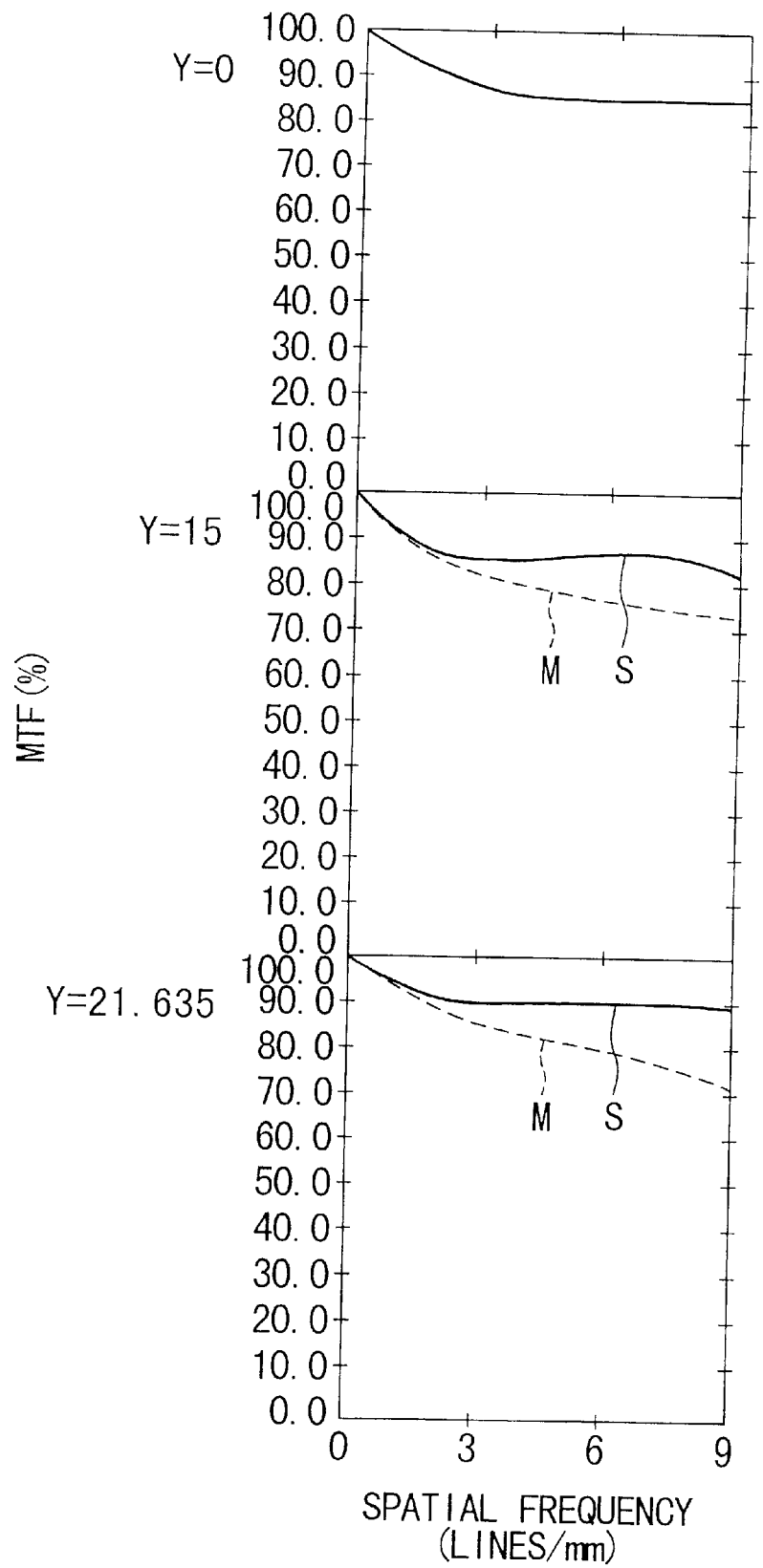
FIG. 67 is graphs of the MTF characteristics relative to the spatial frequency of the mono-layer structure.

To improve the diffraction efficiency, the diffractive optical element is preferably formed to a laminated structure as will be described later. FIG. 66 shows the dependence on the wavelength of the diffraction efficiency for the first-order diffracted rays of the diffractive optical element shown in FIG. 65. In actual practice, the diffractive optical element is produced by a process comprising the steps of applying a resin layer 2 to the surface of a substrate 1 and then forming grooves 3 therein to a thickness "d" so that the diffraction efficiency for the first-order diffracted rays becomes 100% at a wavelength of 530 $\mu$m. As is apparent from FIG. 66, the diffraction efficiency in the design order becomes progressively lower away from the optimized wavelength of 530 $\mu$m. Meanwhile, the intensities of different orders from the design order by ±1, or zero and second orders, rise increasingly. This increase of the relative intensities to that of the design order causes production of flare and leads to lower the resolving power of the optical system. FIG. 67 shows the MTF characteristics for the discrete image heights Y in the wide-angle end relative to the spatial frequency of the diffractive optical surface in the form of the grating of FIG. 65 as applied to the embodiment 1 of the zoom lens. From FIG. 67, it is understandable that the MTF in the low frequency region becomes lower than the desired values.

Figure 68:
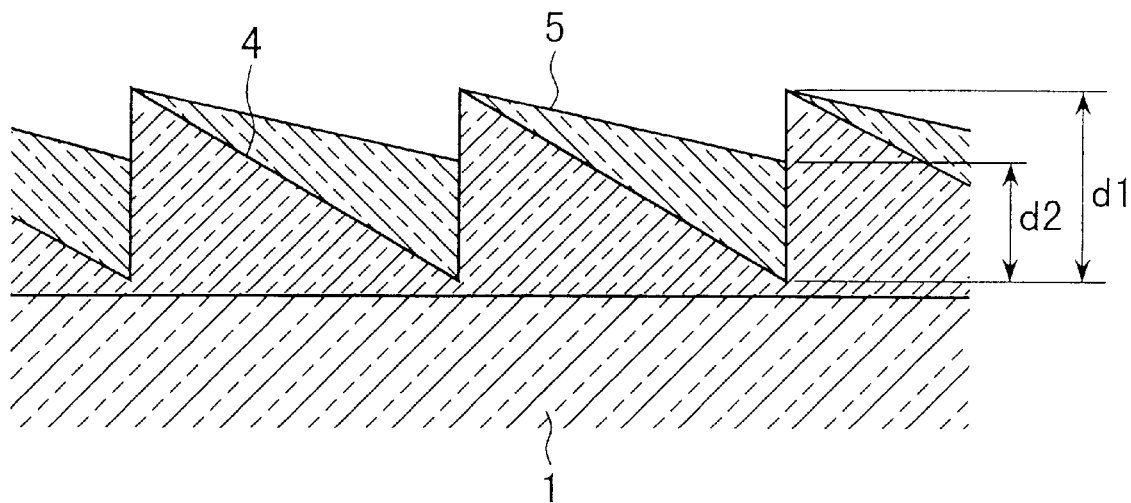
FIG. 68 is a fragmentary section view of a diffractive optical element of the laminated structure.
Figure 69:
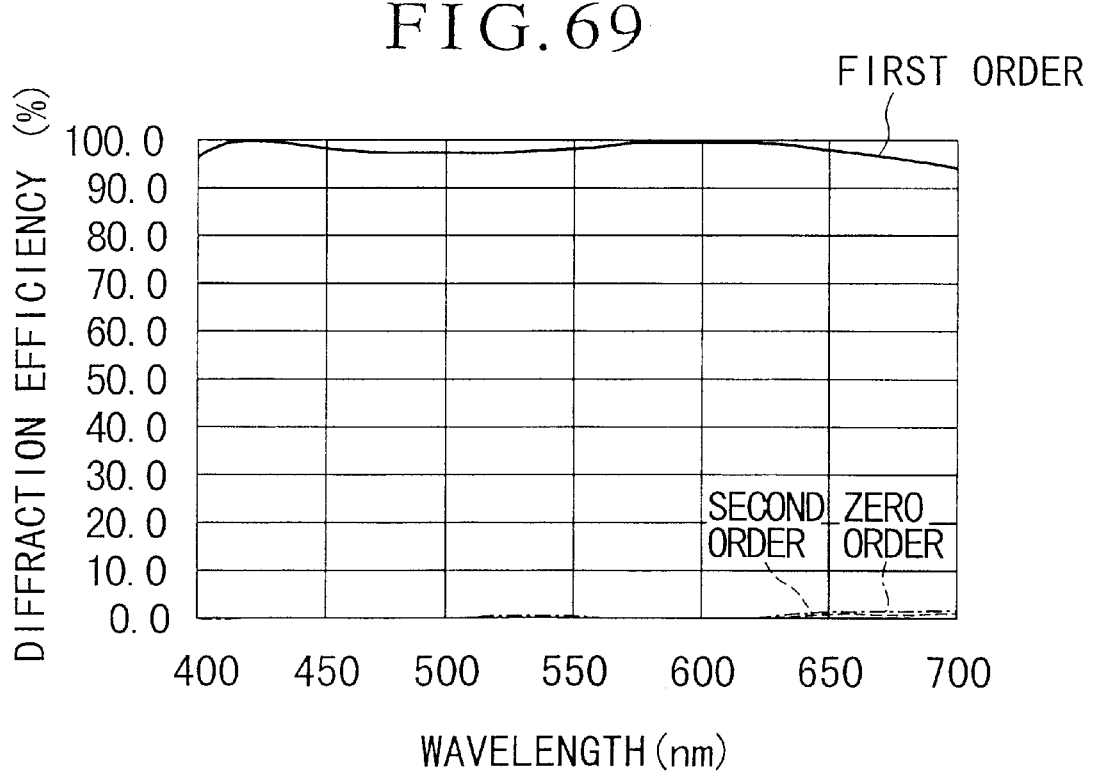
FIG. 69 is a graph of the diffraction efficiency of the laminated structure

For this reason, the embodiments of the invention employ such a laminated type of diffraction grating as shown in FIG. 68 as a form of the grating in the diffractive optical surface. For the diffractive optical element in this form, the diffraction efficiencies for the first-order diffracted rays depend on the wavelengths in such a fashion as shown FIG. 69.In a specific embodiment, a first diffraction grating 4 made from an ultraviolet setting resin (nd=1.499, vd=54) is formed on a substrate 102. As stacked on the first diffraction grating 4, there is formed a second diffraction grating 5 made from another ultraviolet setting resin (nd=1.598, vd=28).

In this combination of the materials, the grating thickness d1 of the first diffraction grating 4 is determined to be d1=13.8 $\mu$m and the grating thickness d2 of the second diffraction grating 5 is determined to be d2=10.5 $\mu$m. As is understandable from FIG. 69, the making of the diffraction grating in the laminated structure increases the diffraction efficiency for the design order to higher than 95% over the entire useful range of wavelengths.

Figure 70:
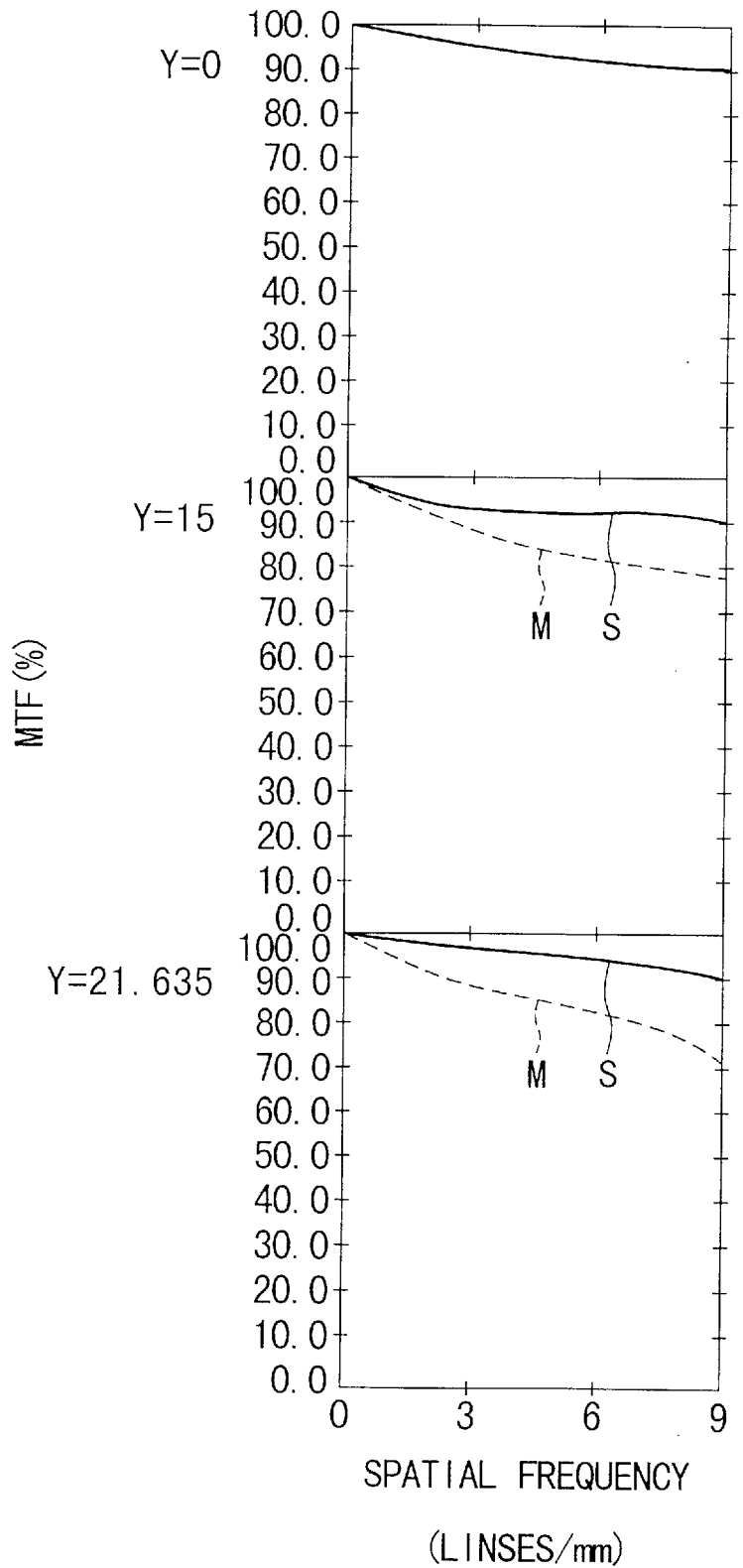
FIG. 70 is graphs of the MTF characteristics relative to the spatial frequency of the laminated structure.

FIG. 70 shows the MTF characteristics relative to the spatial frequency in the case of the diffraction grating of the laminated structure. By using the diffraction grating of the laminated structure in such a way, the diffraction efficiency in the low frequencies is improved. The desired MTF characteristic is thus obtained. It will be appreciated from the foregoing that the use of the diffraction grating of the laminated structure achieves further improvements of the optical performance.

Figure 71:
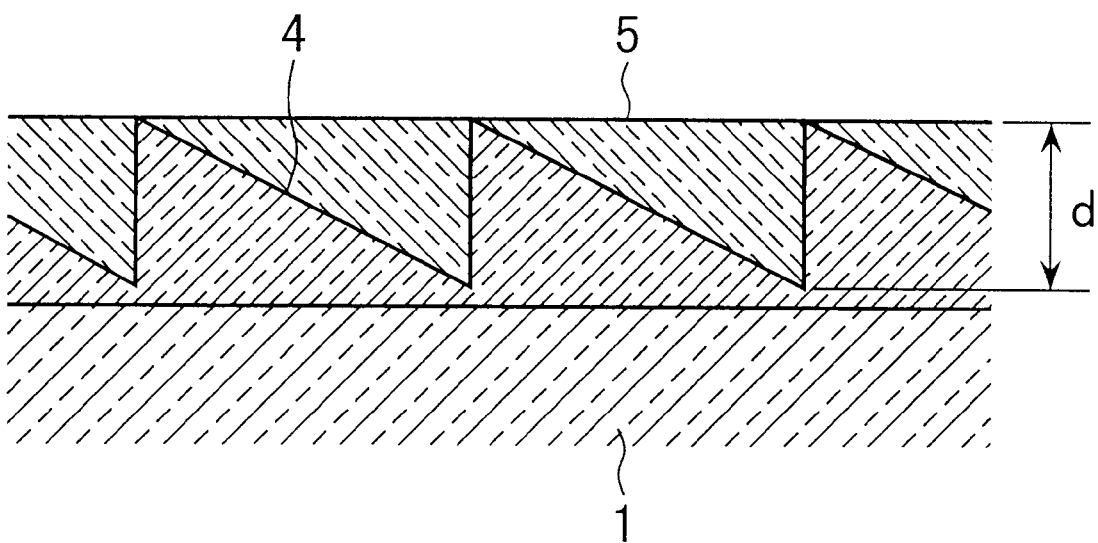
FIG. 71 is a fragmentary section view of another diffractive optical element of the laminated structure.

It should be noted that, for the diffraction grating of the laminated structure described above, the material to be used therefor is not limited to the ultraviolet setting resin. Other materials such as plastics may be used instead. Moreover, as the diffraction grating depends on some materials of the substrate 1, the first diffraction grating 4 may be formed directly in the substrate 1. Furthermore, there is no need to make the two grating thicknesses different from each other. In some combinations of materials, the two grating thicknesses may be made equal to each other, as shown in FIG. 71. Since, in this case, no grooves are exposed out of the surface of the diffractive optical element, the dust proof is excellent, contributing to an increase of the productivity on the assembling line in manufacturing the diffractive optical elements. So, inexpensive optical systems can be obtained.

Also, by making a structure of three or more layers, an even better diffraction efficiency can be achieved.

It will be appreciated from the foregoing that the zoom lens described above has a high range, while still maintaining good stability of the correction of chromatic aberrations throughout the entire zooming range, thus assuring a high image quality as the optical performance.

Next, an embodiment of an optical apparatus to which the zoom lens shown in each of FIGS. 1 to 6 is applied is described with reference to FIG. 72.

Figure 72:
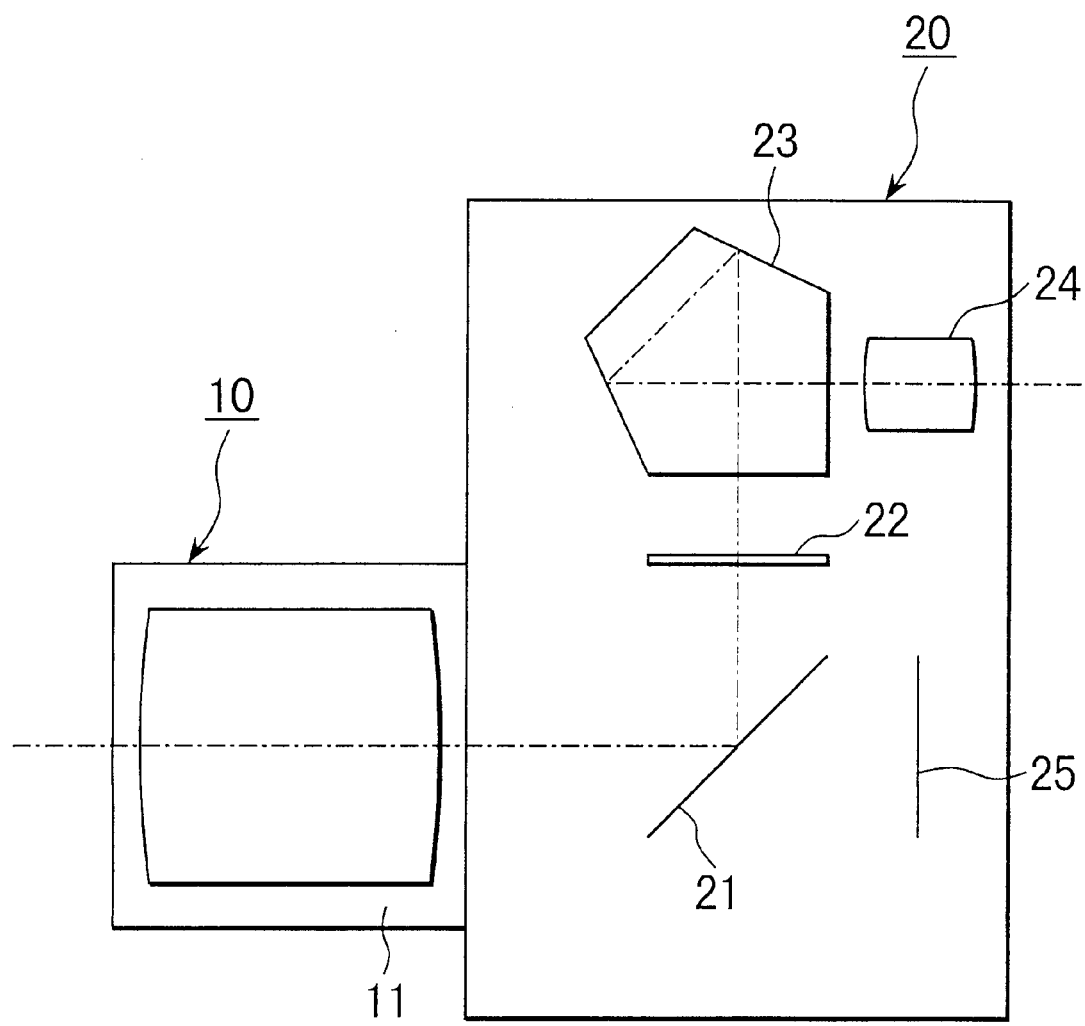
FIG. 72 is a schematic diagram of the construction of an optical apparatus having the zoom lens of the invention.

Referring to FIG. 72, the optical apparatus comprises a lens barrel 10 having the zoom lens 11 shown in each of FIGS. 1 to 6 mounted therein, and a camera body 20. The camera body 20 contains a mirror 21 arranged to reflect a light beam taken in by the zoom lens 11 upward, a focusing screen 22 on which an image of an object to be photographed is formed by the zoom lens 11, a pentagonal roof prism 23 for converting a light beam from the focusing screen 22 into an erecting image, an eyepiece lens 24 through which the object image formed on the focusing screen is viewed by the photographer, etc. In FIG. 72, the optical apparatus is in a viewing state (ready-to-shoot state). When a release button (not shown) is pushed down by the photographer, the mirror 21 retracts from the optical path shown in FIG. 72, so that the object image is cast on silver-halide film 25.

As described above, the zoom lens according to the invention is applied to the camera or like optical apparatus to obtain pictures corrected well for chromatic aberrations.

I claim:

1. A zoom lens comprising, in order from an object side, a first lens unit of positive refractive power, a second lens unit of negative refractive power, and a subsequent lens unit of positive refractive power as a whole, wherein during zooming from a wide-angle end to a telephoto end, at least said first lens unit is moved along an optical axis such that a separation between said first lens unit and said second lens unit increases, and wherein at least one diffractive optical element is provided in said first lens unit.

2. A zoom lens according to claim 1, wherein at least one diffractive optical element is provided in said second lens unit.

3. A zoom lens according to claim 1, wherein said first lens unit and said second lens unit each have at least one positive lens and at least one negative lens.

4. A zoom lens according to claim 1, wherein a diffractive optical surface of said diffractive optical element is formed as a diffraction grating of a laminated structure.

5. A zoom lens comprising, in order from an object side, a first lens unit of positive refractive power, a second lens unit of negative refractive power, and a subsequent lens unit of positive refractive power as a whole, wherein during zooming from a wide-angle end to a telephoto end, at least one of said first lens unit and said second lens unit is moved along an optical axis such that a separation between said first lens unit and said second lens unit increases, and wherein at least one diffractive optical element is provided in said first lens unit, said zoom lens satisfying the following condition:

$$0.3 < |F2/Fw| < 0.75$$

where F2 is a focal length of said second lens unit, and Fw is a focal length in the wide-angle end of said zoom lens.

6. A zoom lens according to claim 5, wherein at least one diffractive optical element is provided in said second lens unit.

7. A zoom lens according to claim 5, wherein said first lens unit and said second lens unit each have at least one positive lens and at least one negative lens.

8. A zoom lens according to claim 5, wherein a diffractive optical surface of said diffractive optical element is formed as a diffraction grating of a laminated structure.

9. A zoom lens according to claim 5, satisfying the following condition:

$$0.35 < |F2/Fw| < 0.65$$

10. A zoom lens according to claim 5, satisfying the following condition:

$$0.2 < |F2/F1| < 0.7$$

where F1 is a focal length of said first lens unit.

11. A zoom lens according to claim 1, wherein, when a diffractive optical surface of said diffractive optical element has a phase $\phi(H)$ at a distance H from the optical axis as expressed by $$\phi(H) = (2\pi \cdot m/\lambda) \cdot (C2 \cdot H^2 + C4 \cdot H^4 + C6 \cdot H^6 + \ldots + C(2i) \cdot H^{(2i)})$$

where $\lambda$ is a reference wavelength, m is a diffraction order, and

C(2i) is a phase coefficient of a term in the 2i-th degree, said zoom lens satisfies the following condition:

$$1 \times 10^{-9} < |C2/F1| < 5 \times 10^{-6}$$

where F1 is a focal length of said first lens unit.

12. A zoom lens according to claim 1, wherein said subsequent lens unit comprises a third lens unit of positive refractive power, a fourth lens unit of positive refractive power, and a fifth lens unit of negative refractive power.

13. A zoom lens according to claim 1, wherein said subsequent lens unit comprises a third lens unit of positive refractive power, a fourth lens unit of positive refractive power, and a fifth lens unit of positive refractive power.

14. A zoom lens according to claim 1, wherein said subsequent lens unit comprises a third lens unit of positive refractive power, and a fourth lens unit of positive refractive power.

15. A zoom lens according to claim 1, wherein said subsequent lens unit comprises a third lens unit of positive refractive power, a fourth lens unit of negative refractive power, and a fifth lens unit of positive refractive power.

16. An optical apparatus comprising a zoom lens according to one of claims 1 to 15.

* * * * *

UNITED STATES PATENT AND TRADEMARK OFFICE
CERTIFICATE OF CORRECTION

PATENT NO. : 5,978,153
DATED : November 2, 1999
INVENTOR(S) : Akihiro Nishio

It is certified that error appears in the above-identified patent and that said Letters Patent are hereby corrected as shown below:

Col. 1, line 59, delete "found out" and insert -- determined --.
Col. 5, line 45, delete "power in rear" and insert -- power rearwardly --.
Col. 5, line 48, delete "power in rear" and insert -- power rearwardly --.
Col. 5, line 51, delete "power in rear" and insert -- power rearwardly --.
Col. 5, line 54, delete "power in rear" and insert -- power rearwardly --.
Col. 5, line 57, delete "power in rear" and insert -- power rearwardly --.
Col. 5, line 60, delete "power in rear" and insert -- power rearwardly --.
Col. 6, line 14, delete "keep hold of" and insert -- maintain --.
Col. 6, line 39, delete "(11)" and insert -- (1') --.
Col. 7, line 18, before "C4•" insert -- $H^2+$ --.
Col. 7, line 34, delete "vd, vC and vF" and insert -- $\lambda d, \lambda C$ and $\lambda F$ --.
Col. 7, line 58, delete "giving no" and insert -- giving any --.
Col. 10, line 47, delete "26.512" and insert -- 28.512 --.
Col. 12, line 59, delete "2.74559" and insert -- -2.74559 --.
Col. 15, line 30, delete "formed to" and insert -- formed as --.

Signed and Sealed this

Seventeenth Day of April, 2001

Attest:

NICHOLAS P. GODICI

Attesting Officer    Acting Director of the United States Patent and Trademark Office